US008234635B2

(12) United States Patent
Isshiki et al.

(10) Patent No.: US 8,234,635 B2
(45) Date of Patent: Jul. 31, 2012

(54) PROGRAM PROCESSING DEVICE, PARALLEL PROCESSING PROGRAM, PROGRAM PROCESSING METHOD, PARALLEL PROCESSING COMPILER, RECORDING MEDIUM CONTAINING THE PARALLEL PROCESSING COMPILER, AND MULTI-PROCESSOR SYSTEM

(75) Inventors: Tsuyoshi Isshiki, Tokyo (JP); Hiroaki Kunieda, Tokyo (JP)

(73) Assignee: Tokyo Institute of Technology, Tokyo (JP)

( * ) Notice: Subject to any disclaimer, the term of this patent is extended or adjusted under 35 U.S.C. 154(b) by 1048 days.

(21) Appl. No.: 11/913,162

(22) PCT Filed: Jan. 16, 2007

(86) PCT No.: PCT/JP2007/050470
§ 371 (c)(1),
(2), (4) Date: Apr. 30, 2008

(87) PCT Pub. No.: WO2007/083613
PCT Pub. Date: Jul. 26, 2007

(65) Prior Publication Data
US 2009/0055630 A1 Feb. 26, 2009

(30) Foreign Application Priority Data

Jan. 17, 2006 (JP) ................................. 2006-008870

(51) Int. Cl.
*G06F 9/30* (2006.01)
(52) U.S. Cl. ........................................ 717/149; 717/140
(58) Field of Classification Search .................... None
See application file for complete search history.

(56) References Cited

U.S. PATENT DOCUMENTS

| 7,039,905 B1 * | 5/2006 | Tsujimori et al. | 717/149 |
| 7,657,882 B2 * | 2/2010 | Oskin et al. | 717/156 |
| 2007/0271556 A1 * | 11/2007 | Eggers et al. | 717/151 |

OTHER PUBLICATIONS

Nakano, Hirofumi et al. "Memory Management for Data Localization on OSCAR Chip Multiprocessor", ,Innovative Architecture for Future Generation High-Performance Processors and Systems, 2004. Proceedings, Jan. 12-14, 2004, pp. 82-88.*
Kodaka, Takeshi et. al. "Parallel Processing using Data Localization for MPEG2 Encoding on OSCAR Chip Multiprocessor.", Innovative Architecture for Future Generation High-Performance Processors and Systems, 2004. Proceedings, Jan. 12-14, 2004, p. 119-127.*

(Continued)

*Primary Examiner* — Li Zhen
*Assistant Examiner* — Viva Miller
(74) *Attorney, Agent, or Firm* — Fenwick & West LLP

(57) ABSTRACT

In a multi-processor system for performing a parallel processing, each of a plurality of processors includes a communication processing unit for performing control between the processors in a data flow machine-type data-driven control method; and a program processing unit for performing control in each processor in a Neumann-type program-driven control method. The communication processing unit performs a communication between the processors in synchronization with the program processing unit, and has a function of detecting a communication data hazard between the processors. The program processing unit performs a processing based on an execution code stored in a local memory, and has a function of executing or suspending the execution code, according to a result of detecting the data hazard.

5 Claims, 38 Drawing Sheets

OTHER PUBLICATIONS

Kimura, Keiji et al. "Multigrain Parallel Processing on OSCAR Chip Multiprocessor", Information Processing Society of Japan, Nov. 2002, vol. 2002, No. 112, pp. 29-34. (Japanese Version and English Translation).*

Kusano, et al. (2000) "Performance Evaluation of the Omni OpenMP Compiler", ISHPC '00 Proceedings of the Third International Symposium on High Performance Computing, 2000. pp. 77-94.*

Kimura, Keiji et al. "Multigrain Parallel Processing on OSCAR Chip Multiprocessor", Information Processing Society of Japan, Nov. 2002, vol. 2002, No. 112, pp. 29-34. (As translated in English by the United States Patents and Trademarks Office , Dec. 2011).*

Hwang, K., "Advanced Computer Architecture with Parallel Programming" 2.2 Program Flow Mechanisms, 1993, pp. 80-86, Mcgraw Hil.

Arvind et al, *Executing a Program on the MIT Tagged-Token Dataflow Architecture*, IEEE Transactions on Computers, Mar. 3, 1990, pp. 300-318, vol. 39, No. 3.

Rudolf Eigenmann et al, *On the Automatic Parallelization of the Perfect Benchmarks®*, IEEE Transactions on Parallel and Distributed Systems, Jan. 1998, pp. 5-23, vol. 9, No. 1.

Joseph A. Fisher, *Trace Scheduling: A Technique for Global Microcode Compaction*, IEEE Transactions on Computers, Jul. 1981, pp. 478-490, vol. c-30, No. 7.

N.H. Gehani et al, *Concurrent C*, Software—Practice and Experience, Sep. 1986, pp. 821-844, vol. 16 (9).

Mary W. Hall et al, *Maximizing Multiprocessor Performance with the SUIF Compiler*, Computer Innovative Technology for Computer Professionals, Dec. 1996, pp. 84-89.

Richard Johnson et al, *Dependence-Based Program Analysis*, Department of Computer Science, Cornell University, 1993, pp. 78-89.

Yuetsu Kodama et al, *A Dataflow Single Chip Processor EMC-R: Design Principles and Implementation*, Journal of Information Processing Society of Japan, 1991, pp. 1-2, vol. 32, No. 7.

Ben Lee et al, *Dataflow Architectures and Multithreading*, Computer, Aug. 1994, pp. 27-39, IEEE.

*Message Passing Interface Forum*, [online], Retrieved on Feb. 19, 2008, Retrieved from the URL:<http://www.mpi-forum.org/index.html>.

David A. Patterson et al, *Computer Architecture A Quantitative Approach*, 1990, pp. 251-278; 314-328; 338-341.

Vason P. Srini, *An Architectural Comparison of Dataflow Systems*, Computer, Mar. 1986, pp. 68-88.

Kazutoshi Wakabayashi et al, *Global Scheduling Independent of Control Dependencies Based on Condition Vectors*, Proceedings 29th ACM/IEEE Design Automation Conference, Jun. 8-12, 1992, pp. 112-115.

*HPF Promoting Consortium* (*HPFPC*), [online], Retrieved on Feb. 19, 2008, retrieved from the URL:<http://hpfpc.org/index-E.html>.

Iannucci, R., "A Critique of Multiprocessing con Neumann Style," ACM, 1983, pp. 426-436.

Iwashita, H., "A View of VPP Fortran in Contract with HPF," Journal of IPSJ, Feb. 1997, pp. 114-120, vol. 38, No. 2.

"PVM: Parallel Virtual Machine," Apr. 3, 2007, [online] [Retrieved on Dec. 22, 2008] Retrieved from the internet <URL:http://www.csm.ornl.gov/pvm/>.

Okamoto, M., et al., "A Hierarchical Macro-Dataflow Computation Scheme for OSCAR Multi-grain Compiler," IPSJ, Apr. 1994, p. 513-521, vol. 35 and No. 4.

* cited by examiner

FIG. 2

Program before thread description is added

```
1:   int RandomSignal(){return rand();}
2:   const float coef0 = 0.1, coef1 = -0.21, coef2 = -0.12, coef3 = 0.51;
3:
4:   void main()
5:   {
6:       int sigIn0 = 0, sigIn1 = 0, sigIn2 = 0, sigIn3 = 0, sigOut, t;
7:       for(t = 0; t<signalLength; t++){
8:           sigIn3 = sigIn2;
9:           sigIn2 = sigIn1;
10:          sigIn1 = sigIn0;
11:          sigIn0 = RandomSignal();
12:          sigOut = sigIn3 * coef0 + sigIn2 * coef1
13:                   + sigIn1 * coef2 + sigIn0 * coef3;
14:          printf("in : %6d, out : %6d¥n", sigIn0, sigOut);
15:      }
16:  }
```

FIG. 3

50A Program after thread description is added
(Parallel processing program)

```
1:  int RandomSignal(){return rand();}
2:  const float coef0 = 0.1, coef1 = -0.21, coef2 = -0.12, coef3 = 0.51;
3:
4:  void main()
5:  {
6:      int sigIn0 = 0, sigIn1 = 0, sigIn2 = 0, sigIn3 = 0, sigOut, t;
7:      for(t = 0; t<signalLength; t++){
8:          THREAD(p1){
9:              sigIn3 = sigIn2;
10:             sigOut = sigIn3 * coef0;
11:         }
12:         THREAD(p2){
13:             sigIn2 = sigIn1;
14:             sigOut += sigIn2 * coef1;
15:         }
16:         THREAD(p3){
17:             sigIn1 = sigIn0;
18:             sigOut += sigIn1 * coef2;
19:         }
20:         THREAD(p4){
21:             sigIn0 = RandomSignal();
22:             sigOut += sigIn0 * coef3;
23:         }
24:         THREAD(p5){
25:             printf("in : %6d, out : %6d¥n", sigIn0, sigOut);
26:         }
27:     }
28: }
```

FIG. 7

100A Data dependency edge information

| Data dependency edge | Output data node block name:[thread name] variable name | Input data node block name:[thread name] variable name | Preceding edge | Succeeding edge |
|---|---|---|---|---|
| 1 | A1:[*] sigIn0 | C1:[*] sigIn0 | | 6 |
| 2 | A1:[*] sigIn1 | C1:[*] sigIn1 | | 7 |
| 3 | A1:[*] sigIn2 | C1:[*] sigIn2 | | 8 |
| 4 | A1:[*] t | C1:[*] t | | 5,9 |
| 5 | C1:[*] t | A2:[*] t | 4,21 | |
| 6 | C1:[*] sigIn0 | B1:[*] sigIn0(T) | 1,22 | 15 |
| 7 | C1:[*] sigIn1 | B1:[*] sigIn1(T) | 2,23 | 12 |
| 8 | C1:[*] sigIn2 | B1:[*] sigIn2(T) | 3,24 | 11 |
| 9 | C1:[*] t | B1:[*] t(T) | 4,21 | 20 |
| 10 | A2:[*] $28 | B1:[*] $28 | | |
| 11 | B1:[*] sigIn2(T) | A3:[p1] sigIn2 | 8 | |
| 12 | B1:[*] sigIn1(T) | A4:[p2] sigIn1 | 7 | |
| 13 | A3:[p1] sigOut | A4:[p2] sigOut | | |
| 14 | A4:[p2] sigOut | A5:[p3] sigOut | | |
| 15 | B1:[*] sigIn0(T) | A5:[p3] sigIn0 | 6 | |
| 16 | A5:[p3] sigOut | A6:[p4] sigOut | | |
| 17 | D1:[p4] $38 | A6:[p4] $38 | | |
| 18 | A6:[p4] sigIn0 | D2:[p5] sigIn0 | | |
| 19 | A6:[p4] sigOut | D2:[p5] sigOut | | |
| 20 | B1:[*] t(T) | A7:[*] t | 9 | |
| 21 | A7:[*] t | C1:[*] t | | 5,9 |
| 22 | A6:[p4] sigIn0 | C1:[*] sigIn0 | | 6 |
| 23 | A5:[p3] sigIn1 | C1:[*] sigIn1 | | 7 |
| 24 | A4:[p2] sigIn2 | C1:[*] sigIn2 | | 8 |

FIG. 8

110A Output data generation instruction/
input data reference instruction information

| Data dependency edge | Data generation instruction block name:[thread name] instruction | Data generation instruction symbol | Data reference instruction block name:[thread name] instruction | Data reference instruction symbol |
|---|---|---|---|---|
| 1 | A1:[*] sigIn0 = 0 | 1:DEF | | |
| 2 | A1:[*] sigIn1 = 0 | 2:DEF | | |
| 3 | A1:[*] sigIn2 = 0 | 3:DEF | | |
| 4 | A1:[*] t = 0 | 4:DEF | | |
| 5 | | | A2:[*] $28 := t < signalLength | 5:USE |
| 10 | A2:[*] $28 := t < signalLength | 10:DEF | B1:[*] branch $28 | 10:USE |
| 11 | | | A3:[p1] sigIn3 = sigIn2 | 11:USE |
| 12 | | | A4:[p2] sigIn2 = sigIn1 | 12:USE |
| 13 | A3:[p1] sigOut = $31 | 13:DEF | A4:[p2] sigOut += $34 | 13:USE |
| 14 | A4:[p2] sigOut += $34 | 14:DEF | A5:[p3] sigOut += $37 | 14:USE |
| 15 | | | A5:[p3] sigIn1 = sigIn0 | 15:USE |
| 16 | A5:[p3] sigOut += $37 | 16:DEF | A6:[p4] sigOut += $41 | 16:USE |
| 17 | D1:[p4] $38 = RandomSignal() | 17:DEF | A6:[p4] sigIn0 = $38 | 17:USE |
| 18 | A6:[p4] sigIn0 = $38 | 18:DEF | D2:[p5] $45 := printf (···,sigIn0,sigOut) | 18:USE |
| 19 | A6:[p4] sigOut += $41 | 19:DEF | D2:[p5] $45 := printf (···,sigIn0,sigOut) | 19:USE |
| 20 | | | A7:[*] t ++ | 20:USE |
| 21 | A7:[*] t ++ | 21:DEF | | |
| 22 | A6:[p4] sigIn0 = $38 | 22:DEF | | |
| 23 | A5:[p3] sigIn1 = sigIn0 | 23:DEF | | |
| 24 | A4:[p2] sigIn2 = sigIn1 | 24:DEF | | |

FIG. 9

120A Inter-thread data dependency edge information

| Data dependency edge | Output data node block name:[thread name] variable name | Input data node block name:[thread name] variable name | Preceding edge | Succeeding edge | Inter-thread data dependency edge |
|---|---|---|---|---|---|
| 1 | A1:[*] sigIn0 | C1:[*] sigIn0 | | 6 | |
| 2 | A1:[*] sigIn1 | C1:[*] sigIn1 | | 7 | |
| 3 | A1:[*] sigIn2 | C1:[*] sigIn2 | | 8 | |
| 4 | A1:[*] t | C1:[*] t | | 5,9 | |
| 5 | C1:[*] t | A2:[*] t | 4,21 | | |
| 6 | C1:[*] sigIn0 | B1:[*] sigIn0(T) | 1,22 | 15 | |
| 7 | C1:[*] sigIn1 | B1:[*] sigIn1(T) | 2,23 | 12 | |
| 8 | C1:[*] sigIn2 | B1:[*] sigIn2(T) | 3,24 | 11 | |
| 9 | C1:[*] t | B1:[*] t(T) | 4,21 | 20 | |
| 10 | A2:[*] $28 | B1:[*] $28 | | | |
| 11 | B1:[*] sigIn2(T) | A3:[p1] sigIn2 | 8 | | ○ |
| 12 | B1:[*] sigIn1(T) | A4:[p2] sigIn1 | 7 | | ○ |
| 13 | A3:[p1] sigOut | A4:[p2] sigOut | | | ○ |
| 14 | A4:[p2] sigOut | A5:[p3] sigOut | | | ○ |
| 15 | B1:[*] sigIn0(T) | A5:[p3] sigIn0 | 6 | | ○ |
| 16 | A5:[p3] sigOut | A6:[p4] sigOut | | | ○ |
| 17 | D1:[p4] $38 | A6:[p4] $38 | | | |
| 18 | A6:[p4] sigIn0 | D2:[p5] sigIn0 | | | ○ |
| 19 | A6:[p4] sigOut | D2:[p5] sigOut | | | ○ |
| 20 | B1:[*] t(T) | A7:[*] t | 9 | | |
| 21 | A7:[*] t | C1:[*] t | | 5,9 | |
| 22 | A6:[p4] sigIn0 | C1:[*] sigIn0 | | 6 | ○ |
| 23 | A5:[p3] sigIn1 | C1:[*] sigIn1 | | 7 | ○ |
| 24 | A4:[p2] sigIn2 | C1:[*] sigIn2 | | 8 | ○ |

FIG. 10

Table for explaining method of searching thread output data generation instruction

| Data dependency edge | Preceding edge | Succeeding edge | Data generation instruction symbol | Data reference instruction symbol | Thread output data generation instruction list of thread input data reference instruction |
|---|---|---|---|---|---|
| 1 |  | 6 | 1:DEF |  |  |
| 2 |  | 7 | 2:DEF |  |  |
| 3 |  | 8 | 3:DEF |  |  |
| 4 |  | 5,9 | 4:DEF |  |  |
| 5 | 4,21 |  |  |  |  |
| 6 | 1,22 | 15 |  | 5:USE |  |
| 7 | 2,23 | 12 |  |  |  |
| 8 | 3,24 | 11 |  |  |  |
| 9 | 4,21 | 20 |  |  |  |
| 11 | 8 |  |  | 11:USE | 3:DEF, 24:DEF |
| 12 | 7 |  |  | 12:USE | 2:DEF, 23:DEF |
| 15 | 6 |  |  | 15:USE | 1:DEF, 22:DEF |
| 20 | 9 |  |  | 20:USE |  |
| 21 |  | 5,9 | 21:DEF |  |  |
| 22 |  | 6 | 22:DEF |  |  |
| 23 |  | 7 | 23:DEF |  |  |
| 24 |  | 8 | 24:DEF |  |  |

FIG. 11

130A Inter-thread data dependency instruction pair information

| Data dependency edge | Preceding edge | Succeeding edge | Output data reference instruction | Input data reference instruction | Inter-thread data dependency edge | Thread output data generation instruction list of thread input data reference instruction |
|---|---|---|---|---|---|---|
| 1 | | 6 | 1:DEF | | | |
| 2 | | 7 | 2:DEF | | | |
| 3 | | 8 | 3:DEF | | | |
| 4 | | 5,9 | 4:DEF | | | |
| 5 | 4,21 | | | 5:USE | | |
| 6 | 1,22 | 15 | | | | |
| 7 | 2,23 | 12 | | | | |
| 8 | 3,24 | 11 | | | | |
| 9 | 4,21 | 20 | | | | |
| 10 | | | 10:DEF | 10:USE | | |
| 11 | 8 | | | 11:USE | ○ | 3:DEF, 24:DEF |
| 12 | 7 | | | 12:USE | ○ | 2:DEF, 23:DEF |
| 13 | | | 13:DEF | 13:USE | ○ | 13:DEF |
| 14 | | | 14:DEF | 14:USE | ○ | 14:DEF |
| 15 | 6 | | | 15:USE | ○ | 1:DEF, 22:DEF |
| 16 | | | 16:DEF | 16:USE | ○ | 16:DEF |
| 17 | | | 17:DEF | 17:USE | | |
| 18 | | | 18:DEF | 18:USE | ○ | 18:DEF |
| 19 | | | 19:DEF | 19:USE | ○ | 19:DEF |
| 20 | 9 | | | 20:USE | | |
| 21 | | 5,9 | 21:DEF | | | |
| 22 | | 6 | 22:DEF | | ○ | |
| 23 | | 7 | 23:DEF | | ○ | |
| 24 | | 8 | 24:DEF | | ○ | |

FIG. 18

50B Parallel processing program

```
1:  int a[3];
2:  int i = 1, b = 2, a1, a2;
3:  a[0] = 1;
4:  THREAD(p1){
5:      a[i] = b;
6:  }
7:  THREAD(p2){
8:      a1 = a[i] + 1;
9:      a2 = a[i - 1] - 1;
10: }
11: THREAD(p3){
12:     a[i + 1] = a1 + a2;
13: }
14: printf("a[i + 1] = %d¥n", a[i + 1]);
```

FIG. 20
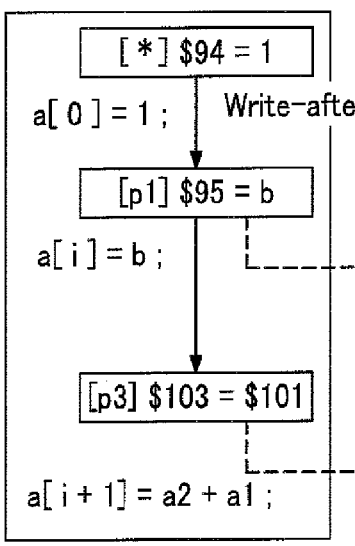
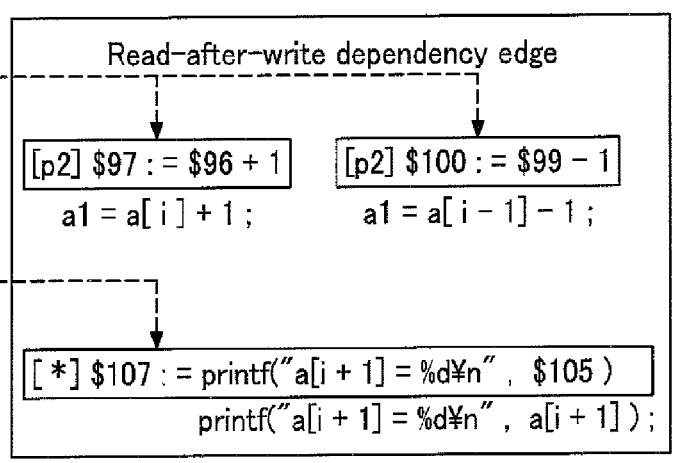

FIG. 21

100B Data dependency edge information

| Data dependency edge | Output data node block name:[thread name] variable name | Input data node block name:[thread name] variable name |
|---|---|---|
| 1 | A11:[*] *a⟨3⟩ | A12:[p1] *a⟨3⟩ |
| 2 | A11:[*] b | A12:[p1] b |
| 3 | A11:[*] i | A12:[p1] i |
| 4 | A11:[*] i | A13:[p2] i |
| 5 | A11:[*] i | A14:[p3] i |
| 6 | A11:[*] i | A15:[*] i |
| 7 | A12:[p1] *a⟨3⟩ | A13:[p2] *a⟨3⟩ |
| 8 | A12:[p1] *a⟨3⟩ | A14:[p3] *a⟨3⟩ |
| 9 | A13:[p2] a1 | A14:[p3] a1 |
| 10 | A13:[p2] a2 | A14:[p3] a2 |
| 11 | A14:[p3] *a⟨3⟩ | A16:[*] *a⟨3⟩ |
| 12 | A15:[*] $105 | A16:[*] $105 |

FIG. 22

110B Output data generation instruction/input data reference instruction information

| Data dependency edge | Data generation instruction block name:[thread name] instruction | Data generation instruction symbol | Data reference instruction block name:[thread name] instruction | Data reference instruction symbol |
|---|---|---|---|---|
| 1 | A11:[*] $94 = 1 | 1:DEF | A12:[p1] $95 = b | 1:USE |
| 2 | A11:[*] b = 2 | 2:DEF | A12:[p1] $95 = b | 2:USE |
| 3 | A11:[*] i = 1 | 3:DEF | A12:[p1] $95 := a[ i ] | 3:USE |
| 4 | A11:[*] i = 1 | 4:DEF | A13:[p2] $96 := a[ i ] | 4:USE |
| 5 | A11:[*] i = 1 | 5:DEF | A14:[p3] $102 := i + 1 | 5:USE |
| 6 | A11:[*] i = 1 | 6:DEF | A15:[*] $104 := i + 1 | 6:USE |
| 7 | A12:[p1] $95 = b | 7:DEF | A13:[p2] $97 := $96 + 1 | 7:USE |
| 8 | A12:[p1] $95 = b | 8:DEF | A14:[p3] $103 = $101 | 8:USE |
| 9 | A13:[p2] a1 = $97 | 9:DEF | A14:[p3] $101 := a1 + a2 | 9:USE |
| 10 | A13:[p2] a2 = $100 | 10:DEF | A14:[p3] $101 := a1 + a2 | 10:USE |
| 11 | A14:[p3] $103 = $101 | 11:DEF | A16:[*] $107 := printf("...",$105) | 11:USE |
| 12 | A15:[*] $105 := a[$104] | 12:DEF | A16:[*] $107 := printf("...",$105) | 12:USE |

FIG. 24

50C Parallel processing program

```
1:  int a[3];
2:  int i = 1, b = 2, a1, a2;
3:  int *pa = a + i;
4:  int *paa = pa + 1;
5:  int *pa1 = &a1;
6:  a[0] = 1;
7:  THREAD(p1){
8:      *pa = b;
9:  }
10: THREAD(p2){
11:     *pa1 = a[i] + 1;
12:     a2 = a[i - 1] - 1;
13: }
14: THREAD(p3){
15:     *paa = a1 + a2;
16: }
17: printf("a[i + 1] = %d¥n", a[i + 1]);
```

FIG. 26

100C Data dependency edge information

| Data dependency edge | Output data node block name:[thread name] variable name | Input data node block name:[thread name] variable name |
|---|---|---|
| 1 | A21:[*] *a⟨3⟩ | A22:[p1] *pa |
| 2 | A21:[*] a1 | A23:[p2] *pa1 |
| 3 | A21:[*] b | A22:[p1] b |
| 4 | A21:[*] i | A23:[p2] i |
| 5 | A21:[*] i | A25:[*] i |
| 6 | A21:[*] pa1 | A23:[p2] pa1 |
| 7 | A21:[*] paa | A24:[p3] paa |
| 8 | A21:[*] pa | A22:[p1] pa |
| 9 | A22:[p1] *pa | A23:[p2] *a⟨3⟩ |
| 10 | A22:[p1] *pa | A24:[p3] *paa |
| 11 | A23:[p2] *pa1 | A24:[p3] a1 |
| 12 | A23:[p2] a2 | A24:[p3] a2 |
| 13 | A24:[p3] *paa | A26:[*] *a⟨3⟩ |
| 14 | A25:[*] $128 | A26:[*] $128 |

FIG. 27

110C Output data generation instruction/input data reference instruction information

| Data dependency edge | Data generation instruction block name:[thread name] instruction | Data generation instruction symbol | Data reference instruction block name:[thread name] instruction | Data reference instruction symbol |
|---|---|---|---|---|
| 1 | A21:[*] $117 = 1 | 1:DEF | A22:[p1] $118 = b | 1:USE |
| 2 | A21:[*] a1 : declared | 2:DEF | A23:[p2] $121 = $120 | 2:USE |
| 3 | A21:[*] b = 2 | 3:DEF | A22:[p1] $118 = b | 3:USE |
| 4 | A21:[*] i = 1 | 4:DEF | A23:[p2] $119 := a[ i ] | 4:USE |
| 5 | A21:[*] i = 1 | 5:DEF | A24:[p3] $127 := i + 1 | 5:USE |
| 6 | A21:[*] pa1 = $116 | 6:DEF | A23:[p2] $121 := *pa1 | 6:USE |
| 7 | A21:[*] paa = $114 | 7:DEF | A24:[p3] $126 := *paa | 7:USE |
| 8 | A21:[*] pa = $112 | 8:DEF | A22:[p1] $118 := *pa | 8:USE |
| 9 | A22:[p1] $118 = b | 9:DEF | A23:[p2] $120 := $119 + 1 | 9:USE |
| 10 | A22:[p1] $118 = b | 10:DEF | A24:[p3] $126 = $125 | 10:USE |
| 11 | A23:[p2] $121 = $120 | 11:DEF | A24:[p3] $125 := a1 + a2 | 11:USE |
| 12 | A23:[p2] a2 = $124 | 12:DEF | A24:[p3] $125 := a1 + a2 | 12:USE |
| 13 | A24:[p3] $126 = $125 | 13:DEF | A26:[*] $130 := printf("...",$128) | 13:USE |
| 14 | A25:[*] $128 := a[$127] | 14:DEF | A26:[*] $130 := printf("...",$128) | 14:USE |

FIG. 28

50D Parallel processing program

```
 1:   void PointerTest()
 2:   {
 3:       int a[10], b[10], c[20], *p;
 4:       GetData(a);
 5:       GetData(b);
 6:       p = c + 5;
 7:       GetData(p);
 8:       p = b;
 9:       GetData(p);
10:   }
11:
12:   void GetData(int * aa)
13:   {
14:       int i;
15:       THREAD(p0){
16:           for(i = 0; i < 10; i ++)
17:               *(aa ++) = GetData2();
18:       }
19:   }
```

PROGRAM PROCESSING DEVICE, PARALLEL PROCESSING PROGRAM, PROGRAM PROCESSING METHOD, PARALLEL PROCESSING COMPILER, RECORDING MEDIUM CONTAINING THE PARALLEL PROCESSING COMPILER, AND MULTI-PROCESSOR SYSTEM

This application is the National Stage of International Application No. PCT/JP2007/50470, filed Jan. 16, 2007, which claims priority to Japan Patent application No. 2006-008870, filed Jan. 17, 2006 which is incorporated by reference in its entirety.

CROSS REFERENCE TO RELATED APPLICATIONS

This application claims the benefit of Japanese Patent Application No. 2006-008870 filed on Jan. 17, 2006, the disclosure of which is incorporated herein by reference.

BACKGROUND OF THE INVENTION

1. Field of the Invention

The present invention relates to a program development and a multi-processor configuration technique to provide a parallel processing system, and, more specifically, to a technique for a compiler and an execution system to provide the parallel processing system.

2. Description of the Related Art

There are two major program development techniques for providing a parallel processing system. One is a technique for providing a development environment based on an automatic parallel compiler of a sequential program (an automatic parallel compiler technique). The other is a technique for providing a development environment based on a parallel processing language, which is extended from a sequential processing language (a parallel processing language technique).

One automatic parallel compiler technique is an automatic parallel compiler technique for a multiprocessor (see non-patent documents 1, 2 and 3). The automatic parallel compiler technique is a technique of automatically generating a parallel processing program from a sequential program described in a high-level programming language (typically, in Fortran or C language). More specifically, a sequential program is parallelized through loop parallelization, in which a loop (a sequence of portions to be processed repeatedly) is divided, and the divided portions of the loop are parallelly executed by different processors, or through block parallelization, in which parallelly-executable portions are parallelly executed by different processors.

Another automatic parallel compiler technique is an instruction level parallel compiler technique (see, for example, non-patent documents 4 and 5). In the instruction level parallel compiler technique, an execution code for a VLIW (Very Long Instruction Word) processor (which has a plurality of computing units) is automatically generated from a sequential program described in a high-level programming language (typically, in C language) or a similar language. The execution code, also called a horizontal instruction code, has a single execution instruction, in which execution instructions for all of the computing units are buried. The VLIW is a technique of speeding up operations of a microprocessor, in which a plurality of instructions not dependent on one another are made into a single instruction, and are executed practically simultaneously, when the single instruction is executed.

One parallel processing language technique is a parallel programming language (see, for example, non-patent documents 6, 7 and 8). The parallel programming language is a language for directly describing a parallel processing program for a multiprocessor. The parallel programming language is based on a high-level programming language, and is extended therefrom for explicitly describing a parallel execution loop or a parallel execution block. A large number of parallel programming languages have been proposed so far. Non-patent documents 6, 7 and 8 explain VPP Fortran, HPF (High Performance Fortran), and Concurrent C, respectively.

Another parallel processing language technique is a message passing programming technique (see, for example, non-patent documents 9 and 10). In the message passing programming technique, a parallel programming environment (such as MPI: Message Passing Interface□ and PVM□Parallel Virtual Machine□, in which message passing functions between processors are created into a library is provided to a high-level programming language (typically, Fortran or C language). In the message passing programming technique, a program is parallelly executed in a plurality of PCs (Personal Computers) and work stations connected via a network. The message passing programming technique is also used for developing a parallel execution program for a distributed memory multi-processor system or a shared memory multiprocessor system. Non-patent documents 9 and 10 explain MPI (Message Passing Interface) and PVM (Parallel Virtual Machine), respectively.

There are three major types of the multi-processor configuration technique for providing a parallel processing system; a Neumann-type program-driven control method, a data flow machine-type data-driven control method, and a hybrid data flow machine-type control method (a fusion architecture). The latter is a technique integrating the two formers.

The Neumann-type program-driven control method sequentially reads out a program stored in a memory using a program counter, and executes the program (see, for example, non-patent documents 11 and 12). Multi-processor systems which have already been practically used are typically equipped with Neumann-type processors. The Neumann-type program-driven control method has a program in which a data transfer instruction, a data reception instruction, a synchronization processing instruction, and the like, which are required by the Neumann-type processors, are buried. The Neumann-type program-driven control method executes instructions read out by the processors sequentially.

The data flow machine-type data-driven control method executes instructions sequentially, starting from an instruction of which reference data (input data) has been completely generated and become executable (see, for example, non-patent documents 13 to 16).

The hybrid data flow machine-type control method has a data flow processing unit of an instruction block, which is an aggregate of plural instructions. The control method controls a synchronization instruction between instruction blocks with a data drive, and controls a processing in an instruction block with a program drive. More specifically, the control method executes execution programs and data transfer instructions of each processor with a program-driven control. The control method executes a data reception instruction and a synchronization instruction not with a program-driven control but with a mechanism which secures a dependency between a data communication between processors, and an instruction which references a data in the data communication (that is, a mechanism which suspends execution of an instruction until the instruction which references an external data actually receives the external data) (see, for example, non-patent document 17). For example, a hybrid data flow machine is proposed in Category of Table 1 on page 30 of non-patent document 17, in Macro-dataflow and Hybrid.

Non-patent document 1: Okamoto, Aida, Miyazawa, Honda, Kasahara, "Hierarchical Macro Dataflow Processing in OSCAR Multigrain Compiler", Journal of Information Processing Society of Japan, Vol. 35, No. 4, pp. 513-521 (1994)

Non-patent document 2: Eigenmann, Hoeflinger, Padua, "On the Automatic Parallelization of the Perfect Benchmarks", IEEE Trans. on Parallel and Distributed Systems, Vol. 9, No. 1, pp. 5-21 (1998)

Non-patent document 3: Hall, Anderson, Amarasinghe, Murphy, Liao, Bugnion, Lam, "Maximizing Multiprocessor Performance with the SUIF Compiler", IEEE Computer, Vol. 29, No. 12, pp. 84-89 (1996)

Non-patent document 4: Fisher, "Trace scheduling: A Technique for global Microcode Compaction", IEEE Trans. Computers, Vol. 30, No. 7, pp. 478-490 (1981)

Non-patent document 5: Wakabayashi, Tanaka, "Global Scheduling Independent of Control Dependencies Based on Condition Vectors", Proceedings of 29th ACM/IEEE Conference on Design Automation, pp. 112-115 (1992)

Non-patent document 6: Iwashita, "VPP Fortran from Viewpoint of HPF", Information Processing, Vol. 38, No. 2, pp. 114-121 (February 1997)

Non-patent document 7: "HPF Promotion Council (HPFPC)", [online], [searched on Aug. 10, 2005], Internet <URL: http://www.hpfpc.org/>

Non-patent document 8: Gehani, et al, "Concurrent C", Software, Practice and Experience, Vol. 16, No. 9, pp. 821-844 (1986)

Non-patent document 9: "Message Passing Interface Forum", [online], [searched on Aug. 10, 2005], Internet <URL: http://www.mpi-forum.org/index.html>

Non-patent document 10: "PVM", [online], [searched on Aug. 10, 2005], Internet <URL:http://www.csm.ornl.gov/pvm/pvm_home.html>

Non-patent document 11: Hennessy, Patterson, "Computer Architecture: A Quantitative Approach", Morgan Kaufman, San Mateo (1990)

Non-patent document 12: Kai Hwang, "Advanced Computer Architecture with Parallel Programming", McGraw-Hill (1993)

Non-patent document 13: Arvind, Iannucci, "A Critique of multiprocessing von Neumann style", Proceedings of 10th Annual Symposium on Computer Architecture (1983)

Non-patent document 14: Srini, "An Architectural Comparison of Dataflow Systems", IEEE Computer, Vol 19, No. 3, pp. 68-88 (1986)

Non-patent document 15: Arvind, Nikhil, "Executing a Program on the MIT Tagged-Token Dataflow Architecture", IEEE Trans. Computer, Vol. 39, pp. 300-318 (1990)

Non-patent document 16: Kodama, Sakai, Yamaguchi, "Principle of Operation and Implementation of Data-driven Single Chip Processor EMC-R", Journal of Information Processing Society of Japan, Vol. 32, No. 7 (1991)

Non-patent document 17: Ben Lee, Ali R. Hurson: "Dataflow Architectures and Multithreading", IEEE Computer, Volume 27, Number 8, pp. 27-39 (1994□

The above-described automatic parallel compiler technique can automatically generate a parallel processing program from a sequential program. However, the automatic parallel compiler technique is not suitable for flexibly changing its program partitioning method or its allocating method of partitioned programs to processors. This means that a programmer cannot directly deal with program partition or processor allocation. Another problem is that, a field of application of the automatic parallel compiler technique is still limited, although the automatic parallel compiler technique has been increasingly applied to CMP (Chip Multi Processor) for use as a server, especially to scientific computing in which computing load is heavy. For example, the automatic parallel compiler technique is not applicable to a system LSI (Large Scale Integration). The CMP is a technique of integrating plural processors into a single chip, and connecting the processors with a shared bus.

The instruction-level parallel compiler is applied to designing of a dedicated IC (Integrated Circuit). The instruction-level parallel compiler is practical but provides a relatively-low parallelism. That is, the instruction-level parallel compiler is not applicable to a parallel processing system having a relatively-high parallelism.

The parallel processing language is intended to be used in a specific field such as science and technology. In other words, the parallel processing language is used in a limited field, and is not applicable to a wide range of fields.

The message passing programming technique is used in upstream designing of the system LSI. However, the message passing programming technique has poor efficiency in developing a program, because a program for each processor has to be developed, and a communication instruction has to be explicitly described in the message passing programming technique. That is, debugging of a program is difficult, and tuning such as changing assignment of processors is also difficult.

In light of the above-mentioned, the inventors have developed a technique of generating an execution code with which a multi-processor system can execute a high-performance parallel processing, just by adding a simple description to a sequential program by a programmer or the like. When the execution code is actually applied to a multi-processor system, it is required to develop a means of generating an execution code with which the multi-processor system appropriately performs communication processings of a pointer and a pointer reference data.

The hybrid data flow machine-type control method ensures a data dependency (to observe an execution order of an instruction of generating a data and that of referencing the data) by a program control. That is, a data transfer instruction, a data reception instruction, a synchronization processing instruction are executed by software, and the instructions need to be executed one after the other by each processor. Thus, a time necessary for such processings results in a major bottleneck in performing a parallel processing.

The distributed memory multiprocessor system can achieve a higher-level parallelism than the shared memory multiprocessor, because the distributed memory multiprocessor system is free of an access conflict to a shared memory. However, in the distributed memory multiprocessor system, a pointer data and a pointer reference data are not shared between processors, because memory spaces for the processors are separated from each other. This is a large restriction in developing a parallel processing program.

The data flow machine-type data-driven control method sequentially executes instructions, starting from an instruction which has become executable, and can provide a high-level parallelism in theory. However, the data flow machine-type data-driven control method requires a mechanism of controlling an instruction which has become executable, and a mechanism of assigning the executable instruction to one of plural processors. This makes a hardware configuration for the method complicated. Moreover, the data flow machine-type data-driven control method requires a programming language dedicated to a data flow machine and a compiler dedicated to the programming language, so as to create an execution program. This is a large restriction in developing a program, and makes it difficult for the data flow machine-type data-driven control method to be put into practical use.

The hybrid data flow machine-type control method controls a synchronization instruction between instruction blocks with a data drive, and thus requires a smaller amount of time for a parallel processing than the Neumann-type program-driven control method. Further, the hybrid data flow machine-type control method controls a processing in an instruction block with a program drive, and thus requires a smaller amount of overhead of a processing for controlling an executable instruction than the data flow machine-type data-driven control method. However, in the hybrid data flow machine-type control method, a start-up of an instruction block to be executed by controlling with a program drive is performed with a data-driven control method (in which an instruction block to be started up is specified in a communicated data). This makes a complicated hardware mechanism of a data flow machine indispensable. Further, in the hybrid data flow machine-type control method, an external data to be referenced in an instruction block needs to be ready, before the instruction block is started up. Thus, a waiting time is needed to start up the instruction block, which causes a delay time in communications between processors.

The present invention has been made in light of the above-mentioned problems, and is directed to generating an execution code with which a multi-processor system can execute a high-performance parallel processing, just by adding a simple description to a sequential program by a programmer or the like, and also to generating an execution code which can be applied to perform a communication processing of a pointer and that of a pointer reference data. The present invention is also directed to, when a parallel processing is performed using a multi-processor, eliminating a need of a complicated hardware configuration, reducing a delay time to be generated in communications between processors, and facilitating development of a high-performance multi-processor system. The present invention is also directed to enabling sharing of a pointer data and a pointer reference data between processors which have different memory spaces, and providing a large flexibility in developing a parallel processing program.

SUMMARY OF THE INVENTION

According to Claim 1 of the present invention, a program processing device inputs therein a parallel processing program with a thread description added thereto; partitions the program into threads; and generates execution codes for a multi-processor system having a plurality of processors, using the threads. The program processing device includes a storage unit; and a processing unit. The processing unit includes:

a syntax analysis unit for identifying a starting point and an end point of each thread in the parallel processing program inputted in the storage unit, using a reserved keyword or a symbol; and generating an intermediate language, in which a thread attribute of the each thread is added to each operation instruction included in a thread area specified by the starting point and the end point;

a data dependency extraction unit for inputting therein the intermediate language; extracting an instruction block input/output data from the intermediate language; and generating, based on the instruction block input/output data, single data dependency edge information including information on a single data dependency, which is a dependency of a data generated or referenced by a single operation instruction, information on a data structure dependency, which is a dependency of a data between instructions acting on the data structure, and information on a pointer alias data dependency, which is a dependency of a data between instructions acting on a pointer reference data;

an inter-thread data dependency extraction unit for inputting therein the intermediate language and the data dependency edge information; extracting, from the intermediate language, an data dependency edge for connecting a thread with another thread, and a thread output data generation instruction and a thread input reference instruction each corresponding to the data dependency edge, based on the data dependency edge information; and generating inter-thread data dependent instruction pair information;

a pointer communication auxiliary instruction generation unit for inputting therein the intermediate language; extracting a pointer data from the data dependency edge for connecting between different threads; inserting a pointer alias ID computing instruction just prior to an instruction for defining the pointer data of the intermediate language; and generating a first program;

an inter-thread data communication instruction insertion unit for inputting therein the first program and the inter-thread data dependent instruction pair information; inserting an inter-thread data transfer instruction just subsequent to the thread output data generation instruction in the first program, based on the inter-thread data dependent instruction pair information; inserting an inter-thread data reception synchronization instruction just prior to the thread input data reference instruction in the first program, based on the inter-thread data dependent instruction pair information; inserting a thread start-up instruction at a branch instruction, on which a thread of interest is control-dependent, or at a function entrance; and generating a second program; and a program partition/code generation unit for inputting therein the second program; partitioning the second program into threads, based on the thread attribute of each instruction; and converting the each thread into an execution code.

In the above configuration, the syntax analysis unit can generate the intermediate language, in which the thread attribute is added to each operation instruction included in the thread area, from the parallel processing program with the thread description added thereto. The data dependency extraction unit can extract the instruction block input/output data from the intermediate language generated by the syntax analysis unit; and generate the single data dependency edge information including information on a single data dependency, which is the dependency of a data generated or referenced by a single operation instruction, the information on a data structure dependency, which is the dependency of a data between instructions acting on the data structure, and the information on a pointer alias data dependency, which is the dependency of a data between instructions acting on a pointer reference data. The inter-thread data dependency extraction unit can extract the data dependency edge for connecting a thread with another thread, and the thread output data generation instruction and the thread input reference instruction each corresponding to the data dependency edge, from the intermediate language generated by the syntax analysis unit, based on the data dependency edge information; and generate the inter-thread data dependent instruction pair information. The pointer communication auxiliary instruction generation unit can extract the pointer data from the data dependency edge for connecting between different threads; insert the pointer alias ID computing instruction just prior to the instruction for defining the pointer data of the intermediate language; and generate the first program. The inter-thread data communication instruction unit can insert the inter-thread data transfer instruction just subsequent to the thread output data generation instruction in the first program, based on the inter-thread data dependent instruction pair information; insert the inter-thread data reception synchronization instruction just prior to the thread input data reference instruction in the first program, based on the inter-thread data dependent instruction pair information; insert the thread start-up instruction at a branch instruction, on which a thread of interest is control-dependent, or at a function entrance; and generate the second program. The program partition/code generation unit can partition the second program into threads, based on the thread attribute of each instruction; and convert the each thread into an execution code. Thus, an execution code for performing a high-performance parallel processing by a multi-processor system can be generated, just by adding a simple description to a sequential program by an operator or the like, even when communication processings of a pointer and a pointer reference data are performed.

According to Claim 2 of the present invention, a parallel processing program is inputted in the storage unit of the program processing device according to Claim 1. The processing unit of the program processing device identifies the starting point and the end point of a processing performed by each thread using a keyword or a symbol described and reserved in the parallel processing program; adds the thread attribute of the each thread to each operation instruction included in the thread area specified by the identified starting point and end point; partitions the program into processings performed by the each thread, based on the thread attribute; and converts the each thread into an execution code.

In the above configuration, the processing unit of the program processing device can identify the starting point and the end point of each thread using a keyword or a symbol described and reserved in the parallel processing program; add the thread attribute to each operation instruction included in the thread area specified by the identified starting point and end point; partitions the program into processings performed by the each thread, based on the thread attribute; and convert the each thread into an execution code. Thus, by inputting the parallel processing program, the program processing device can generate the execution code for performing a high-performance parallel processing by a multi-processor system, even when communication processings of a pointer and a pointer reference data are performed.

According to Claim 3 of the present invention, a parallel processing method is performed by a program processing device for inputting therein a parallel processing program with a thread description added thereto; partitioning the program into threads; and generating execution codes for a multi-processor system having a plurality of processors, using the threads. The program processing device includes a storage unit; and a processing unit. The program processing method performed by the processing unit including the steps of:

identifying a starting point and an end point of each thread in the parallel processing program inputted in the storage unit, using a reserved keyword or a symbol; and generating an intermediate language, in which a thread attribute of the each thread is added to each operation instruction included in a thread area specified by the starting point and the end point;

inputting the intermediate language; extracting an instruction block input/output data from the intermediate language; and generating, based on the instruction block input/output data, data dependency edge information including information on a single data dependency, which is a dependency of a data generated or referenced by a single operation instruction, information on a data structure dependency, which is a dependency of a data between instructions acting on the data structure, and information on a pointer alias data dependency, which is a dependency of a data between instructions acting on a pointer reference data;

inputting the intermediate language and the data dependency edge information; extracting, from the intermediate language, an data dependency edge for connecting a thread with another thread, and a thread output data generation instruction and a thread input reference instruction each corresponding to the data dependency edge, based on the data dependency edge information; and generating inter-thread data dependent instruction pair information;

inputting the intermediate language; extracting a pointer data from the data dependency edge for connecting between different threads; inserting a pointer alias ID computing instruction just prior to an instruction for defining the pointer data of the intermediate language; and generating a first program;

inputting the first program and the inter-thread data dependent instruction pair information; inserting an inter-thread data transfer instruction just subsequent to the thread output data generation instruction in the first program, based on the inter-thread data dependent instruction pair information; inserting an inter-thread data reception synchronization instruction just prior to the thread input data reference instruction in the first program, based on the inter-thread data dependent instruction pair information; inserting a thread start-up instruction at a branch instruction, on which a thread of interest is control-dependent, or at a function entrance; and generating a second program; and inputting the second program; partitioning the second program into threads, based on the thread attribute of each instruction; and converting the each thread into an execution code.

In the above configuration, the processing unit of the program processing device can generate the intermediate language, in which the thread attribute is added to each operation instruction included in the thread area. The processing unit of the program processing device can extract the instruction block input/output data from the intermediate language; and generate, based on the instruction block input/output data, the data dependency edge information including information on a single data dependency, which is the dependency of a data generated or referenced by a single operation instruction, the information on a data structure dependency, which is the dependency of a data between instructions acting on the data structure, and the information on a pointer alias data dependency, which is the dependency of a data between instructions acting on a pointer reference data. The processing unit of the program processing device can extract the data dependency edge for connecting a thread with another thread, and the thread output data generation instruction and the thread input reference instruction each corresponding to the data dependency edge, from the intermediate language, based on the data dependency edge information; and generating inter-thread data dependent instruction pair information. The processing unit of the program processing device can extract the pointer data from the data dependency edge for connecting between different threads; insert the pointer alias ID computing instruction just prior to an instruction for defining the pointer data of the intermediate language; and generate the first program. The processing unit of the program processing device can insert the inter-thread data transfer instruction just subsequent to the thread output data generation instruction in the first program, based on the inter-thread data dependent instruction pair information; insert the inter-thread data reception synchronization instruction just prior to the thread input data reference instruction in the first program, based on the inter-thread data dependent instruction pair information; insert the thread start-up instruction at a branch instruction, on which a thread of interest is control-dependent, or at a function entrance; and generate the second program. The processing unit of the program processing device can partition the second program into threads, based on the thread attribute of each instruction; and convert the each thread into the execution code. Thus, by executing the parallel processing method, the program processing device can input the parallel processing program with a thread description added thereto, and generate the execution code for performing the high-performance parallel processing by a multi-processor system, even when communication processings of a pointer and a pointer reference data are performed.

According to Claim 4 of the present invention, the parallel processing compiler makes a computer execute the program processing method according to Claim 3.

In the above configuration, the parallel processing compiler can make a computer execute the program processing method. Thus, by incorporating the parallel processing compiler into the computer and making the computer execute the parallel processing method, the execution code can be generated for performing a high-performance parallel processing by the multi-processor system, by inputting the program processing program with the thread description added thereto into the computer, even when communication processings of a pointer and a pointer reference data are performed.

According to Claim 5 of the present invention, a recording medium contains the parallel processing compiler according to Claim 4.

In the above configuration, by incorporating the parallel processing compiler stored in the recording medium into the computer and making the computer execute the parallel processing method, the execution code can be generated for performing a high-performance parallel processing by the multi-processor system, by inputting the program processing program with the thread description added thereto into the computer, even when communication processings of a pointer and a pointer reference data are performed.

According to Claim 6 of the present invention, a multi-processor system having a plurality of processors performs a processing based on execution codes generated by using threads, which are partitioned from a parallel processing program by the program processing device according to Claim 1. The multi-processor system includes, for each of a plurality of the processors: a storage unit; and a processing unit. The processing unit includes: an inter-processor communication processing unit for performing control between the processors in a data flow machine-type data-driven control method; and an in-processor processing unit for performing control between the processors in a Neumann-type program-driven control method. The inter-processor communication processing unit performs a communication between the processors in synchronization with the in-processor processing unit, and detecting a communication data hazard between the processors. The in-processor processing unit performs a processing based on the execution codes stored in the storage unit, and executes or suspends the execution codes according to a result of detecting the data hazard.

In the above configuration, the multi-processor system executes a processing based on the execution code containing a communication instruction generated by the program processing device. Therefore, the inter-processor communication processing unit, which performs a processing in a data flow machine-type data-driven control method, does not need to specify an instruction block to be started in a communicated data, and also does not need to have a complicated hardware configuration. Further, although the inter-processor communication processing unit and the in-processor processing unit are separate and different components, detection of a data communication hazard in the inter-processor communication processing unit, and control of executing or suspending a processing in the in-processor processing unit can be closely synchronized in the multi-processor system, which can reduce a delay time generated in a communication between the processors. Further, the inter-processor communication processing unit has all of the functions required in the multi-processor system, such as a data transfer and reception and a synchronization processing. Therefore, development of a program for a unit performing a processing in a program control method (an in-processor processing unit) is facilitated, and development of a high-performance multi-processor system is also facilitated.

According to Claim 7 of the present invention, in the multi-processor system according to Claim 6:

the storage unit stores therein a data communication port table for holding port information, the port information includes a data size, a data storage address, a transfer port ID each for performing an inter-processor communication of a direct access-type data, a pointer reference data, and a pointer data, and, additionally, port alias information for performing an inter-processor communication of the pointer reference data and the pointer data, the port alias information includes information on a pointer alias including a data size, a data storage address, and an alias ID for each of all data objects to be referenced by a pointer, if an inter-processor communication of a direct access-type data is performed, the inter-processor communication processing unit of a first processor on a transfer side obtaining the port information of the direct access-type data; identifying, using the data storage address in the port information, a data storage address of the direct access-type data stored in the storage unit of the first processor on the transfer side; and transferring a data having the identified data storage address and the transfer port ID to a second processor on a receive side, and the inter-processor communication processing unit of the second processor on the receive side identifying a data storage address of the received data, which is stored in the storage unit of the second processor on the receive side, using the received transfer port ID; and storing the received data into the identified data storage address, if an inter-processor communication of a pointer reference data is performed, the inter-processor communication processing unit of the first processor on the transfer side obtaining the port alias information of the pointer reference data; identifying a data storage address of a data object referenced by a pointer of the pointer reference data, stored in the storage unit of the first processor on the transfer side, using the port alias information; and transferring the transfer port ID, an alias ID of the pointer reference data, and all data objects referenced by the pointer, to the second processor on the receive side, and the inter-processor communication processing unit of the second processor on the receive side identifying a data storage address of each of the data objects, stored in the storage unit of the second processor on the receive side, using the received transfer port ID and the alias ID; and storing the received data objects into the respective identified data storage addresses, and if an inter-processor communication of a pointer data is performed, the inter-processor communication processing unit of the first processor on the transfer side obtaining the port alias information of a pointer of interest; identifying a data storage address of a data object referenced by a pointer of the pointer data, and stored in the storage unit of the first processor on the transfer side, using the port alias information; and computing a pointer offset value by subtracting the data storage address from a value of the pointer; and transferring the transfer port ID, the alias ID of the pointer, and the pointer offset value to the second processor on the receive side, and the inter-processor communication processing unit of the second processor on the receive side identifying a data storage address of a data object stored in the storage unit of the second processor on the receive side, using the received transfer port ID and the alias ID; computing a pointer value, which is valid in the storage unit of the second processor on the receive side, by adding the data storage address to the received pointer offset value; and storing the pointer value into the storage unit of the second processor on the receive side.

In the above configuration, the inter-processor communication processing unit has the port alias information. This enables the processors having different memory spaces to share a pointer data or a pointer reference data, which can provide large flexibility in developing a parallel processing program.

According to Claim 8 of the present invention, in the multi-processor system according to Claim 6 or 7, if an inter-thread data reception synchronization instruction is executed, which is inserted by the program processing device, just prior to an instruction of firstly referencing an external data, the in-processor processing unit transfers reception port information of a data of interest included in the inter-thread data reception synchronization instruction to the inter-processor communication processing unit; and the inter-processor communication processing unit detects a reception state of the data using the reception port information; and, if the data has not yet been received, suspends execution of a processing in the in-processor processing unit.

In the above configuration, the inter-processor communication processing unit can instantly detect a reception state of each data transferred from other processors; and, if a necessary data has not yet been received, can immediately suspend execution of a processing in the in-processor processing unit. This allows execution of a processing performed in the in-processor processing unit to start, before all external data to be referenced in an instruction block are received, which can drastically reduce a data waiting time.

According to the program processing device in Claim 1, an execution code for performing a high-performance parallel processing by a multi-processor system can be generated, by inputting the parallel processing program with a thread description added thereto, even when communication processings of a pointer and a pointer reference data are performed. Thus, the execution code for performing a high-performance parallel processing by a multi-processor system can be generated, just by adding a simple description to a sequential program by an operator or the like, even when communication processings of a pointer and a pointer reference data are performed.

According to the program processing program in Claim 2, by inputting the parallel processing program into the parallel processing device, the program processing device can convert the parallel processing program into the execution codes for making the multi-processor system execute the high-performance parallel processing, even when communication processings of a pointer and a pointer reference data are performed.

According to the program processing method in Claim 3, by executing the parallel processing method, the program processing device can input the parallel processing program with a thread description added thereto, and generate the execution codes for performing the high-performance parallel processing in a multi-processor system, even when communication processings of a pointer and a pointer reference data are performed. Thus, just by adding a simple description to a sequential program by a programmer or the like, the execution code for performing the high-performance parallel processing by the multi-processor system can be generated, even when communication processings of a pointer and a pointer reference data are performed.

According to the parallel processing compiler in Claim 4, by incorporating the parallel processing compiler into a computer and making the computer execute the program processing method, the computer can input therein the program processing program with the thread description added thereto and generate the execution codes for performing a high-performance parallel processing in the multi-processor system, even when communication processings of a pointer and a pointer reference data are performed. Thus, the execution code for performing the high-performance parallel processing by the multi-processor system can be generated, just by adding a simple description to a sequential program by a programmer or the like, even when communication processings of a pointer and a pointer reference data are performed.

According to the recording medium in Claim 5, by incorporating the parallel processing compiler stored in the recording medium into the computer and making the computer execute the parallel processing method, the execution codes for performing a high-performance parallel processing in the multi-processor system can be generated, by inputting the program processing program with the thread description added thereto into the computer, even when communication processings of a pointer and a pointer reference data are performed. Thus, the execution codes for performing a high-performance parallel processing in the multi-processor system can be generated, just by adding a simple description to a sequential program by a programmer or the like, even when communication processings of a pointer and a pointer reference data are performed.

According to the multi-processor system in Claim 6, when a parallel processing is performed using the multi-processor system, a complicated hardware configuration is not necessary, a delay time to be generated in communications between the processors is reduced, and development of a high-performance multi-processor system is facilitated.

According to the multi-processor system in Claim 7, a pointer data and a pointer reference data can be shared between the processors having different memory spaces, and a large flexibility in developing the parallel processing program can be provided.

According to the multi-processor system in Claim 8, a data waiting time can be drastically reduced.

BRIEF DESCRIPTION OF THE DRAWINGS

FIG. 2 is an example of a program before a thread description is added according to the first embodiment.

FIG. 3 is an example of a program after a thread description is added (a parallel processing program) according to the first embodiment.

FIG. 7 is a table showing data dependency edge information according to the first embodiment.

FIG. 8 is a table showing output data generation instruction/input data reference instruction information according to the first embodiment.

FIG. 9 is a table showing inter-thread data dependency edge instruction information.

FIG. 10 is a table for explaining a method of searching a thread output data generation instruction according to the first embodiment.

FIG. 11 is a table showing inter-thread data dependency instruction pair information according to the first embodiment.

FIG. 18 is a view showing an example of a parallel processing program according to the second embodiment.

FIG. 20 is a view for explaining a dependency of a data structure according to the second embodiment.

FIG. 21 is a table showing data dependency edge information according to the second embodiment.

FIG. 22 is a table showing output data generation instruction/input data reference instruction information according to the second embodiment.

FIG. 24 is an example of a parallel processing program according to the third embodiment.

FIG. 26 is a table showing data dependency edge information according to the third embodiment.

FIG. 27 is a table showing output data generation instruction/input data reference instruction information according to the third embodiment.

FIG. 28 is an example of a parallel processing program according to the third embodiment.

Figure 1:
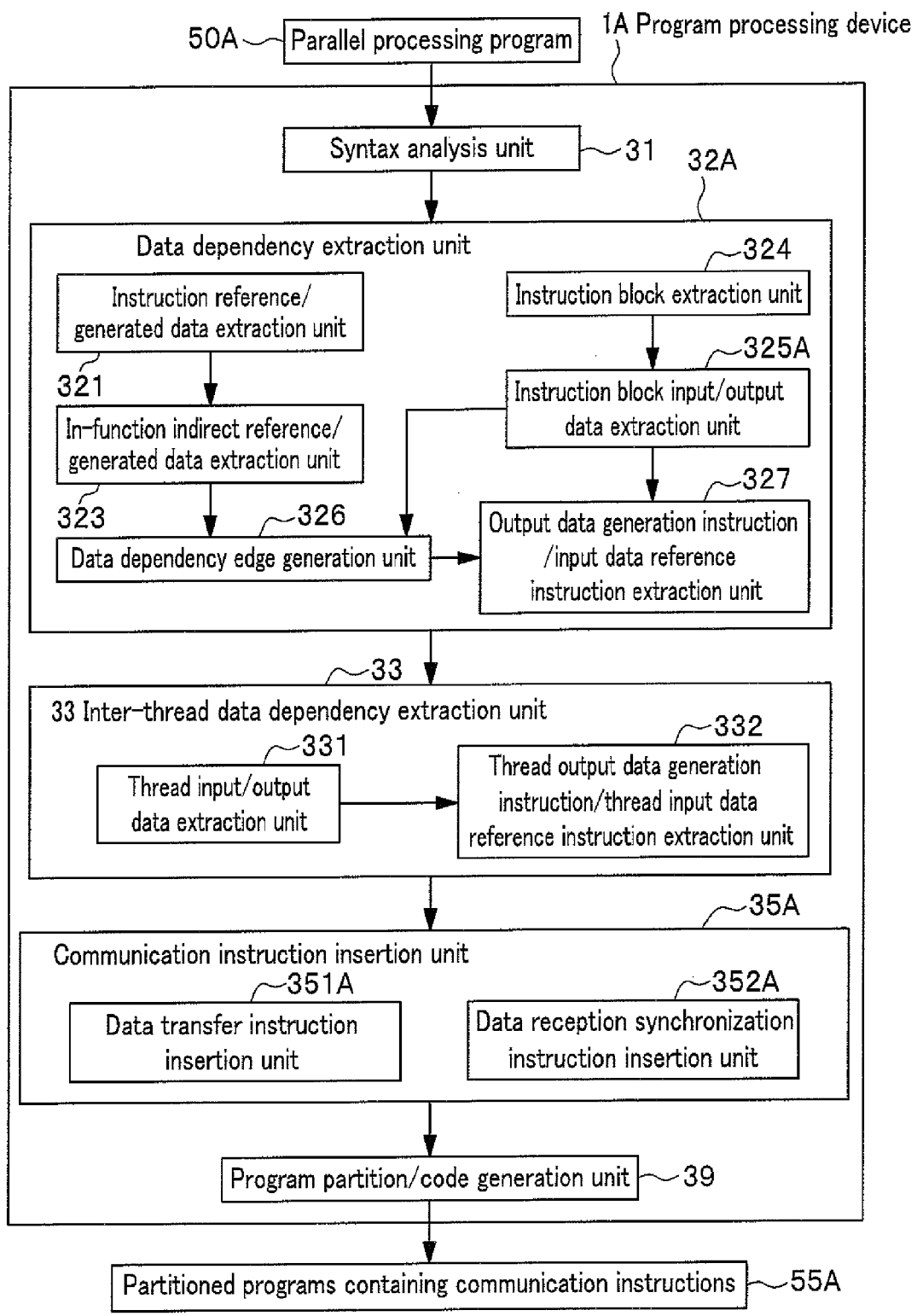
FIG. 1 is a functional block diagram showing an example of functions of a program processing device according to a first embodiment.

| DESCRIPTION OF REFERENCE CHARACTERS | |
| --- | --- |
| 1A, 1B, 1C | Program processing device |
| 10 | Central processing unit (Processing unit) |
| 20 | Main storage unit (Processing unit) |
| 30A | Parallel processing compiler |
| 31 | Syntax analysis unit |
| 32A, 32B, 32C | Data dependency extraction unit |
| 33 | Inter-thread data dependency extraction unit |
| 34 | Pointer communication auxiliary instruction generation unit |
| 35A, 35C | Communication instruction insertion unit |
| 36 | Inter-thread data communication instruction insertion unit |
| 39 | Program partition/code generation unit |
| 40 | File unit (Storage unit) |
| 50A, 50B, 50C, 50D | Parallel processing program |
| 55A, 55B, 55C, 55D | Partitioned programs containing communication instructions |
| 321 | Instruction reference/generated data extraction unit |
| 322 | Pointer alias analysis unit |
| 323 | In-function indirect reference/generated data extraction unit |
| 324 | Instruction block extraction unit |
| 325A, 325B, 325C | Instruction block input/output data extraction unit |
| 326 | Data dependency edge generation unit |
| 327 | Output data generation instruction/input data reference instruction extraction unit |

DESCRIPTION OF REFERENCE CHARACTERS

| | |
|---|---|
| 331 | Thread input/output data extraction unit |
| 332 | Thread output data generation instruction/thread input data reference instruction extraction unit |
| 333 | Inter-processor communication instruction insertion unit |
| 341 | Inter-thread transferred pointer extraction unit |
| 342 | Pointer alias ID computing instruction insertion unit |
| 351A, 351C | Data transfer instruction insertion unit |
| 352A, 352C | Data reception synchronization instruction insertion unit |
| 353 | Thread start-up instruction insertion unit |
| IN | Input unit |
| OUT | Output unit |
| P | Processor |
| 55 | Partitioned programs containing communication instructions |
| 60 | Communication processing unit |
| 61 | Data reception unit |
| 62 | Data communication port table |
| 63 | Data transfer unit |
| 70 | Program processing unit |
| 80 | Local memory |
| 620 | Port information |
| 622 | Port type |
| 623 | Port size |
| 624 | Port address |
| 627 | Destination table |
| 628 | Port alias table |
| 628c | Object address |
| CS | Communication network |

DETAILED DESCRIPTION OF THE EXEMPLARY EMBODIMENTS

With reference to attached drawings, the exemplary embodiments of the present invention are described.

First Embodiment

A first embodiment of the present invention is described below with reference to FIG. 1 to FIG. 16.

FIG. 1 is a functional block diagram showing an example of functions of a program processing device. As shown in FIG. 1, a program processing device 1A inputs therein a parallel processing program 50A and outputs partitioned programs containing communication instructions 55A. Next is described the parallel processing program 50A with reference to FIG. 2 and FIG. 3.

FIG. 2 is an example of a program described by a programmer before a thread description is added. The program is described in C language.

FIG. 3 is an example of a program described by a programmer after a thread description is added to the program shown in FIG. 2 (hereinafter also referred to as a parallel processing program). A "thread" herein is a unit of a program executed by a processor. A plurality of threads are assumed to be subjected to a parallel processing by a plurality of processors.

The program is described in extended C language, in which a new keyword, "THREAD", is added to C language. A thread name is specified in parentheses following "THREAD". A scope of a thread is within a code area (thread area) in braces { ... }. The program with a thread description added thereto (a parallel processing program) is therefore a program in which the scope of a thread is described. A processing of a code area which is not included in any thread is herein referred to as a "base thread", and is dealt with in the same way as other threads. To generate an execution code from a source code described in the extended C language using an existing C compiler, a preprocessor "#define THREAD(n)", which invalidates a thread declaration, is inserted beforehand in an uppermost part of the program (or in the program), for example. The preprocessor converts, for example, "THREAD(p1)" into a blank character string. This makes the braces { ... } to be interpreted as a scope declaration in an ordinary C language, and to be normally processed using the existing C compiler.

Returning to FIG. 1, description of the program processing device 1A is continued.

As shown in FIG. 1, the program processing device 1A includes a syntax analysis unit 31, a data dependency extraction unit 32A, an inter-thread data dependency extraction unit 33, a communication instruction insertion unit 35A, and a program partition/code generation unit 39. Next are described the above-mentioned components in the program processing device 1A.

(Description of Syntax Analysis Unit 31)

The syntax analysis unit 31 inputs therein the parallel processing program 50A and analyzes syntax of the program. The syntax analysis unit 31 also generates an intermediate language from the parallel processing program 50A. In addition to having a function of performing a well-known syntax analysis, which can also be performed by an ordinary compiler, the syntax analysis unit 31 recognizes a keyword, THREAD, which is added as a reserved word in the extended C language; extracts a name of a thread, which is described in parentheses following "THREAD"; recognizes that the thread is within a code area (thread area) in braces { } following the name of the thread; and adds an attribute of the thread (a thread attribute) to each operation instruction converted into the intermediate language. The thread attribute is information for determining which operation instruction is included in which thread. Information on the thread attribute can be added to all operation instructions included in all threads, by assigning a unique number to each of the threads in advance, and assigning the unique number to each of the operation instructions included in the threads.

If a thread area has a nested structure, that is, if the thread area has another thread area therein, an operation instruction has a thread attribute that belongs to an innermost thread area. For example, in a nested structure (in which an area of a thread p0 includes a thread p1) as follows, an operation "b=2;" is included in both the thread p0 and the thread p1:

```
THREAD (p0) {
    a = 1;
    THREAD (p1) {
        b = 2;
    }
}
```

In this case, the operation "b=2;" has a thread attribute that belongs to the thread p1 which is positioned innermost in the nested structure. An operation "a=1;" has a thread attribute that belongs to the thread p0.

If a thread area includes an instruction of calling a function, a base thread of the function is assumed to be identical to a thread to which the function call instruction belongs. For example, in FIG. 3, instructions in line 21 (RandomSignal( )) and line 25 (printf( )) in the parallel processing program 50A are function call instructions in a thread p4 and a thread p5, respectively. Processings of the functions are performed in respective threads which call the functions. Thus the base threads of RandomSignal( ) and printf( ) are identical to the thread p4 and thread p5, respectively.

As a matter of convenience, a description below is made using the parallel processing program 50A as the intermediate language.

(Description of Data Dependency Extraction Unit 32A)

The data dependency extraction unit 32A inputs therein the intermediate language generated by the syntax analysis unit 31, and extracts a data dependency. The data dependency extraction unit 32A includes an instruction reference/generated data extraction unit 321, an in-function indirect reference/generated data extraction unit 323, an instruction block extraction unit 324, an instruction block input/output data extraction unit 325A, a data dependency edge generation unit 326, and an output data generation instruction/input data reference instruction extraction unit 327.

(Description of Instruction Reference/Generated Data Extraction Unit 321)

The instruction reference/generated data extraction unit 321 inputs therein the intermediate language generated by the syntax analysis unit 31, and generates a reference data list and a generated data list of each instruction in the intermediate language.

The reference data list of each instruction generated by the instruction reference/generated data extraction unit 321 includes all of the data directly referenced by each instruction. If the instruction is a unary operation instruction, the instruction has a single reference data. If the instruction is a binary operation instruction, the instruction has two reference data. If the instruction is a function call instruction, the instruction has all of function call argument data as a reference data.

The generated data list of each instruction generated in the instruction reference/generated data extraction unit 321 includes a data directly generated by each instruction. It is to be noted that a function call instruction whose function has no return value does not directly generate a data. On the other hand, a function call instruction other than the above directly generates a data.

The reference data list and the generated data list generated by the instruction reference/generated data extraction unit 321 are transferred to the in-function indirect reference/generated data extraction unit 323. The reference data list and generated data list generated by the instruction reference/generated data extraction unit 321 are also used in a processing of extracting a dependency of each instruction as needed.

(Description of In-Function Indirect Reference/Generated Data Extraction Unit 323)

The in-function indirect reference/generated data extraction unit 323 inputs therein the reference data list and the generated data list generated by the instruction reference/generated data extraction unit 321, and, if a function call instruction exists in the lists, extracts a pointer reference data (hereinafter referred to as an indirect dependent data) by a global variable or a pointer type function argument referenced or generated in a called function of the function call instruction.

When a data dependency of a function call instruction is analyzed, a data dependency as an ordinary operation instruction (hereinafter referred to as a direct data dependency) is needed to be considered. Additionally, in some cases, a dependency which is propagated to a function calling side among data dependencies generated in an operation in a function is also needed to be considered. A function call argument (a direct reference data) and a function return value (a direct generated data) each represent a direct data dependency. The direct referenced data and directly generated data are present in the reference data list and generated data list generated by the instruction reference/generated data extraction unit 321, respectively.

The in-function indirect reference/generated data extraction unit 323 references the reference data list and generated data list received from the instruction reference/generated data extraction unit 321; extracts an indirect dependent data (an in-function indirect reference data) (other than a function argument) referenced in a function of interest; and adds the extracted in-function indirect reference data to the reference data list of each function call instruction. Further, the in-function indirect reference/generated data extraction unit 323 references the reference data list and generated data list received from the instruction reference/generated data extraction unit 321; extracts an indirect independent data (in-function indirect generated data) (other than a function return value) generated (rewritten) in a function of interest; and adds the extracted in-function indirect generated data to the generated data list of each function call instruction. A processing performed by the in-function indirect reference/generated data extraction unit 323 is not detailed herein, as the processing is not particularly different from a well-known processing performed by an ordinary compiler for extracting an indirect dependent data.

The reference data list and generated data list of a function call instruction generated by the in-function indirect reference/generated data extraction unit 323 are used in a processing of extracting a dependency of each instruction as needed. This makes it possible to extract an overall data dependency in the parallel processing program 50A.

(Description of Instruction Block Extraction Unit 324)

The instruction block extraction unit 324 inputs therein the intermediate language generated by the syntax analysis unit 31, and extracts an instruction block from the intermediate language. The instruction block herein means a block generated as a result of dividing a program at a branch point, a merged point, each end of a function call instruction, and a thread boundary. Next is described an example of functions of the instruction block extraction unit 324 with reference to FIG. 3 and FIG. 4.

The instruction block extraction unit 324 detects a repetition statement in line 7 in the parallel processing program 50A, determines that the program is merged prior to a conditional expression "t<signalLength", and extracts a program merged point (merged block) C1. Further, the instruction block extraction unit 324 determines that the parallel processing program 50A is branched subsequent to the conditional expression "t<signalLength", and extracts a program branch point (branch block) B1 (see FIG. 4). The instruction block extraction unit 324 also extracts a function call instruction D1 "RandomSignal" and a function call instruction D2 "printf" in line 21 and line 25 in the parallel processing program 50A, respectively (see FIG. 4). The instruction block extraction unit 324 also extracts thread boundaries E1 to E6, which are provided immediately prior to and subsequent to processings by the threads p1 to p5, from the parallel processing program 50A (see FIG. 4).

Figure 4:
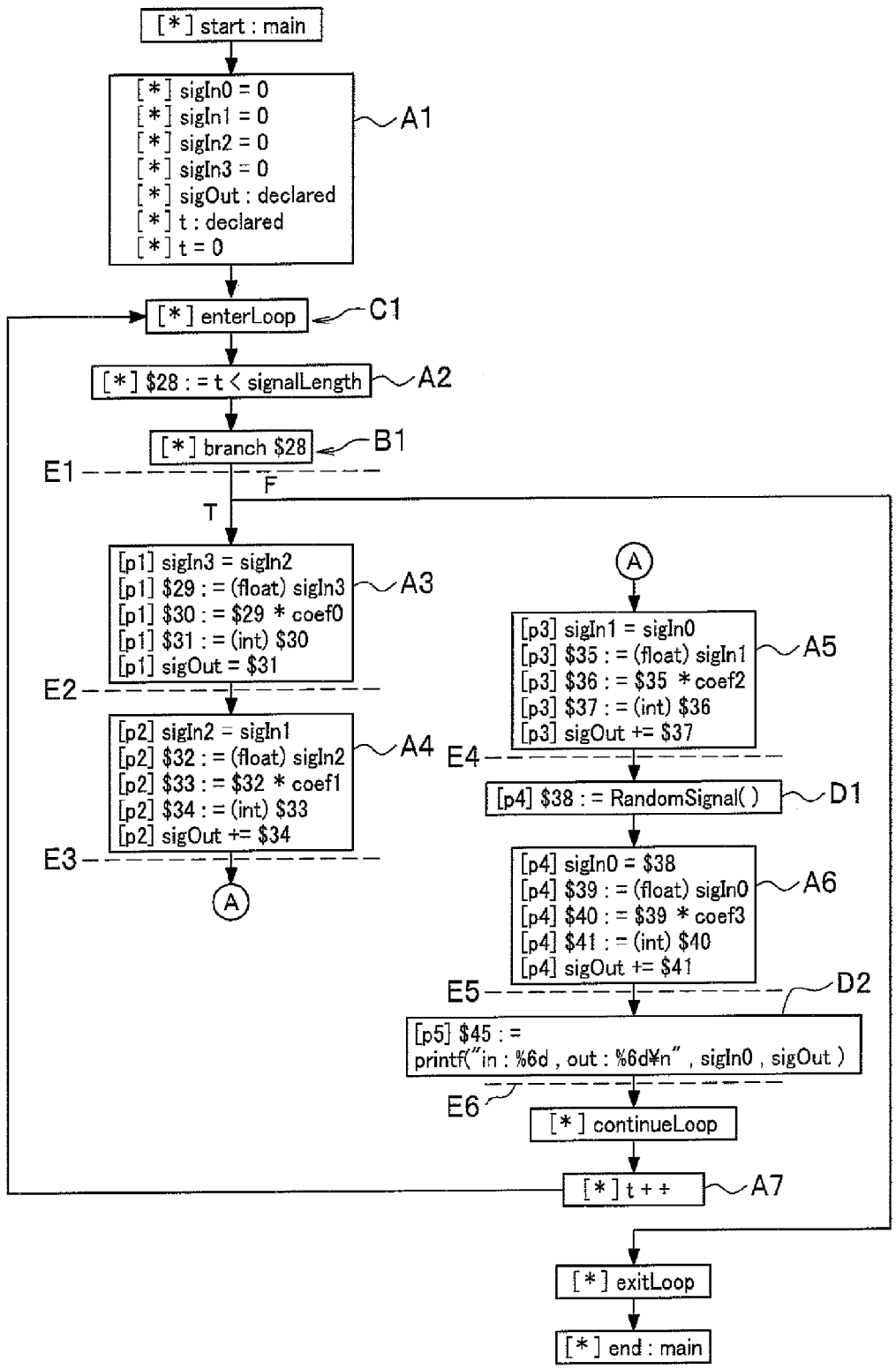
FIG. 4 is a program graph showing results of extracting instruction blocks from an intermediate language according to the first embodiment.

FIG. 4 is a program graph showing results in which the instruction block extraction unit 324 extracts instruction blocks from the intermediate language generated by the syntax analysis unit 31. In FIG. 4, characters to the left of each operation (for example, [p1]) indicate a name of a thread which executes the operation, and [*] indicates a base thread as described above. Processings of operations in the intermediate language generated by the syntax analysis unit 31 are divided into a binary operation and a unary operation (a temporary variable called "$xx" is assigned to an intermediate variable used for dividing the operations).

The functions of the instruction block extraction unit 324 have been described above. That is, the instruction block extraction unit 324 can extract the program branch point B1, the program merged point C1, the function call instruction D1, the function call instruction D2, and the thread boundaries E1 to E6 from the parallel processing program 50A; and thereby divide the parallel processing program 50A into the instruction blocks A1 to A7, as shown in FIG. 4. Thus, the instruction block extraction unit 324 can generate information on an instruction block in which each instruction in the parallel processing program 50A is associated with an instruction block and a thread (instruction block information).

The information on an instruction block generated by the instruction block extraction unit 324 (the instruction block information) is transmitted to the instruction block input/output data extraction unit 325A.

(Description of Instruction Block Input/Output Data Extraction Unit 325A)

The instruction block input/output data extraction unit 325A inputs therein the intermediate language generated by the syntax analysis unit 31 and the instruction block information extracted by the instruction block extraction unit 324, and extracts an instruction block input data and an instruction block output data from the intermediate language, using the instruction block information. The instruction block input data is, among data referenced by each instruction in an instruction block, a data generated in another instruction block. The instruction block output data is, among data generated by each instruction in an instruction block, a data referenced in another instruction block. Next is described an example of functions of the instruction block input/output data extraction unit 325A with reference to FIG. 3 and FIG. 5.

The instruction block input/output data extraction unit 325A detects, for example, a variable sigIn2 in line 9 in the parallel processing program 50A as a data referenced by each instruction in an instruction block. The instruction block input/output data extraction unit 325A references the instruction block information extracted by the instruction block extraction unit 324, and determines that the variable sigIn2 is referenced under an instruction in the instruction block A3. The instruction block input/output data references extraction unit 325A also references the instruction block information extracted by the instruction block extraction unit 324 and the reference data list and generated data list generated by the extraction unit 321, and determines that the variable sigIn2 is generated in an instruction block other than the instruction block A3, in which the variable sigIn2 is referenced (that is, in the instruction block A1 or instruction block A4). As a result, the instruction block input/output data extraction unit 325A can extract the variable sigIn2 as the instruction block input data.

The instruction block input/output data extraction unit 325A detects, for example, a variable sigOut in line 10 in the parallel processing program 50A as a data generated by each instruction in an instruction block. The instruction block input/output data extraction unit 325A references the instruction block information extracted by the instruction block extraction unit 324, and determines that the variable sigOut is generated under an instruction in the instruction block A3. The instruction block input/output data extraction unit 325A also references the instruction block information extracted by the instruction block extraction unit 324 and the reference data list and generated data list generated by the instruction reference/generated data extraction unit 321, and determines that the variable sigOut is referenced in an instruction block other than the instruction block A3, in which the variable sigOut is generated (that is, the instruction block A4). As a result, the instruction block input/output data extraction unit 325A can extract the variable sigOut as the instruction block output data.

Figure 5:
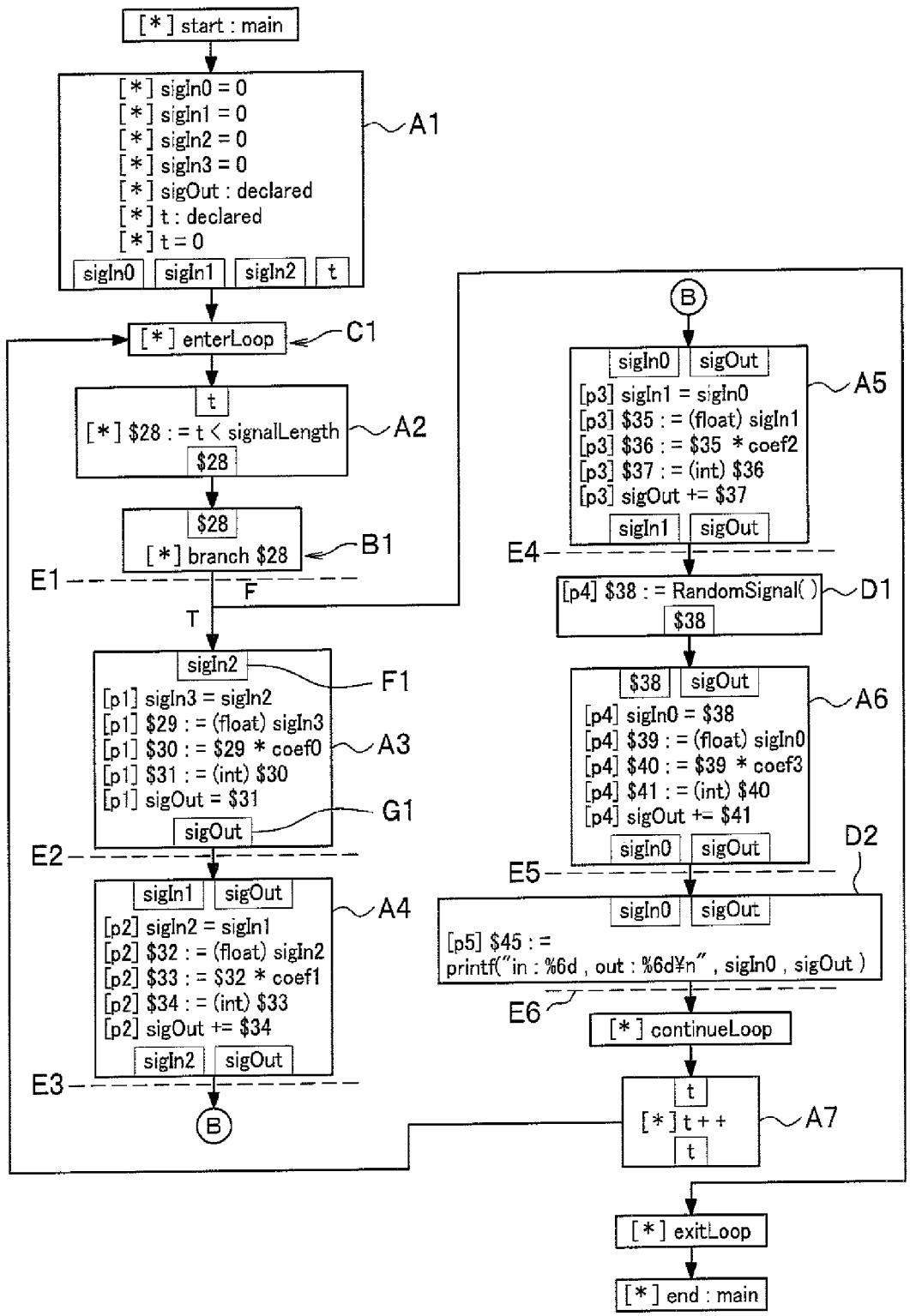
FIG. 5 is a program graph showing results of extracting an input/output data from the intermediate language according to the first embodiment.

FIG. 5 is a program graph showing results in which the instruction block input/output data extraction unit 325A extracts the instruction block input data and instruction block output data from the intermediate language generated by the syntax analysis unit 31. FIG. 5 shows, for example, an instruction block input data F1 and an instruction block output data G1.

The functions of the instruction block input/output data extraction unit 325A have been described above. That is, the instruction block input/output data extraction unit 325A extracts the instruction block input/output data from the parallel processing program 50A using the instruction block information, as shown in FIG. 5. Thus the instruction block input/output data extraction unit 325A can generate information on instruction block input/output data (instruction block input/output data information), in which an instruction block extracted by the instruction block extraction unit 324 is associated with an input/output data in the instruction block.

The instruction block information generated by the instruction block extraction unit 324 and the information on instruction block input/output data (the instruction block input/output data information) generated by the instruction block input/output data extraction unit 325A are transferred to the data dependency edge generation unit 326.

(Description of Data Dependency Edge Generation Unit 326)

The data dependency edge generation unit 326 inputs therein the intermediate language generated by the syntax analysis unit 31, the instruction block information generated by the instruction block extraction unit 324, and the instruction block input/output data information generated by the instruction block input/output data extraction unit 325A; and generates a data dependency edge, using the instruction block information and instruction block input/output data information.

A data dependency edge extends from an output data node to an input data node to connect therebetween, regarding an input/output data in an instruction block as a "node (apex)", if a dependency exists between the input data and the output data (a relationship in which an output data in a block is used as an input data in another block). In a case where the data dependency is separated across a branch point or a merged point, a data node is added to a branch block or a merged block corresponding to the branch point or the merged point, respectively, to thereby allow a data dependency edge for the data dependency to pass through the data node. A graph structure of the data dependency edge is based on a Dependence Flow Graph, which is proposed in a well-known treatise "Johnson, Pingali, "Dependence-Based Program Analysis", ACM Conference on Programming Language Design and Implementation, pp. 78-89 (1993)". The Dependence Flow Graph is, in the above case where a data dependency is separated across a branch point or a merged point, a graph structure for representing the data dependency in which a data node is added to a branch block or a merged block corresponding to the branch point or the merged point, respectively, to thereby allow a data dependency edge for the data dependency to pass through the data node. Next is described an example of functions of the data dependency edge generation unit 326 with reference to FIG. 3, FIG. 5 and FIG. 6.

Figure 6:
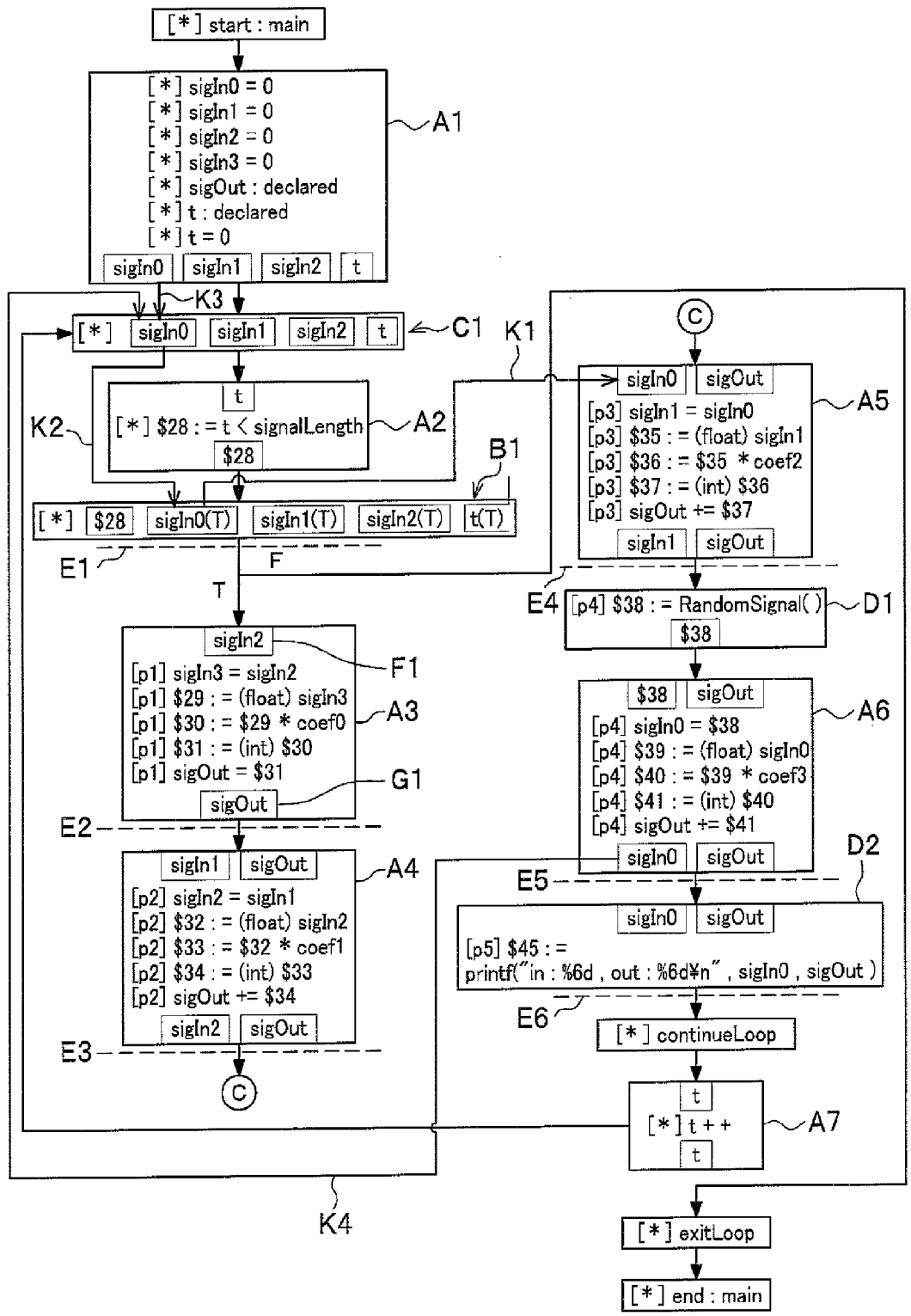
FIG. 6 is a program graph showing results of creating data dependency edge from the intermediate language according to the first embodiment.

FIG. 6 is a program graph showing results in which the data dependency edge generation unit 326 generates data dependency edges from the intermediate language generated by the syntax analysis unit 31.

The data dependency edge generation unit 326 references the instruction block input/output data information generated by the instruction block input/output data extraction unit 325A, and detects, for example, sigIn0 as an instruction block input data in the instruction block A5. Then the data dependency edge generation unit 326 searches an instruction block for generating sigIn0 (that is, an instruction block having sigIn0 as an output data), starting from the instruction block A5 backwardly in the program graph. When the backward search goes through a T (True) branch edge at a branch block B1 (namely, goes in a direction in which the program proceeds if a conditional statement of the instruction block A2 is logical, that is, it is "True"), the data dependency edge generation unit 326 adds a data node of sigIn0(T) to the branch block B1, and connects the data node and the input data node sigIn0 in the instruction block A5, with a data dependency edge K1. The data dependency edge generation unit 326 further continues the search to reach a merged block C1. The data dependency edge generation unit 326 adds a data node sigIn0 also to the merged block C1, and connects the data node sigIn0 to the data node sigIn0(T) in the branch block B1, with a data dependency edge K2. After passing through the merged block C1, the data dependency edge generation unit 326 continues the search in two directions to the instruction block A1 and the instruction block A7, which are two sources of the merged block C1. The instruction block A1 has sigIn0 as an output data. The data dependency edge generation unit 326 thus connects the output data node to the data node sigIn0 in the merged block C1, with a data dependency edge K3, and terminates the search in the direction to the instruction block A1. On the other hand, the data dependency edge generation unit 326 continues the search in the direction to the instruction block A7 to reach the instruction block A6. The instruction block A6 has sigIn0 as an output data. Similarly, the data dependency edge generation unit 326 connects the output data node to the data node sigIn0 in the merged block C1, with a data dependency edge K4, and thus completes the search.

It is to be noted that the output data node sigIn0 added to the branch block B1 is represented as sigIn0(T). This means that the output data node sigIn0 added to the branch block B1 is passed through, only if a conditional statement in the instruction block A2 is logical (if it is "True").

As described above, the data dependency edge generation unit 326 can generate a data dependency edge. The data dependency edge generation unit 326 can also generate information on a data dependency edge connecting between nodes (data dependency edge information), by detecting a correspondence between an instruction block and a thread using the instruction block information generated by the instruction block extraction unit 324, and by detecting a correspondence between an instruction block and an input/output data node using the instruction block input/output data information generated by the instruction block input/output data extraction unit 325A. Next is described the data dependency edge information with reference to FIG. 7.

FIG. 7 is a table showing the information on a data dependency edge (the data dependency edge information), which is generated by the data dependency edge generation unit 326, using the intermediate language generated by the syntax analysis unit 31, the instruction block information extracted by the instruction block extraction unit 324, and the instruction block input/output data information extracted by the instruction block input/output data extraction unit 325A. Data dependency edge information 100A includes information on an output data node (a block name, a thread name and a variable name of the output data node), information on an input data node (a block name, a thread name, and a variable name of the input data node); a preceding edge; and a succeeding edge.

The preceding edge herein means, when there is a data dependency edge of interest, another data dependency edge whose end point is a starting point node (an instruction block output node) of the data dependency edge of interest. The succeeding edge herein means, when there is a data dependency edge of interest, another data dependency edge whose starting point is an end point node (an instruction block input node) of the data dependency edge of interest. A data node added to a branch block or a merged block is regarded as both an input node and an output node of the blocks. For example, the data dependency edge generation unit 326 detects a data dependency edge "4" as a data dependency edge whose end point is a starting point node (an instruction block output node) of a data dependency edge "5", and sets the data dependency edge "4" as a preceding edge of the data dependency edge "5". Similarly, the data dependency edge generation unit 326 detects, for example, the data dependency edge "5" as a data dependency edge whose starting point is an end point node (an instruction block input node) of the data dependency edge "4", and sets the data dependency edge "5" as a preceding edge of the data dependency edge "4".

The functions of the data dependency edge generation unit 326 have been described above. That is, the data dependency edge generation unit 326 can generate the data dependency edge information 100A from the parallel processing program 50A, using the instruction block input/output data information extracted by the instruction block input/output data extraction unit 325A, as shown in FIG. 7.

The data dependency edge information 100A generated by the data dependency edge generation unit 326 is transmitted to the output data generation instruction/input data reference instruction extraction unit 327.

(Description of Output Data Generation Instruction/Input Data Reference Instruction Extraction Unit 327)

The output data generation instruction/input data reference instruction extraction unit 327 inputs therein the intermediate language generated by the syntax analysis unit 31, and the data dependency edge information 100A generated by the data dependency edge generation unit 326 (see FIG. 7), and extracts an output data generation instruction and an input data reference instruction. Next is described an example of functions of the output data generation instruction/input data reference instruction extraction unit 327 with reference to FIG. 7 and FIG. 8.

The output data generation instruction/input data reference instruction extraction unit 327 references the data dependency edge information 100A generated by the data dependency edge generation unit 326, and searches an instruction block on a starting point side of each data dependency edge to detect an instruction of generating a corresponding data. The reason for searching the instruction block on the starting point side is that, if a data dependency edge does not have any preceding edge, an instruction of generating data on the data dependency edge (a data generation instruction) is necessarily present in the instruction block on the starting point side. If a plurality of instructions of generating the data are present in one instruction block, an instruction executed lastly is regarded as a data generation instruction. On the other hand, if a data dependency edge has a preceding edge, it means that an instruction of generating a data on the data dependency edge (a data generation instruction) is not present in the instruction block on the starting point side.

Next, the output data generation instruction/input data reference instruction extraction unit 327 searches an instruction block on an end point side of each data dependency edge to detect an instruction of referencing a corresponding data. The reason for searching the instruction block on the end point side is that, if a data dependency edge does not have any succeeding edge, an instruction of referencing a data on the data dependency edge (a data reference instruction) is necessarily present in the instruction block on the end point side. If a plurality of instructions of referencing the data are present in one instruction block, an instruction executed lastly is regarded as a data reference instruction. On the other hand, if a data dependency edge has a succeeding edge, it means that an instruction of referencing a data on the data dependency edge (a data reference instruction) is not present in the instruction block on the end point side.

FIG. 8 a table showing information on an output data generation instruction and an input data reference instruction (output data generation instruction/input data reference instruction information) generated by the output data generation instruction/input data reference instruction extraction unit 327, using the intermediate language generated by the syntax analysis unit 31 and the data dependency edge information 100A generated by the data dependency edge generation unit 326, with the above-mentioned data generation instruction search and the data reference instruction search. The output data generation instruction/input data reference instruction information 110A includes, for each data dependency edge, information on a data generation instruction in an instruction block on a starting point side of the each data dependency edge (a block name, a thread name, and an instruction), a data generation instruction symbol, information on a data reference instruction in an instruction block on an end point side (a block name, a thread name, and an instruction), and a data reference instruction symbol.

The data generation instruction symbol is symbolized information on a data generation instruction, and is represented as "data dependency edge number: DEF". The data reference instruction symbol is symbolized information on a data reference instruction, and is represented as "data dependency edge number: USE".

The data dependency edges "6" to "9" are not present in FIG. 8, unlike in FIG. 7. This is because those data dependency edges have neither a data generation instruction nor a data reference instruction.

The functions of the output data generation instruction/input data reference instruction extraction unit 327 have been described above. That is, the output data generation instruction/input data reference instruction extraction unit 327 can generate the output data generation instruction/input data reference instruction information 110A using the data dependency edge information 100A generated by the data dependency edge generation unit 326, as shown in FIG. 8.

The data dependency edge information 100A generated by the data dependency edge generation unit 326, and the output data generation instruction/input data reference instruction information 110A generated by the output data generation instruction/input data reference instruction extraction unit 327 are transferred to the inter-thread data dependency extraction unit 33.

(Description of Inter-Thread Data Dependency Extraction Unit 33)

The inter-thread data dependency extraction unit 33 inputs therein the data dependency edge information 100A (see FIG. 7) generated by the data dependency edge generation unit 326, and the output data generation instruction/input data reference instruction information 110A (see FIG. 8) generated by the output data generation instruction/input data reference instruction extraction unit 327; and extracts a data dependency between threads. The inter-thread data dependency extraction unit 33 includes a thread input/output data extraction unit 331 and a thread output data generation instruction/thread input data reference instruction extraction unit 332.

(Description of Thread Input-Output Data Extraction Unit 331)

The thread input/output data extraction unit 331 inputs therein the data dependency edge information 100A (see FIG. 7) generated by the data dependency edge generation unit 326; extracts a thread input data and a thread output data (thread input/output data), using the data dependency edge information 100A (see FIG. 7); and generates inter-thread data dependency edge information 120A (see FIG. 9).

The thread input data is, among data referenced by each instruction in a thread, a data generated in another thread. The thread output data is, among data generated by each instruction in a thread, a data referenced in another thread. In other words, a data dependency edge, which crosses any one or more of the thread boundaries E1 to E6 (see FIG. 6) represents a thread input/output data. Next is described an example of functions of the thread input/output data extraction unit 331 with reference to FIG. 6, FIG. 7 and FIG. 9.

The thread input/output data extraction unit 331 references the data dependency edge information 100A generated by the data dependency edge generation unit 326, and generates the inter-thread data dependency edge information 120A in which an inter-thread data dependency edge is inserted into the data dependency edge information 100A. The inter-thread data dependency edge herein means a data dependency edge connecting data nodes of different threads.

As shown in the data dependency edge information 100A of FIG. 7, a thread of an output data node is identical to that of an input data node for data dependency edges "1" to "10", "17", "20" and "21". Therefore, an inter-thread data dependency edge is not extended from the output data node to the input data node for those data dependency edges to connect therebetween. On the other hand, a thread of an output data node is not identical to that of an input data node for data dependency edges "11" to "16", "18", "19", and "22" to "24". Therefore, an inter-thread data dependency edge is extended from the output data node to the input data node for those data dependency edges to connect therebetween.

FIG. 9 is a table showing the inter-thread data dependency edge information 120A generated by the thread input/output data extraction unit 331, using the data dependency edge information 100A generated by the data dependency edge generation unit 326. As compared to the data dependency edge information 100A of FIG. 7, FIG. 9 has an additional column of an "inter-thread data dependency edge", in which a value indicating whether or not each data dependency edge is an inter-thread data dependency edge is set.

The inter-thread data dependency edge information 120A generated by the thread input/output data extraction unit 331 is transmitted to the thread output data generation instruction/thread input data reference instruction extraction unit 332.

(Description of Thread Output Data Generation Instruction/Thread Input Data Reference Instruction Extraction Unit 332)

The thread output data generation instruction/thread input data reference instruction extraction unit 332 references the inter-thread data dependency edge information 120A (see FIG. 9) generated by the thread input/output data extraction unit 331, and the output data generation instruction/input data reference instruction information 110A (see FIG. 8) generated by the output data generation instruction/input data reference instruction extraction unit 327; and extracts a thread input data reference instruction. The thread input data reference instruction herein means an input data reference instruction concerning an inter-thread data dependency edge. Next is described an example of functions of the thread output data generation instruction/thread input data reference instruction extraction unit 332 with reference to FIG. 8 to FIG. 11.

Description herein is made using the inter-thread data dependency edge information 120A shown in FIG. 9. The thread output data generation instruction/thread input data reference instruction extraction unit 332 extracts data reference instructions "11:USE" to "16:USE", "18:USE", "19:USE", and "22:USE" to "24:USE" for the inter-thread data dependency edges "11" to "16", "18", "19" and "22" to "24", respectively, as thread input data reference instructions. The thread output data generation instruction/thread input data reference instruction extraction unit 332 also references the output data generation instructions and input data reference instructions generated by the output data generation instruction/input data reference instruction extraction unit 327, using the extracted data dependency edges; and extracts thread output data generation instructions.

A description herein is made using the output data generation instruction/input data reference instruction information 110A shown in FIG. 8. The thread output data generation instruction/thread input data reference instruction extraction unit 332 determines whether or not a direct data generation instruction of the thread input data reference instruction is present each in the extracted data dependency edges "11" to "16", "18", "19" and "22" to "24".

The thread output data generation instruction/thread input data reference instruction extraction unit 332 then determines that the direct data generation instruction of the thread input data reference instruction is present each in the data dependency edges "13", "14", "16", "18" and "19" (see the output data generation instruction/input data reference instruction information 110A of FIG. 8, in which the data generation instruction and the data reference instruction are present in the same line of the respective data dependency edges); and thus extracts each of the data generation instructions as a thread output data generation instruction.

The thread output data generation instruction/thread input data reference instruction extraction unit 332 needs to search a thread output data generation instruction in the data dependency edges "11", "12" and "15", because a direct data generation instruction of the thread input data reference instruction is not present in those data dependency edges (see the output data generation instruction/input data reference instruction information 110A of FIG. 8, in which a data generation instruction is not present in the same line as the data reference instruction in those data dependency edges). Next is described how the thread output data generation instruction is searched for with reference to FIG. 10.

FIG. 10 is a table for explaining how the thread output data generation instruction/thread input data reference instruction extraction unit 332 searches for the thread output data generation instruction, if a direct data generation instruction of the thread input data reference instruction is not present.

The thread output data generation instruction/thread input data reference instruction extraction unit 332 searches for an output data generation instruction in a preceding edge direction, if a direct data generation instruction of the thread input data reference instruction is not present. For example, the thread output data generation instruction/thread input data reference instruction extraction unit 332 extracts a preceding edge "8" of the data dependency edge "11". Then the thread output data generation instruction/thread input data reference instruction extraction unit 332 further extracts a preceding edge "3" and a preceding edge "24" of the data dependency edge "8", because a data generation instruction symbol of the data dependency edge "8" is not present.

The thread output data generation instruction/thread input data reference instruction extraction unit 332 extracts a data generation instruction symbol "3:DEF" of the data dependency edge "3", which is extracted as a preceding edge of the data dependency edge "11"; and adds the "3:DEF" to a generation instruction list (a thread output data generation instruction list of the thread input data reference instruction) of the data dependency edge "11", from which the search has started.

The thread output data generation instruction/thread input data reference instruction extraction unit 332 also extracts a data generation instruction symbol "24:DEF" of the data dependency edge "24", which is also extracted as a preceding edge of the data dependency edge "11", and adds the "24:DEF" to the generation instruction list (the thread output data generation instruction list of the thread input data reference instruction) of the data dependency edge "11", from which the search has started.

How the thread extraction data generation instruction is searched for is described above. That is, the thread output data generation instruction/thread input data reference instruction extraction unit 332 can generate the thread output data generation instruction list of the thread input data reference instruction.

FIG. 11 is a table showing information (inter-thread data dependent instruction pair information) generated by the thread output data generation instruction/thread input data reference instruction extraction unit 332, by inserting the thread output data generation instruction list of the thread input data reference instruction into the inter-thread data dependency edge information 120A (see FIG. 9) generated by the thread input/output data extraction unit 331. As shown in FIG. 11, a plurality of thread output data generation instruction lists of the thread input data reference instruction may be present for each data dependency edge.

The inter-thread data dependency edge information 120A generated by the thread input/output data extraction unit 331 and the inter-thread data dependency instruction pair information 130A (see FIG. 11) generated by the thread output data generation instruction/thread input data reference instruction extraction unit 332 are transferred to the communication instruction insertion unit 35A.

(Description of Communication Instruction Insertion Unit 35A)

The communication instruction insertion unit 35A inputs therein the intermediate language generated by the syntax analysis unit 31, the inter-thread data dependency edge information 120A (see FIG. 9) generated by the thread input/output data extraction unit 331, and the inter-thread data dependency instruction pair information 130A (see FIG. 11) generated by the thread output data generation instruction/thread input data reference instruction extraction unit 332; and inserts a communication instruction into the intermediate language. The communication instruction insertion unit 35A includes a data transfer instruction insertion unit 351A and a data reception synchronization instruction insertion unit 352A.

(Description of Data Transfer Instruction Insertion Unit 351A)

The data transfer instruction insertion unit 351A references the thread output data generation instruction list of the thread input data reference instruction in the inter-thread data dependency instruction pair information 130A (see FIG. 11), and inserts a data transfer instruction into the intermediate language just subsequent to a thread output data generation instruction of the thread input data reference instruction. Next is described an example of functions of the data transfer instruction insertion unit 351A with reference to FIG. 11.

The data transfer instruction insertion unit 351A inserts a data transfer instruction just subsequent to, for example, a thread output data generation instruction "13:DEF", which corresponds to a thread input data reference instruction "13: USE". The data transfer instruction insertion unit 351A also inserts respective data transfer instructions just subsequent to the thread output data generation instructions "3:DEF" and "24:DEF", both of which correspond to the thread input data reference instruction "11:USE".

In this case, a thread "p2" for executing a thread input data reference instruction "13:USE" is specified as a destination thread.

The data transfer instruction insertion unit 351A can insert into the intermediate language, for example, an instruction of calling a function which performs a data transfer processing of a message passing library function for an existing parallel processing, as the data transfer instruction.

Taking MPI as an example, which is a message passing type parallel programming environment, the data transfer instruction insertion unit 351A inserts an instruction of calling an MPI_Send( ) function for performing the data transfer processing; and sets a data address, a data size. a data type, a destination thread number (a unique number assigned in advance to each thread), a message tag number (a data dependency edge number of a thread input data reference instruction) as function call arguments.

(Description of Data Reception Synchronization Instruction Insertion Unit 352)

The data reception synchronization instruction insertion unit 352A references the thread output data generation instruction list of the thread input data reference instruction in the inter-thread data dependency instruction pair information 130A (see FIG. 11), and inserts a data reception synchronization instruction into the intermediate language just prior to the thread input data reference instruction. Next is described an example of functions of the data reception synchronization instruction insertion unit 352A with reference to FIG. 11.

The data reception synchronization instruction insertion unit 352A inserts a data reception synchronization instruction just prior to, for example, the thread input data reference instruction "11:USE".

The data reception synchronization instruction insertion unit 352A can insert into the intermediate language, for example, an instruction of calling a function which performs a data reception processing of a message passing library function for an existing parallel processing, as the data reception synchronization instruction.

Taking MPI as an example, which is the message passing type parallel programming environment, the data reception synchronization instruction insertion unit 352A inserts, for example, an instruction of calling an MPI_Recv( ) function, as a function for performing a data reception processing; and sets a data address, a data size. a data type, a destination thread number (MPI_ANY_SOURCE), a message tag number (a data dependency edge number of the thread input data reference instruction) as function call arguments. As a source thread number, "MPI_ANY_SOURCE" (meaning that "a source may be any thread.") is used herein, because a plurality of thread output data generation instructions corresponding to a thread input data reference instruction may be present.

A program containing a communication instruction generated by inserting a communication instruction into the intermediate language by the communication instruction insertion unit 35A is transmitted to the program partition/code generation unit 39.

(Description of Program Partition/Code Generation Unit 39)

The program partition/code generation unit 39 partitions a program containing a communication instruction generated by the communication instruction insertion unit 35A into threads to be processed by each processor (a program partition), and converts (code-generates) each threads into an execution code (a machine code). Thereby the program partition/code generation unit 39 generates the partitioned programs containing communication instructions 55A (see FIG. 1).

A function of the program partition by the program partition/code generation unit 39 includes referencing a thread attribute added to each instruction in a program by the syntax analysis unit 31, and partitioning the program into each thread processing.

A function of the code generation performed by the program partition/code generation unit 39 is not particularly different from a well-known function of a code generation performed by an ordinary compiler, and a further detailed description of the function is omitted herefrom.

In the first embodiment as described above, the program processing device 1A analyzes the parallel processing program 50A, and can generate the partitioned programs containing communication instructions 55A, which is applicable to an existing distributed memory system and an existing shared memory system.

Figure 12:
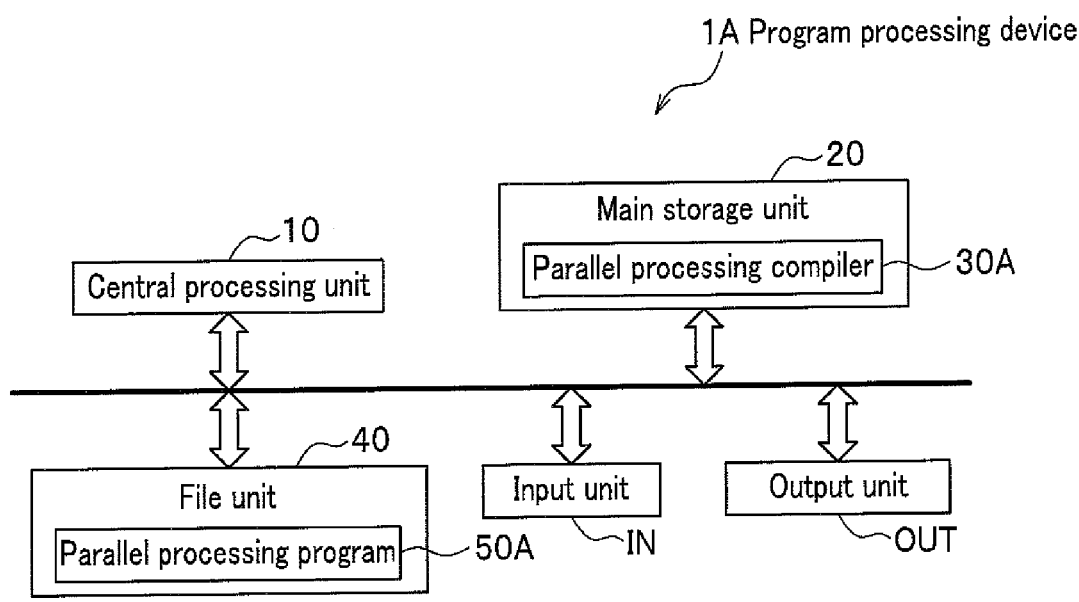
FIG. 12 is a view showing an example of a hardware configuration of the program processing device according to the first embodiment.

FIG. 12 is a view showing an example of a hardware configuration of the program processing device 1A (see FIG. 1).

As shown in FIG. 12, the program processing device 1A is a computer, and includes a central processing unit (a processing unit) 10, a main storage unit (a processing unit) 20, a file unit (a storage unit) 40, an input unit IN, and an output unit OUT. The file unit 40 includes the parallel processing program 50A. The main storage unit 20 includes a parallel processing compiler 30A.

The central processing unit 10 includes, for example, a CPU (Central Processing Unit), and executes a program stored in the main storage unit 20.

The main storage unit 20 includes, for example, a RAM (Random Access Memory) and a ROM (Read Only Memory), and stores a program and a data to be executed by the central processing unit 10.

The parallel processing compiler 30A is a program for converting the parallel processing program 50A to a format in which a multi-processor system is executable (that is, for generating an execution code for the multi-processor system)

The file unit 40 is a unit for storing a file, and stores the parallel processing program 50A or the like.

The parallel processing program 50A is a program with which a multi-processor system executes a parallel processing, and is described by a programmer or the like.

The input unit IN includes a keyboard and a mouse, and inputs an instruction from an operator.

The output unit OUT includes a display and a printer, and outputs a character, an image, or the like.

The central processing unit 10 receives an instruction from the parallel processing compiler 30A stored in the main storage unit 20, and reads the parallel processing program 50A stored in the file unit 40, into the main storage unit 20. The central processing unit 10 generates the data dependency edge information 100A (see FIG. 7) and the inter-thread data dependency instruction pair information 130A (see FIG. 11), and stores the information 100A, 130A into the main storage unit 20. The data dependency edge information 100A and the inter-thread data dependency instruction pair information 130A are obtained by analyzing a processing order of instructions, data referenced by each instruction, and data generated by each instruction, in the parallel processing program 50A read out into the main storage unit 20. It is to be noted that the parallel processing program 50A may be inputted by a programmer or the like via the input unit IN, and may be stored in the file unit 40.

The central processing unit 10 then receives an instruction from the parallel processing compiler 30A stored in the main storage unit 20, references the data dependency edge information 100A (see FIG. 7) and inter-thread data dependency instruction pair information 130A (see FIG. 11), and embeds a communication instruction into the parallel processing program 50A stored in the main storage unit 20.

The central processing unit 10 receives an instruction from the parallel processing compiler 30A stored in the main storage unit 20, and partitions the parallel processing program 50A with communication instructions embedded therein by threads. The central processing unit 10 stores the partitioned programs containing communication instructions 55A partitioned by threads, into the file unit 40. The central processing unit 10 can output the partitioned programs 55A via the output unit OUT.

Figure 13:
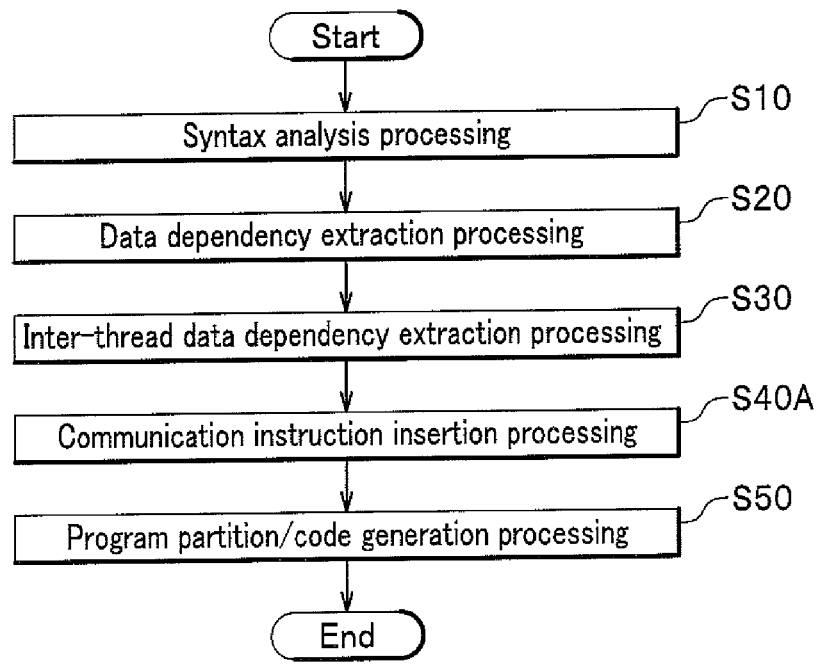
FIG. 13 is a flowchart showing operations of the program processing device according to the first embodiment.

FIG. 13 is a flowchart showing operations of the program processing device 1A (see FIG. 1). Next are described the operations of the program processing device 1A with reference to FIG. 13 (see also FIG. 1 as needed).

As shown in FIG. 13, the syntax analysis unit 31 performs a processing of analyzing syntax of the parallel processing program 50A (a syntax analysis processing) (S10). The data dependency extraction unit 32A then performs a processing of extracting a data dependency using an intermediate language generated in the syntax analysis processing (a data dependency extraction processing) (S20). The inter-thread data dependency extraction unit 33 performs a processing of extracting a data dependency between threads (an inter-thread data dependency extraction processing) (S30). The communication instruction insertion unit 35A performs a processing of inserting communication instructions into the program to generate programs containing communication instructions (a communication instruction insertion processing) (S40A). And, the program partition/code generation unit 39 performs a processing of partitioning the program containing communication instructions and of converting the partitioned programs into execution codes (a program partition/code generation processing) (S50)□

Figure 14:
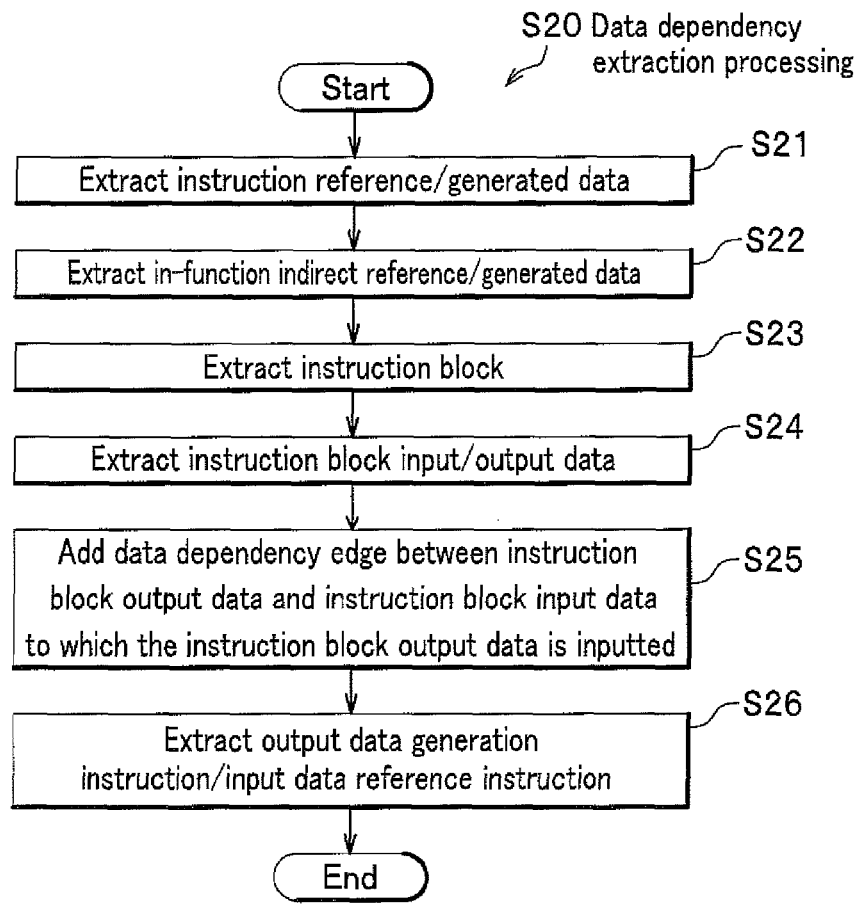
FIG. 14 is a flowchart showing steps of a data dependency extraction processing according to the first embodiment.

FIG. 14 is a flowchart showing details of the data dependency extraction processing S20 (see FIG. 13). Next is described the data dependency extraction processing S20 (see FIG. 13) with reference to FIG. 14 (see also FIG. 1 as needed).

As shown in FIG. 14, the instruction reference/generated data extraction unit 321 extracts a reference/generated data of each instruction from the intermediate language (S21). The in-function indirect reference/generated data extraction unit 323 extracts an in-function indirect reference/generated data from the intermediate language (S22). The instruction block extraction unit 324 extracts an instruction block from the intermediate language (S23). The instruction block input/output data extraction unit 325A extracts an instruction block input/output data from the intermediate language (S24). The data dependency edge generation unit 326 adds a data dependency edge between an instruction block output data and an instruction block input data, to which the instruction block output data is inputted (S25). This step enables the data dependency edge generation unit 326 to generate the data dependency edge information 100A (see FIG. 7). Then the output data generation instruction/input data reference instruction extraction unit 327 extracts an output data generation instruction/input data reference instruction (S26). This step enables the output data generation instruction/input data reference instruction extraction unit 327 to generate the output data generation instruction/input data reference instruction information 110A (see FIG. 8). With the above-described processing, the data dependency extraction unit 32A can generate the data dependency edge information 100A (see FIG. 7) and the output data generation instruction/input data reference instruction information 110A (see FIG. 8), using the intermediate language.

Figure 15:
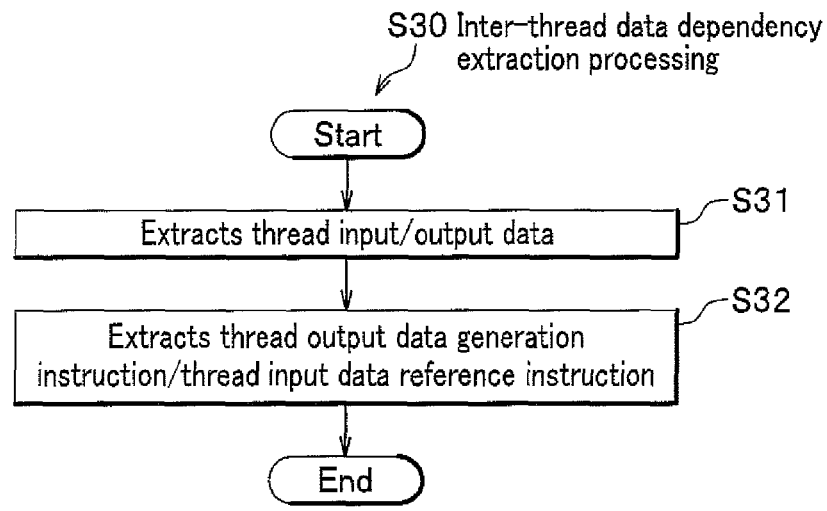
FIG. 15 is a detailed flowchart showing steps of an inter-thread data dependency extraction processing according to the first embodiment.

FIG. 15 is a flowchart showing details of the inter-thread data dependency extraction processing S30 (see FIG. 13). Next is described the inter-thread data dependency extraction processing S30 with reference to FIG. 15 (see also FIG. 1 as needed).

As shown in FIG. 15, the thread input/output data extraction unit 331 extracts a thread input/output data (S31) This step enables the thread input/output data extraction unit 331 to generate the inter-thread data dependency edge information 120A (see FIG. 9). Then the thread output data generation instruction/thread input data reference instruction extraction unit 332 extracts a thread output data generation instruction/thread input data reference instruction (S32). This step enables the thread output data generation instruction/ thread input data reference instruction extraction unit 332 to generate the inter-thread data dependency instruction pair information 130A (see FIG. 11). With the above processing, the inter-thread data dependency extraction unit 33 can generate the inter-thread data dependency instruction pair information 130A (see FIG. 11).

Figure 16:
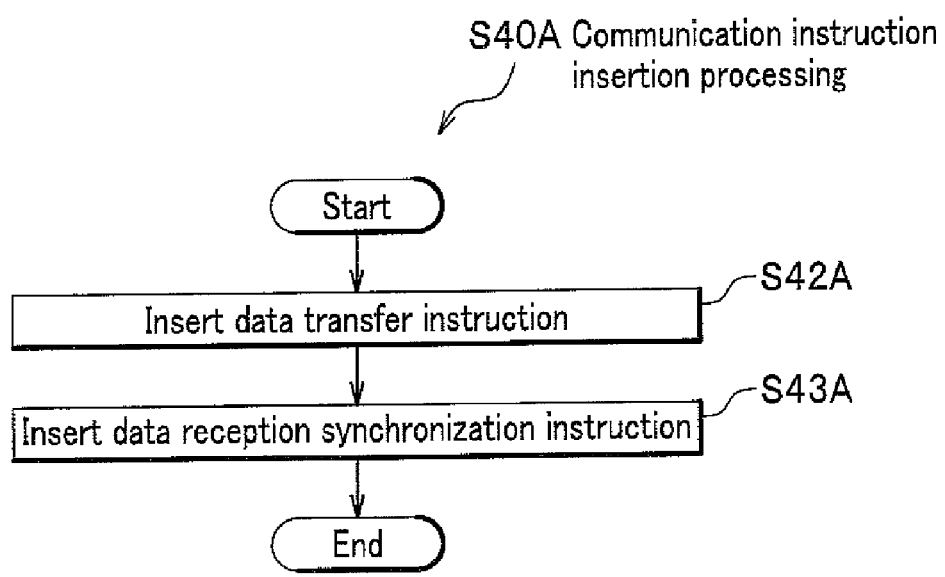
FIG. 16 is a detailed flowchart showing details of a communication instruction insertion processing according to the first embodiment.

FIG. 16 is a flowchart showing details of the communication instruction insertion processing S40A (see FIG. 13). Next is described the communication instruction insertion processing S40A with reference to FIG. 16 (see also FIG. 1 as needed).

As shown in FIG. 16, the data transfer instruction insertion unit 351A inserts a data transfer instruction into the intermediate language, just subsequent to a thread output data generation instruction of a thread input data reference instruction (S42A). Then the data reception synchronization instruction insertion unit 352A inserts a data reception synchronization instruction into the intermediate language containing the data transfer instruction, just prior to a thread input data reference instruction of a thread input data reference instruction (S43A). With the above-mentioned processing, the communication instruction insertion unit 35A can insert the communication instruction into the intermediate language.

In the program partition/code generation processing S50 (see FIG. 13), the program partition/code generation unit 39 partitions (program-partitions) the program containing the communication instruction generated by the communication instruction insertion unit 35A into processings performed by each thread, and converts (code-generates) the processings into execution codes. Thus, the program partition/code generation unit 39 can generate the partitioned programs containing communication instructions 55A (see FIG. 1). The program partition and code generation is not specifically different from that which is well-known and is performed by an ordinary compiler. A further detailed description of the program partition and code generation is thus omitted herefrom.

Second Embodiment

Next is described a second embodiment of the present invention with reference to FIG. 17 to FIG. 22. The second embodiment is directed to a dependency of a data structure. The second embodiment is the same as the first embodiment except that, if a parallel processing program contains a data structure, a dependency between instructions having an effect on the data structure is extracted; an input/output data of an instruction block is extracted, and data dependency edge information is generated, using a result of the aforementioned extraction; an output data generation instruction/input data reference instruction is extracted, using the data dependency edge information of the instruction block; and output data generation instruction/input data reference instruction information is generated. The same reference characters are assigned to the same components as those in the first embodiment, and a description thereof is omitted herefrom.

The data structure herein means a data aggregate constituted by a plurality of single data such as an array date and a "structure" of C language. The single data herein means an object of information generated and referenced by an instruction (a unit of data acted on by an operation instruction), and in other words, it means an ordinary "data". For convenience of description, an object of information generated and referenced by an instruction is hereinafter referred to as a "single data", and a data aggregate constituted by a plurality of single data is hereinafter referred to as a "data structure".

A single data creates a simple data dependency from a data generation instruction to a data reference instruction (that is, a data reference instruction depends on a data generation instruction), because a single data is completely rewritten under an instruction of generating the single data (an assignment instruction). The simple data dependency is a principle of operating a data flow machine (data-driven control). The data dependency described above is hereinafter referred to as a single data dependency.

When a data structure is accessed, an operation instruction may access (rewrite or read) only a portion of the data structure (an element in the data structure), and, furthermore, cannot identify to which element in the data structure the operation instruction has accessed during compiling. Some examples of such an element are an array access by a variable index and a pointer reference data. Therefore, a dependency based on vagueness in accessing the data structure (Read-after-write dependency (true dependency) and Write-after-write dependency (output dependency)) is hereinafter defined as below.

The Read-after-write dependency herein means a dependency created from a "rewrite instruction" directed to a given element in a data structure, to a "read instruction" directed to a given element in the data structure. The Read-after-write dependency is similar to the single data dependency. However, the Read-after-write dependency creates a dependency based on the "vagueness in accessing the data structure", even if an element acted on by a rewrite instruction is not identical to an element acted on by a read instruction.

The Write-after-write dependency herein means a dependency created from a "rewrite instruction" directed to a given element in a data structure, to a "rewrite instruction" directed to a given element in the data structure.

A data dependency of a single data cannot have the Write-after-write dependency. This is because, when a data generation instruction directed to a single data is executed, a definition previously made by another data generation instruction on the single data is completely invalidated (completely rewritten), which logically cancels a data dependency created by the previous data generation instruction.

A rewritten data is not necessarily invalidated, when a plurality of "rewrite instructions" are executed to a data structure (because different rewrite instructions may rewrite different elements). Therefore, a rewrite history of the data structure is needed to be stored. A means of storing the rewrite history is used for serializing the rewrite instructions by a data dependency edge. The Write-after-write dependency can be handled like an ordinary data dependency (a data dependency of single data), by interpreting that a rewrite instruction to a data structure is virtually constituted by two operations: "read all elements in the data structure" and "rewrite one element in the data structure, and generate a new data structure in which the one element is rewritten but the other elements are kept unchanged". A data dependency between instructions which act on a data structure is herein referred to as a data structure dependency.

The second embodiment has a configuration in which an instruction block input/output data is extracted from the parallel processing program 50B containing a data structure (see FIG. 17); and data dependency edge information and an output data generation instruction/input data reference instruction are also extracted.

Figure 17:
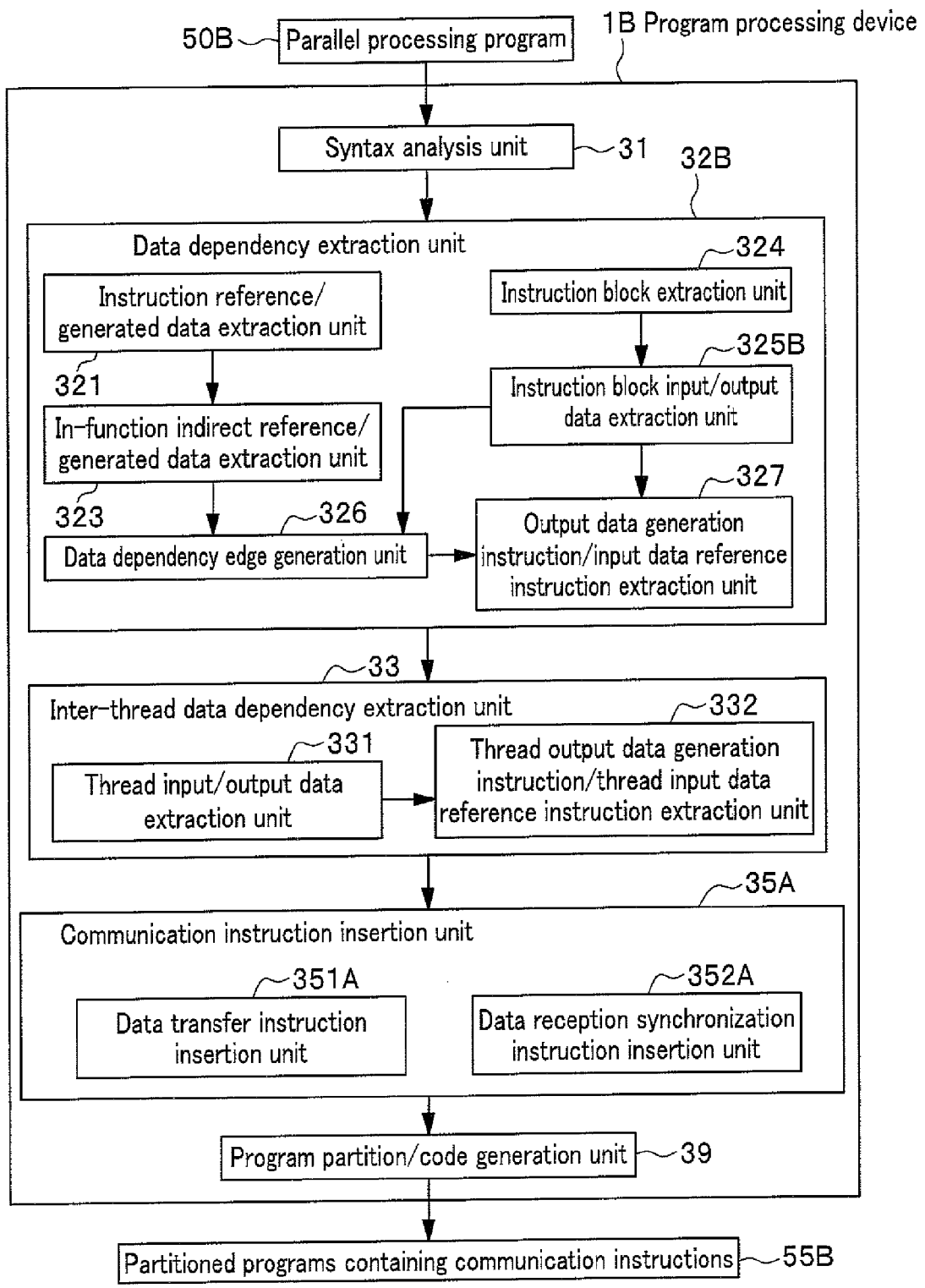
FIG. 17 is a functional block diagram showing an example of functions of a program processing device according to a second embodiment.

FIG. 17 is a functional block diagram showing an example of functions of a program processing device according to a second embodiment. As shown in FIG. 17, a program processing device 1B inputs therein a parallel processing program 50B containing data structures, and outputs partitioned programs containing communication instructions 55B. In the second embodiment, a function of an instruction block input/output data extraction unit 325B included in a data dependency extraction unit 32B of the program processing device 1B is different from that of the instruction block input/output data extraction unit 325A in the first embodiment. Among components of the program processing device 1B, next is described the function of the instruction block input/output data extraction unit 325B.

A program shown in FIG. 18 is an example of a parallel processing program described by a programmer or the like. A description herein is made assuming a case where the syntax analysis unit 31 inputs therein the parallel processing program 50B, analyzes syntax thereof, and generates an intermediate language therefrom. As a matter of convenience, the description is made assuming that the parallel processing program 50B is used as the intermediate language.

(Description of Instruction Block Input/Output Data Extraction Unit 325B)

The instruction block input/output data extraction unit 325B input therein the intermediate language generated by the syntax analysis unit 31 and instruction block information generated by the instruction block extraction unit 324; extracts a dependency between instructions, which act on the data structure contained in the parallel processing program 50b; and extracts an instruction block input data and an instruction block output data from the intermediate language, using the instruction block information. Next is described, among functions of the instruction block input/output data extraction unit 325B, only a function thereof different from that of the instruction block input/output data extraction unit 325A in the first embodiment (namely, a function of extracting a dependency between instructions acting on the data structure), with reference to FIG. 18 to FIG. 20 (see FIG. 17 as needed).

Figure 19:
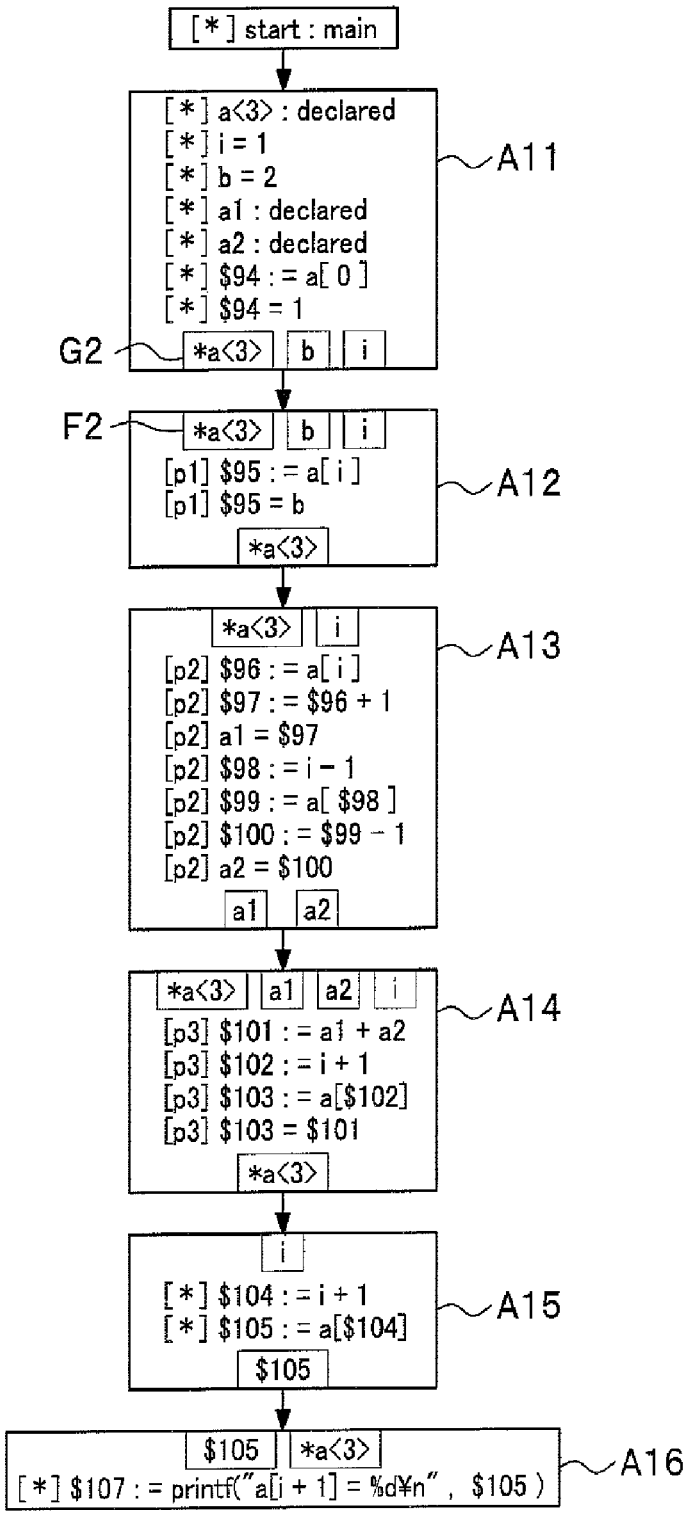
FIG. 19 is a program graph showing results of extracting an input/output data from an intermediate language according to the second embodiment.

FIG. 19 is a program graph showing results in which the instruction block input/output data extraction unit 325B extracts the instruction block input data and the instruction block output data from the intermediate language generated by the syntax analysis unit 31. FIG. 19 shows, for example, an instruction block input data node F2 and an instruction block output data node G2. Next is described how the instruction block input/output data extraction unit 325B extracts an instruction block input/output data.

As shown in FIG. 19, the parallel processing program 50B is partitioned into instruction blocks A11 to A16 by the instruction block extraction unit 324. For example, an instruction "a[0]=1;" in the parallel processing program 50B, line 3 shown in FIG. 18 is divided by the syntax analysis unit 31 into two instructions as follows (see the instruction block A11):

$$\$94:=a[0] \tag{1}$$

$$\$94=1 \tag{2}$$

The instruction (1) is an operation for computing an address of a 0th element in an array "a" and for storing the address in an intermediate variable $94. The instruction (2) is an operation for assigning the address of $94 to a right-hand side of "1". It is to be noted that the intermediate variable ($94 herein) indicating the address of an element in a data structure represents an element data value stored in the address, if the intermediate variable is referenced in a given operation instruction (in a rewrite instruction and a read instruction shown below).

The instruction block input/output data extraction unit 325B detects, for example, in the instruction block A11, the instruction "$94:=a[0]" for computing an address of an element in the array "a" to store the address in the intermediate variable $94. The instruction block input/output data extraction unit 325B also detects, for example, in the instruction block A11, an instruction "$94=1", on left side of which has the intermediate variable (data structure element address) of $94; and determines that the instruction "$94=1" is a rewrite instruction (data structure rewrite instruction) to the array "a". Similarly, the instruction block input/output data extraction unit 325B detects, for example, a data structure rewrite instruction "$95=b" in the instruction block A12, and a data structure rewrite instruction "$103=$101" in an instruction block A14. The instruction block input/output data extraction unit 325B can thus extract a data structure rewrite instruction.

The instruction block input/output data extraction unit 325B detects, for example, in the instruction block A13, an instruction "$96:=a[i]" for computing an address of a element in the array "a" to store the address in an intermediate variable $96. The instruction block input/output data extraction unit 325B also detects, for example, in the instruction block A13, an instruction "$97:=$96+1", on right side of which has the intermediate variable (data structure element address) of $96; and determines that the instruction "$97:=$96+1" is a read instruction (data structure read instruction) to the array "a". Similarly, the instruction block input/output data extraction unit 325B detects, for example, a data structure read instruction "$100:=$99−1" in the instruction block A13, and a data structure read instruction "$107:=printf("a[i+1]=% d\n", $105)" in the instruction block A16. The instruction block input/output data extraction unit 325B can thus generate a data structure read instruction.

The instruction block input/output data extraction unit 325B determines that a dependency from a data structure rewrite instruction to another data structure rewrite instruction is the Write-after-write dependency. Further, the instruction block input/output data extraction unit 325B determines that a dependency from a data structure rewrite instruction to a data structure read instruction is the Read-after-write dependency.

FIG. 20 is a view for explaining a dependency of a data structure extracted by the instruction block input/output data extraction unit 325B. As shown in FIG. 20, for example, a dependency from a data structure rewrite instruction "$94=1" to another data structure rewrite instruction "$95=b" is represented as the Write-after-write dependency. Further, for example, a dependency from a data structure rewrite instruction "$95=b" to a data structure read instruction "$97:=$96+1" is represented as the Read-after-write dependency.

The instruction block input/output data extraction unit 325B searches for, when there is a data of interest in a data block, another data which has the Write-after-write dependency or the Read-after-write dependency to the data of interest in another block, and extracts the searched data in another block as an instruction block input/output data. The instruction block input/output data extraction unit 325B then references the instruction block information extracted by the instruction block extraction unit 324, and determines that, for example, the data structure rewrite instruction "$94=1" to the array "a" is in the instruction block A11. The instruction block input/output data extraction unit 325B then determines that the data structure rewrite instruction "$95=b" to the array "a" exists in an instruction block other than the instruction block A11 (namely, the instruction block A12), and that the instruction "$95=b" has the Write-after-write dependency to the data structure rewrite instruction "$94=1". As a result, the instruction block input/output data extraction unit 325B can extract the array "a" as an instruction block output data in the instruction block A11. And at the same time, the instruction block input/output data extraction unit 325B can extract the array "a" as an instruction block input data in the instruction block A12. In FIG. 19, the extracted results are shown as an instruction block output data node G2 and an instruction block input data node F2, respectively. For example, the instruction block output data node G2 and instruction block input data node F2 are described as *a<3>, which represents a given element in the array a[3].

The instruction block input/output data extraction unit 325B can extract an instruction block input/output data as described above. The extracted instruction block input/output data is added to the program graph of FIG. 19 as an instruction block input/output data node. Thus the instruction block input/output data extraction unit 325B can generate information on an instruction block input/output data, in which an instruction block extracted by the instruction block extraction unit 324 is associated with an input/output data (containing a data structure) in the instruction block (instruction block input/output data information).

The instruction block information generated by the instruction block extraction unit 324 and the information on an instruction block input/output data (containing a data structure) (the instruction block input/output data information) generated by the instruction block input/output data extraction unit 325B are transferred to the data dependency edge generation unit 326.

FIG. 21 is a table showing the data dependency edge information generated by the data dependency edge generation unit 326 (see FIG. 17). The data dependency edge generation unit 326 inputs therein the intermediate language generated by the syntax analysis unit 31, the instruction block information generated by the instruction block extraction unit 324, and the instruction block input/output data information generated by the instruction block input/output data extraction unit 325B; and generates data dependency edge information on a data structure using a processing similar to that of generating the data dependency edge information on a single data. In the second embodiment, the parallel processing program 50B is used, in which there is not any preceding edge or succeeding edge. Hence, columns of the preceding edge or succeeding edge are omitted from the table of the data dependency edge information 100B.

FIG. 22 is a table showing the output data generation instruction/input data reference instruction information generated by the output data generation instruction/input data reference instruction extraction unit 327 (see FIG. 17). The output data generation instruction/input data reference instruction extraction unit 327 inputs therein the intermediate language generated by the syntax analysis unit 31, and the data dependency edge information 100B (see FIG. 21) generated by the data dependency edge generation unit 326; and extracts an output data generation instruction and an input data reference instruction, using the processing similar to that of generating the data dependency edge information on a single data.

In the second embodiment as described above, the program processing device 1B analyzes the parallel processing program 50B containing a data structure, and can generate the partitioned programs containing communication instructions 55B which is applicable to an existing distributed memory system and an existing shared memory system.

A hardware configuration of the program processing device 1B is the same as that of the program processing device 1A (see FIG. 1), and a description thereof is omitted herefrom.

Third Embodiment

Next is described a third embodiment of the present invention with reference to FIG. 23 to FIG. 34. The third embodiment is the same as the second embodiment except the following. A data dependency between data objects indicated by a pointer (a variable for storing an address in a memory) is extracted. Then an output data generation instruction/input data reference instruction of a pointer reference data (a data stored in an address in a memory specified by a pointer) is extracted using the obtained pointer alias data dependency. If a communication between threads by a pointer is present, the pointer transferred between the threads is extracted, and a pointer alias ID computing instruction is inserted. A data transfer instruction and a data reception instruction are inserted. And, a thread start-up instruction is also inserted. Other than the above-mentioned differences, the same reference characters are assigned to the same elements as those in the second embodiment, and a description thereof is omitted herefrom.

A pointer reference data, which is accessed via a pointer, is herein regarded as a type of data structure, because a pointer may indicate a data structure (such as an array data)

Figure 23:
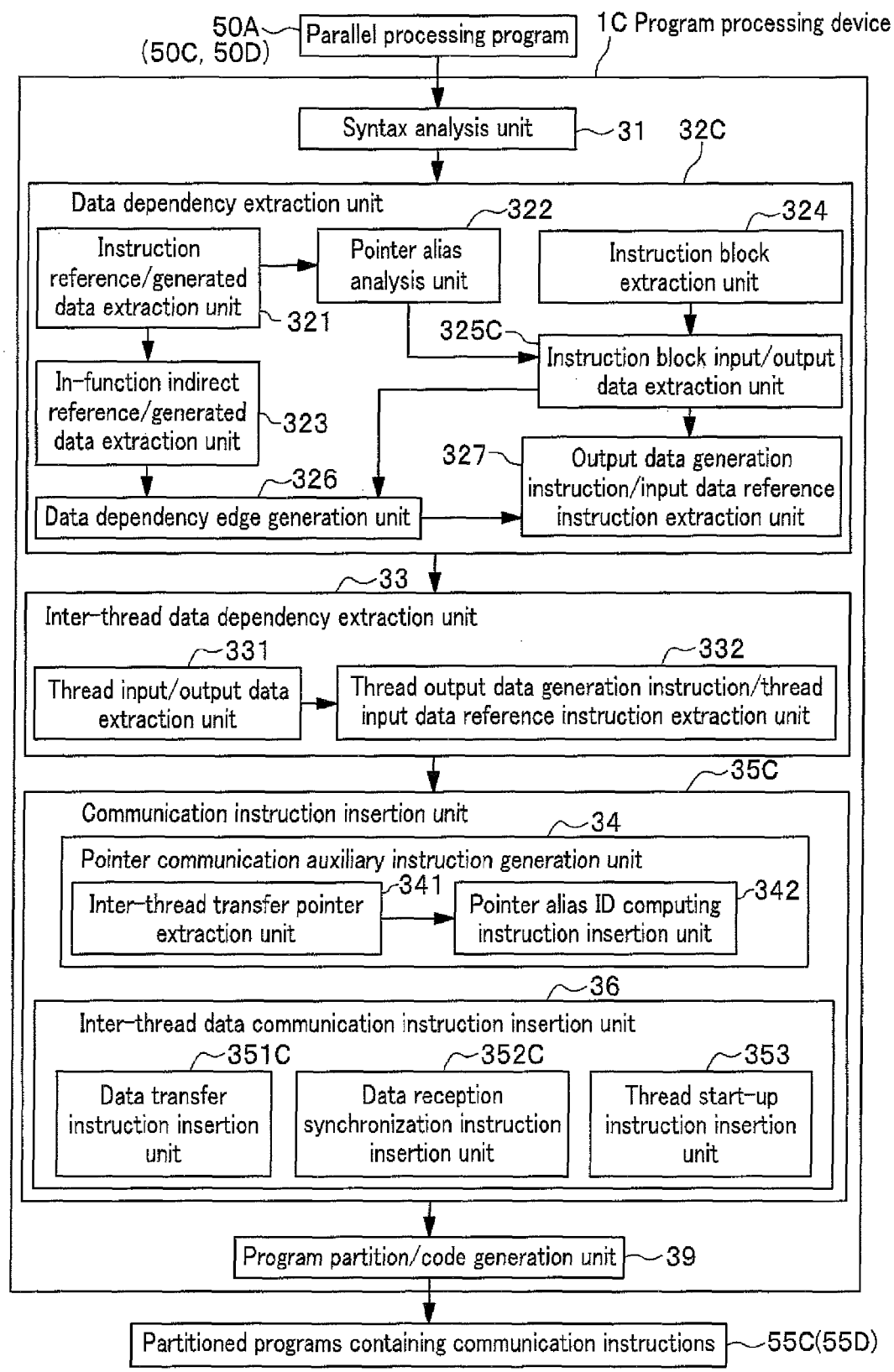
FIG. 23 is a functional block diagram showing an example of functions of a program processing device according to a third embodiment.

FIG. 23 is a functional block diagram showing an example of functions of a program processing device in the third embodiment. As shown in FIG. 23, a program processing device 1C inputs therein a parallel processing program 50C containing a pointer reference data, and outputs partitioned programs containing communication instructions 55C. In the third embodiment, a function of a pointer alias analysis unit 322 included in the data dependency extraction unit 32C in the program processing device 1C is added to the second embodiment. A function of a instruction block input/output data extraction unit 325C included in the data dependency extraction unit 32C in the program processing device 1C in the third embodiment is different from that of the instruction block input/output data extraction unit 325B in the second embodiment. Among components of the program processing device 1C, next are described the function of the pointer alias analysis unit 322 and the instruction block input/output data extraction unit 325C. Other differences between the third embodiment and the second embodiment will be described later.

FIG. 24 is an example of a parallel processing program containing a data structure described by a programmer or the like. A description herein is made assuming a case in which the syntax analysis unit 31 inputs therein the parallel processing program 50C, analyzes syntax thereof, and generates an intermediate language therefrom. As a matter of convenience, the description is made assuming that the parallel processing program 50C is used as the intermediate language.

(Description of Pointer Alias Analysis Unit 322)

The pointer alias analysis unit 322 generates an alias list (port alias information). The alias list is a list of all data objects (such as a data structure or a single data) indicated by a pointer. The pointer alias analysis unit 322 sequentially updates the alias list using a reference data list and a generated data list of instructions extracted by the instruction reference/generated data extraction unit 321. The alias list is updated by an assignment instruction directed to a pointer. How then alias list is updated is the same as a well-known method.

Next is described how an alias list is updated, using the parallel processing program 50C shown in FIG. 24 as an example. An assignment instruction to a pointer variable includes an instruction of assigning an address of a data structure (a data structure address assignment instruction) and an instruction of assigning a pointer value (a pointer value assignment instruction).

The data structure address assignment instruction is an instruction which can be expressed by "p1=[an address of a data structure]+(an integer variable or an integer constant)", in which a pointer is p1. The pointer alias analysis unit 322 adds a data structure to an alias list of the pointer p1 under the instruction. For example, the pointer alias analysis unit 322 adds an "*a<3>", which corresponds to all data objects indicated by a pointer pa, to an alias list of the pa, under an instruction "pa=a+1" in line 3 of the parallel processing program 50C. The alias list of the pa, which has not had any data so far, is updated to have {*a<3>}. Similarly, for example, the pointer alias analysis unit 322 adds "a1", which corresponds to all data objects indicated by the pointer pal, to an alias list of the pal, under an instruction "pa1=&a1" in line 5 of the parallel processing program 50C. The alias list of the pa1, which has not had any data so far, is updated to have {a1}.

The pointer value assignment instruction is an instruction which can be expressed by "p1=p2+(an integer variable or an integer constant)", in which p1 and p2 are pointers. The pointer alias analysis unit 322 adds all elements in an alias list of the pointer p2 to an alias list of the pointer p1 under the instruction. For example, the pointer alias analysis unit 322 adds all elements in the alias list of pa to an alias list of paa, under an instruction "paa=pa+1" in line 4 of the parallel processing program 50C. At this time, the alias list of pa has {*a<3>} (which has been updated to have {*a<3>} under the instruction "pa=a+1" in line 3, as described above), and thus, the pointer alias analysis unit 322 adds {*a<3>} in the alias list of pa to the alias list of paa. The alias list of paa, which has not had any data so far, is updated to have {*a<3>}.

(Description of Instruction Block Input/Output Data Extraction Unit 325C)

The instruction block input/output data extraction unit 325C inputs therein the intermediate language generated by the syntax analysis unit 31, the instruction block information extracted by the instruction block extraction unit 324, and the alias list of a pointer generated by the pointer alias analysis unit 322; extracts a pointer alias data dependency; and extracts an instruction block input data and an instruction block output data from the intermediate language, using the instruction block information. Among the functions of the instruction block input/output data extraction unit 325C, next is described only a function different from that of the instruction block input/output data extraction unit 325B in the second embodiment (namely, a function of extracting a pointer alias data dependency) with reference to FIG. 24 to FIG. 27 (see also FIG. 23 as needed).

Figure 25:
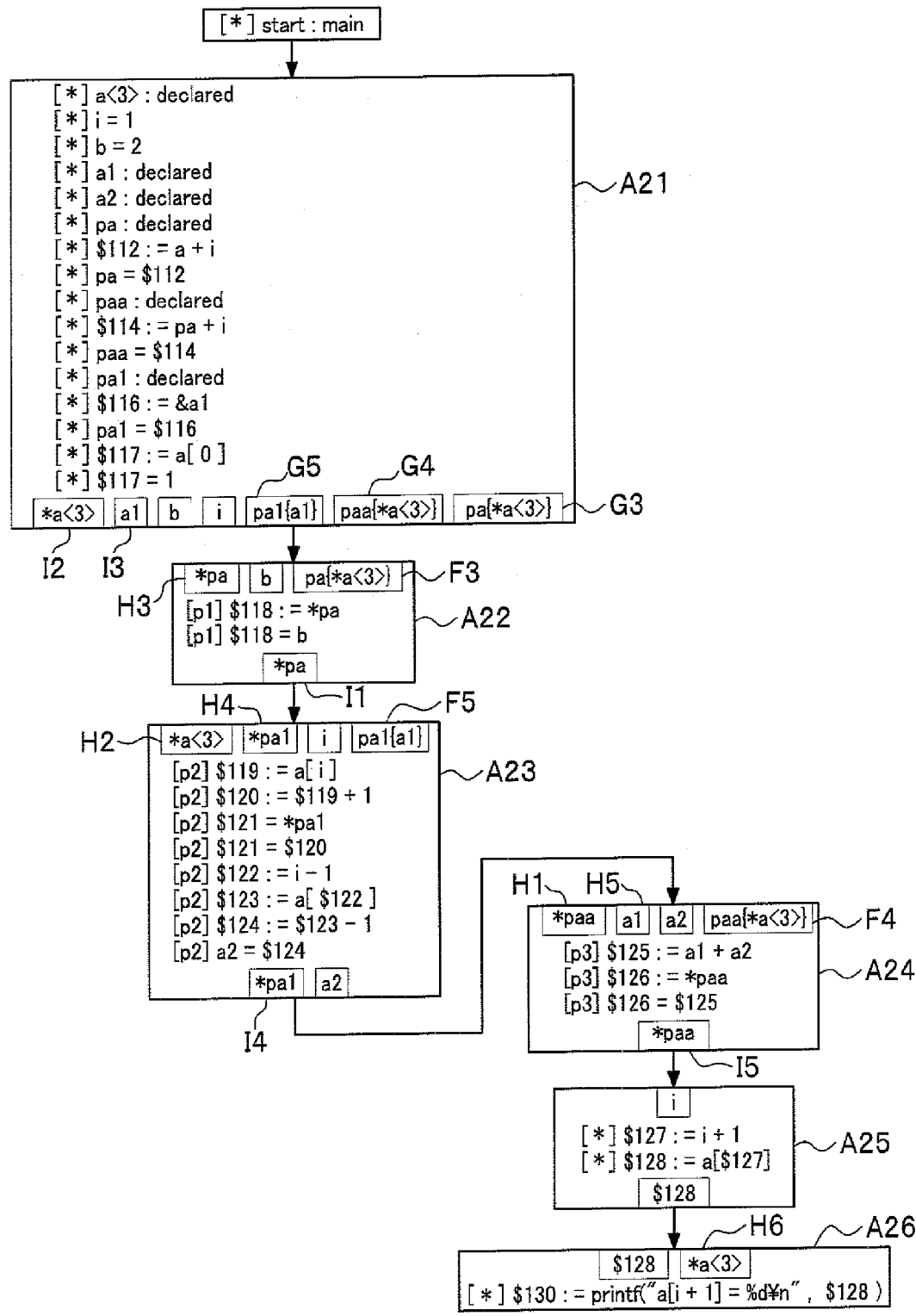
FIG. 25 is a program graph showing results of extracting an input/output data from an intermediate language according to the third embodiment.

FIG. 25 is a program graph showing results of extracting an instruction block input data and an instruction block output data by the instruction block input/output data extraction unit 325C, from the intermediate language generated by the syntax analysis unit 31. Next is described how an instruction block input/output data is extracted by the instruction block input/output data extraction unit 325C.

A pointer reference data has a data dependency to each object in an alias list of a pointer, and to other reference data with which the alias list of the pointer is partially (or entirely) overlapped (that is, to any data that may indicate an identical data). Such a data dependency is herein referred to as a pointer alias data dependency. The instruction block input/output data extraction unit 325C also has a function of extracting the pointer alias data dependency.

The instruction block input/output data extraction unit 325C determines that, for example, a data reference instruction "$118:=*pa" to the pointer pa is in a block A22. The instruction block input/output data extraction unit 325C also determines that a data rewrite instruction "pa=$112" to the pointer pa is in an instruction block other than the instruction block A22 (that is, in an instruction block A21). The instruction block input/output data extraction unit 325C thus extracts the pointer pa as an instruction block output data in the instruction block A21. And at the same time, the instruction block input/output data extraction unit 325C extracts the pointer pa as an instruction block input data in the instruction block A22. In FIG. 25, those extracted results are shown as an instruction block output data node G3 and an instruction block input data node F3, respectively. For example, pa{*a<3>} described in the instruction block output data node G3 and instruction block input data node F3 shows that a value of the pointer pa and {*a<3>} in the alias list of the pa is outputted from the instruction block A21 and then inputted into the instruction block A22. Similarly, an instruction block input data node F4, instruction block input data node F5, instruction block output data node G4, instruction block output data node G5 are extracted.

The instruction block input/output data extraction unit 325C determines that a rewrite instruction "$118=b" to a pointer reference data *pa by the pointer pa is in the block A22. The instruction block input/output data extraction unit 325C references an alias list of pa under the instruction "$118=b". As described above, after the instruction block A22 receives {*a<3>} in the alias list of pa from the instruction block A21 as the instruction block input data, any data has not been added to the alias list of pa until the instruction "$118=b" is executed. Therefore, the alias list of port alias still has {*a<3>} under the instruction "$118=b". Similarly, the instruction block A24 receives {*a<3>} in the alias list of paa from the instruction block A21 as the instruction block input data. After that, any data has not been added to the alias list of paa until the instruction "$126=$125" is executed, the alias list of paa still has {*a<3>} under the instruction "$126=$125".

The instruction block input/output data extraction unit 325C searches each object in the alias list of pa, and other pointer reference data with which the alias list of pa is partially (or entirely) overlapped; and extracts the searched object or pointer reference data as a data indicating a pointer alias data dependency. That is, the instruction block input/output data extraction unit 325C extracts *a<3> as an object in the alias list of pa under the instruction "$118=b" (because {*a<3>} in the alias list of pa under the instruction "$118=b" entirely overlapped with {*a<3>} in the alias list of paa under the instruction "$126=$125"); and extracts *paa as other pointer reference data, with which the alias list of pa is partially (or entirely) overlapped under the instruction "$118=b". Hence, pa under the instruction "$118=b" has a pointer alias data dependency to both *a<3> and *paa.

The instruction block input/output data extraction unit 325C searches for, for example, when there is a data of interest in a data block, another data having the Write-after-write dependency or Read-after-write dependency to the data of interest, in another block, among the object *a<3> and the pointer reference data *paa each indicating a pointer alias data dependency to the pointer reference data *pa; and extracts the searched data as an instruction block input/output data. The instruction block input/output data extraction unit 325C then references the instruction block information extracted by the instruction block extraction unit 324; determines that the data rewrite instruction "$118=b" by the pointer reference data *pa is in the instruction block A22; and further determines that the data rewrite instruction "$126=$125" by the pointer reference data *paa, which has the Write-after-write dependency to the data rewrite instruction "$118=b", is in an instruction block other than the instruction block A22 (that is, in the instruction block A24). The instruction block input/output data extraction unit 325C can thus extract the pointer reference data *pa as an instruction block output data in the instruction block A22. And at the same time, the instruction block input/output data extraction unit 325C can extract the pointer reference data *paa as an instruction block input data in the instruction block A24. In FIG. 25, the extracted results are indicated as an instruction block output data node I1 and an instruction block input data node H1, respectively.

The instruction block input/output data extraction unit 325C references the instruction block information extracted by the instruction block extraction unit 324; determines that the data rewrite instruction "$118=b" by the pointer reference data *pa is in the instruction block A22; and further determines that the data rewrite instruction "$120:=$119+1" to the array "a", which has the Read-after-write dependency with the data rewrite instruction "$118=b", is in an instruction block other than the instruction block A22 (that is, in the instruction block A23). The instruction block input/output data extraction unit 325C can thus extract the pointer reference data *pa as an instruction block output data in the instruction block A22. And at the same time, the instruction block input/output data extraction unit 325C can extract *a<3> as an instruction block input data in the instruction block A23. In FIG. 25, the extracted results are indicated as the instruction block output data node I1 and an instruction block input data node H2, respectively. Similarly, instruction block input data nodes H3 to H6, and instruction block output data nodes I2 to I5 are extracted. Further in FIG. 25, instruction block input/output data nodes without reference characters each represent a data dependency between single data, and can be extracted using a function similar to that of the instruction block input/output data extraction unit 325A.

As described above, the instruction block input/output data extraction unit 325C can extract an instruction block input/output data containing a pointer alias data dependency. The instruction block input/output data extraction unit 325C can thus generate information on an instruction block input/output data, in which an instruction block extracted by the instruction block extraction unit 324 is associated with an input/output data (containing a pointer alias data dependency) in the instruction block (instruction block input/output data information).

The instruction block information generated by the instruction block extraction unit 324 and the information on the instruction block input/output data (containing a pointer alias data dependency) generated by the instruction block input/output data extraction unit 325C (the instruction block input/output data information) are transferred to the data dependency edge generation unit 326.

FIG. 26 is a table showing data dependency edge information generated by the data dependency edge generation unit 326 (see FIG. 23). The data dependency edge generation unit 326 inputs therein the intermediate language generated by the syntax analysis unit 31, the instruction block information generated by the instruction block extraction unit 324, and the instruction block input/output data information generated by the instruction block input/output data extraction unit 325C; and generates data dependency edge information of a pointer reference data, using a processing similar to that of generating the data dependency edge information on a single data. In the third embodiment, the parallel processing program 50C is used, in which there is not any preceding edge or succeeding edge. Hence, columns of the preceding edge or succeeding edge are omitted from the table of the data dependency edge information 100C.

FIG. 27 is a table showing output data generation instruction/input data reference instruction information generated by the output data generation instruction/input data reference instruction extraction unit 327 (see FIG. 23). The output data generation instruction/input data reference instruction extraction unit 327 inputs therein the intermediate language generated by the syntax analysis unit 31, and the data dependency edge information 100C (see FIG. 26) generated by the data dependency edge generation unit 326; and extracts an output data generation instruction and an input data reference instruction, using a processing similar to that of generating the data dependency edge information on a single data. It is to be noted that a data generation instruction of a data dependency edge 2 (see FIG. 27) is not supposed to exist (because an instruction of assigning to a1 does not exist in the instruction block A21). In this case, "[*] a1: declared" is used as a data generation instruction of practical convenience. The "[*] a1: declared" is a "variable declaration instruction" virtually inserted into a position where a1 is declared on a program code.

As shown in FIG. 23, the program processing device 1C inputs therein the parallel processing program 50D containing pointers transferred between threads, and generates a program into which a pointer alias ID computing instruction is inserted. Based on the program, the program processing device 1C outputs the partitioned programs 55D containing communication instructions. Besides the above-mentioned, the program processing device 1C in the third embodiment is different from the program processing device 1B in the second embodiment as follows. Functions of a pointer communication auxiliary instruction generation unit 34 (including an inter-thread transferred pointer extraction unit 341 and a pointer alias ID computing instruction insertion unit 342□included in the communication instruction insertion unit 35C is added to the third embodiment. Functions of a data transfer instruction insertion unit 351C and a data reception synchronization instruction insertion unit 352C each included in the communication instruction insertion unit 35C in the program processing device 1C in the third embodiment are different from those of the data transfer instruction insertion unit 351A and the data reception synchronization instruction insertion unit 352A in the second embodiment. Functions of a thread start-up instruction insertion unit 353 included in the communication instruction insertion unit 35C in the program processing device 1C are added to the third embodiment. Among components of the program processing device 1C, next are described the pointer communication auxiliary instruction generation unit 34 (including the inter-thread transferred pointer extraction unit 341 and the pointer alias ID computing instruction insertion unit 342) and an inter-thread data communication instruction insertion unit 36 (including the data transfer instruction insertion unit 351C, the data reception synchronization instruction insertion unit 352C, and the thread start-up instruction insertion unit 353).

FIG. 28 is an example of a parallel processing program containing a pointer transferred between threads, described by a programmer or the like. A description of the pointer communication auxiliary instruction generation unit 34 is made assuming a case in which the syntax analysis unit 31 inputs therein the parallel processing program 50D, analyzes syntax thereof, and generates an intermediate language therefrom; and the program processing device 1C performs a processing, using the intermediate language. As a matter of convenience, the functions of the pointer communication auxiliary instruction generation unit 34 are described using the parallel processing program 50D as the intermediate language. A description of the functions of the data transfer instruction insertion unit 351C, data reception synchronization instruction insertion unit 352C, and thread start-up instruction insertion unit 353 are made assuming a case in which the syntax analysis unit 31 inputs therein the parallel processing program 50A, analyzes syntax thereof, and generates an intermediate language therefrom. As a matter of convenience, the functions of the data transfer instruction insertion unit 351C, data reception synchronization instruction insertion unit 352C, and thread start-up instruction insertion unit 353 are described using the parallel processing program 50A as the intermediate language.

(Description of Pointer Communication Auxiliary Instruction Generation Unit 34)

The pointer communication auxiliary instruction generation unit 34 inputs therein the intermediate language generated by the syntax analysis unit 31, the inter-thread data dependency edge information generated by the thread input/output data extraction unit 331, and the inter-thread data dependent instruction pair information generated by the thread output data generation instruction/thread input data reference instruction extraction unit 332, and the alias list generated by the pointer alias analysis unit 322; extracts a pointer transferred between threads; and inserts a pointer alias ID computing instruction into the intermediate language generated by the syntax analysis unit 31. The pointer communication auxiliary instruction generation unit 34 includes the inter-thread transferred pointer extraction unit 341 and the pointer alias ID computing instruction insertion unit 342.

(Description of Inter-Thread Transfer Pointer Extraction Unit 341)

The inter-thread transferred pointer extraction unit 341 references the inter-thread data dependency edge information generated by the thread input/output data extraction unit 331, and extracts an inter-thread data dependency edge of a pointer type (a pointer-type inter-thread data dependency edge). The inter-thread transferred pointer extraction unit 341 extracts therefrom a pointer transferred between threads (an inter-thread transferred pointer). Next is described an example of functions of the inter-thread transferred pointer extraction unit 341 with reference to FIG. 28 or FIG. 29.

Figure 29:
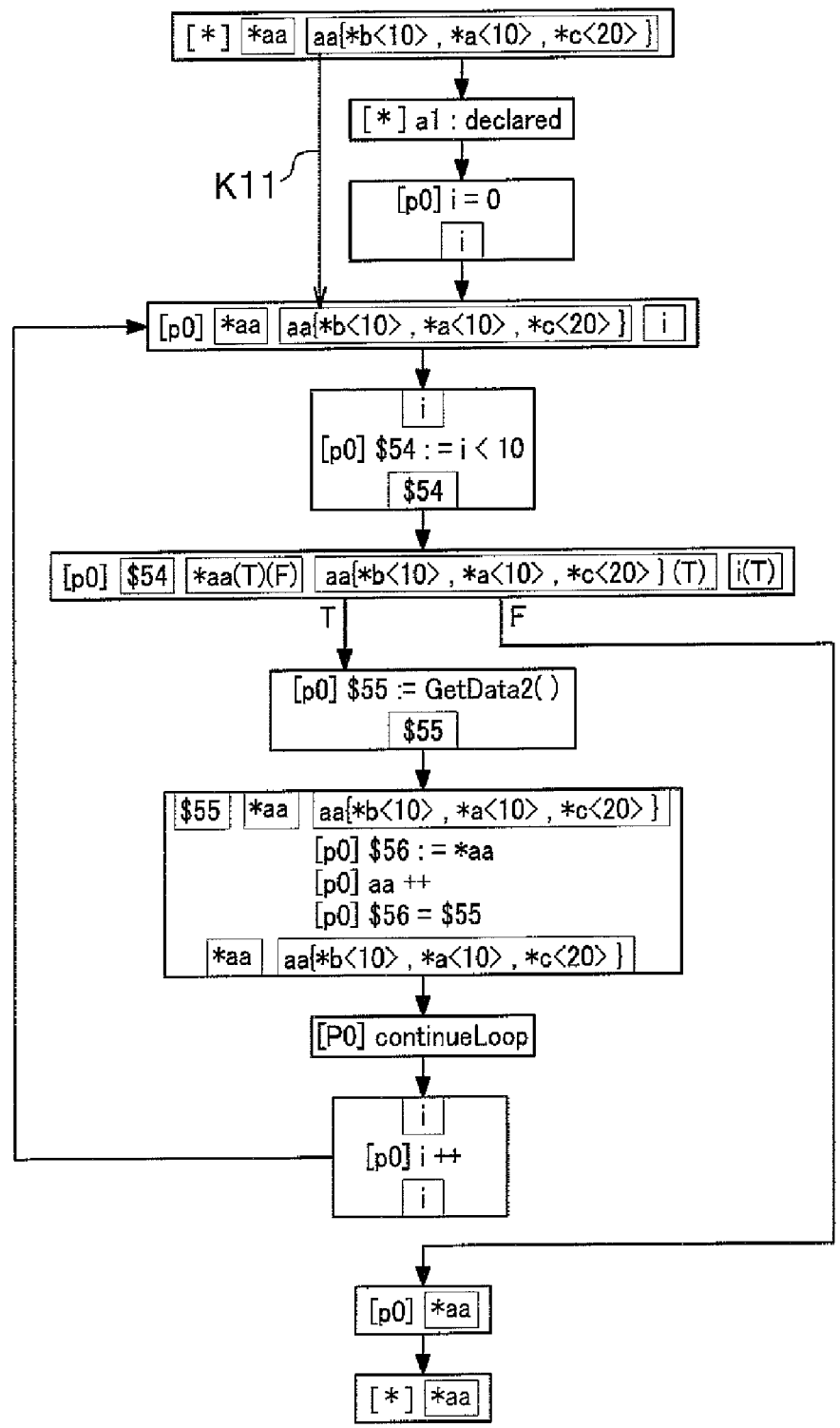
FIG. 29 is a program graph of a called function in the parallel processing program according to the third embodiment.

FIG. 29 is a program graph of a function GetData in the parallel processing program 50D. As shown in FIG. 29, the inter-thread transferred pointer extraction unit 341 extracts that an inter-thread data dependency edge K11 of a pointer "aa" goes across a base thread [*] and a thread [p0], and extracts the pointer "aa" as an inter-thread transferred pointer. Information on the inter-thread transferred pointer (that is, information that the pointer "aa" is an inter-thread transferred pointer) is transmitted to the pointer alias ID computing instruction insertion unit 342.

(Description of Pointer Alias ID Computing Instruction Insertion Unit 342)

The pointer alias ID computing instruction insertion unit 342 references the intermediate language generated by the syntax analysis unit 31, the alias list generated by the pointer alias analysis unit 322, and the inter-thread transferred pointer information generated by the inter-thread transferred pointer extraction unit 341; and inserts a pointer alias ID computing instruction into the intermediate language generated by the syntax analysis unit 31. Next is described an example of functions of the pointer alias ID computing instruction insertion unit 342 with reference to FIG. 28 to FIG. 30.

An additional function of the pointer alias analysis unit 322 is described herein. A pointer-type function argument is interpreted as an assignment instruction of a call argument of a function call instruction. For example, in FIG. 28, a function GetData(int*aa) is present in lines 12 to 19 in the parallel processing program 50D. Herein, a pointer-type function argument "int*aa" of the function GetData (int*aa) is interpreted as an assignment instruction of a call argument (a) of an instruction of calling the function GetData (int*aa) (GetData(a) or the like in PointerTest) (interpreted as aa=a).

Next is described an alias list of the argument int*aa of the function GetData in the parallel processing program 50D with reference to FIG. 28, based on that the pointer-type function argument is interpreted as an assignment instruction of a call argument of a function call instruction. In FIG. 28, according to "GetData (a)" in line 4 of the parallel processing program 50D, the pointer alias analysis unit 322 adds *a<10> to the alias list of "aa", so that the alias list of "aa" has {*a<10>}. Similarly, according to "GetData(b)" in line 5, the pointer alias analysis unit 322 adds *b<10> to the alias list of "aa", so that the alias list of "aa" has {*a<10>,*b<10>}. According to "p=c+5" in line 6, the pointer alias analysis unit 322 adds "*c<20>" to an alias list of "p", so that the alias list of "p" has {*c<20>}. According to "GetData(p)" in line 7, the pointer alias analysis unit 322 adds {*c<20>} in the alias list of "p" to the alias list of "aa" having {*a<10>,*b<10>}, so that the alias list of "aa" has {*b<10>,*a<10>,*c<20>}. According to "p=b" in line 8, the pointer alias analysis unit 322 adds *b<10> to the alias list of "p" having {*c<20>}, so that the alias list of "p" has {*b<10>,*c<20>}. According to "GetData(p)" of "p" in line 9, the pointer alias analysis unit 322 adds {*b<10>,*c<20>} in the alias list of "p" to the alias list of "aa" having {*b<10>,*a<10>,*c<20>}, so that the alias list of "aa" has {*b<10>,*a<10>,*c<20>}.

The pointer alias ID computing instruction insertion unit 342 inputs therein an alias list including the alias list of "p" having {*b<10>,*c<20>} and the alias list of "aa" having {*b<10>,*a<10>,*c<20>}, from the pointer alias analysis unit 322.

Communications of a pointer and a pointer reference data are difficult to be implemented in a distributed memory system, when a program containing a pointer variable such as the parallel processing program 50D is used. In a thread p0 in which a data referenced by the pointer "aa" is manipulated, it is required that different memories are assigned to all alias objects of "aa", to thereby prevent the alias objects from interfering with one another. As for an inter-thread communication, a data to be actually referenced by "aa" (which is an array data) is transferred from a base thread to the thread p0, and, after the thread p0 is executed, the data referenced by "aa" is transferred to the base thread. In order to communicate a pointer and a pointer reference data, it is necessary to detect which object is actually referenced by the pointer upon the execution (to eliminate an alias). Further, address translation is required between different processors, because memory spaces for the different processors are separate and independent. A description herein is made assuming a mechanism in which alias information of a pointer is managed in a program by inserting a computing instruction of an alias ID into an intermediate language.

The pointer alias ID computing instruction insertion unit 342 assigns an alias ID variable for each inter-thread transferred pointer variable extracted by the inter-thread transferred pointer extraction unit 341 and for each pointer variable which is used for a pointer value computing of the inter-thread transferred pointer variable. In other words, the pointer alias ID computing instruction insertion unit 342 determines that an alias ID variable is necessary for each "inter-thread transferred pointer variable" and each "pointer referenced under a pointer value assignment instruction to the pointer variable, which requires an alias ID variable"; and assigns an alias ID variable for each of the above. The alias ID variable is an integer-type data having a global scope. A value of the alias ID variable represents an element number (an index) in an alias list of a pointer.

The pointer alias ID computing instruction insertion unit 342 extracts "p" as a pointer referenced under a pointer value assignment instruction to "aa,aa" as inter-thread transferred pointer valuables extracted by the inter-thread transferred pointer extraction unit 341. As a result, the pointer alias ID computing instruction insertion unit 342 extracts "aa" and "p" as pointers, each of which requires an alias ID variable, and assigns respective alias ID variables to the pointers. The alias ID variable of the pointer "aa" is N1 "aa__3e859b0", and the alias ID variable of the pointer "p" is N2 "p☐bbfb78", for example.

The pointer alias ID computing instruction insertion unit 342 specifies a domain of each alias ID variable (a scope of a value which an integer of the alias ID variable can take). The pointer alias ID computing instruction insertion unit 342 detects that the alias list of "aa" has {*b<10>,*a<10>,*c<20>}, whose element numbers are ID=0, ID=1, and ID=2, respectively, and thus specifies the domain of the alias ID variable N1 of the pointer "aa" as {0,1,2}. Similarly, the pointer alias ID computing instruction insertion unit 342 detects that the alias list of "p" has {*b<10>,*c<20>}, whose element numbers are ID=0, and ID=1, respectively, and thus specifies the domain of the alias ID variable N2 of the pointer "p" as {0,1}.

The pointer alias ID computing instruction insertion unit 342 inserts an operation for computing an alias ID of a pointer of interest, just prior to a pointer assignment computing. The pointer assignment computing is an operation of assigning or offset-assigning (an address value plus an offset value) an address of an alias object or another pointer variable to a pointer variable. An alias ID computing instruction includes an alias ID assignment computing instruction and an alias ID conversion computing instruction as described below.

Figure 30:
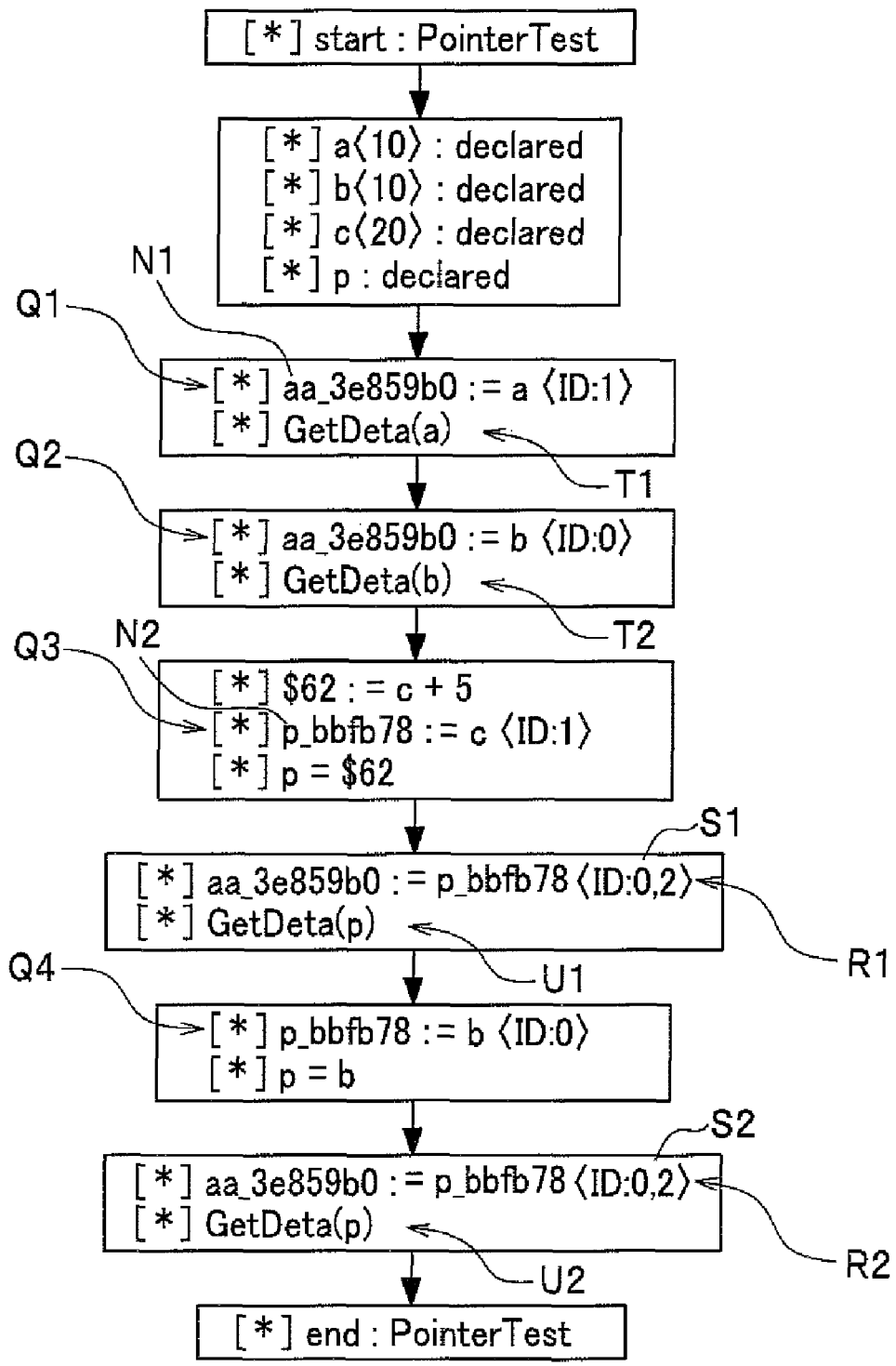
FIG. 30 is a program graph of a calling function in the parallel processing program according to the third embodiment.

FIG. 30 is a program graph showing results of inserting an instruction of computing a pointer alias ID into the function PointerTest in the parallel processing program 50D. The alias ID variables shown in FIG. 30 include the alias ID variable N1 and the alias ID variable N2. The pointer alias ID computing instruction insertion unit 342 inserts alias ID assignment computing instructions Q1,Q2,Q3,Q4, and alias ID conversion computing instructions R1,R2. Next is described how an alias ID assignment computing instruction and an alias ID conversion computing instruction are inserted.

The pointer alias ID computing instruction insertion unit 342 inserts, if a right-hand side value of a pointer assignment computing instruction is an address of an alias object, an alias ID assignment computing instruction of assigning an element number corresponding to the object. For example, in FIG. 30, the instruction "GetData(a)" is interpreted as an assignment instruction of a call argument of a function call instruction. The right-hand side value of the pointer assignment computing instruction is the address of an alias object *a<10>. Thus the pointer alias ID computing instruction insertion unit 342 inserts a computing instruction of assigning an element number <ID=1> corresponding to the object *a<10>, to the alias ID variable, just prior to an instruction T1, as an alias ID assignment computing instruction Q1. Similarly, the pointer alias ID computing instruction insertion unit 342 inserts a computing instruction of assigning <ID=0> to the alias ID variable, just prior to an instruction T2, as an alias ID assignment computing instruction Q2.

On the other hand, the pointer alias ID computing instruction insertion unit 342 creates an alias ID conversion table, if a right-hand side value of a pointer assignment computing instruction is another pointer variable; and inserts an alias ID conversion computing instruction of converting an alias ID. The alias ID conversion table is a table in which an element number in an alias list of a right-hand side pointer is associated with an element number in an alias list of a left-hand side pointer.

For example, in FIG. 30, an instruction U1 is interpreted as an instruction of assigning a call argument of a function call instruction. A right hand side value of the pointer assignment computing instruction is another pointer variable "p". Thus the pointer alias ID computing instruction insertion unit 342 creates an alias ID conversion table. In the alias ID conversion table, the element number <ID=0> of *b<10> in the alias list of "aa" having {*b<10>,*a<10>,*c<20>} is associated with the element number <ID=0> of *b<10> in the alias list of "p" having {*b<10>,*c<20>}; and the element number <ID=2> of *c<20> in the alias list of "aa" having {*b<10>,*a<10>, *c<20>} is associated with the element number <ID=1> of *c<20> in the alias list of "p" having {*b<10>,*c<20>}. Therefore, the pointer alias ID computing instruction insertion unit 342 creates the alias ID conversion table, and inserts a computing instruction of converting values {0,1}, which are values the alias ID variable of "p" may take, into values {0,2}, just prior to the instruction U1, as an alias ID conversion computing instruction R1. Similarly, the pointer alias ID computing instruction insertion unit 342 inserts a computing instruction of converting values {0,1}, which are values the alias ID variable of "p" may take, into values {0,2}, just prior to an instruction U2, as an alias ID conversion computing instruction R2.

An alias ID variable aa__3e859b0 enables identification of an object to be referenced by the pointer "aa" in the function GetData invoked by the function PointerTest.

As described above, the pointer communication auxiliary instruction generation unit 34 can insert an alias ID computing instruction of a pointer into the intermediate language generated by the syntax analysis unit 31, and generate a program containing the pointer alias ID computing instruction. This enables identification of an object referenced by a pointer.

(Description of Inter-Thread Data Communication Instruction Insertion Unit 36)

The inter-thread data communication instruction insertion unit 36 inputs therein the program with a pointer alias ID computing instruction inserted thereinto by the pointer communication auxiliary instruction generation unit 34, the output data generation instruction/input data reference instruction information 110A (see FIG. 8) extracted by the output data generation instruction/input data reference instruction extraction unit 327, and the inter-thread data dependency instruction pair information 130A (see FIG. 11) generated by the thread output data generation instruction/thread input data reference instruction extraction unit 332; and inserts a communication instruction between threads into the program with the pointer alias ID computing instruction inserted thereinto. The inter-thread data communication instruction insertion unit 36 includes the data transfer instruction insertion unit 351C, the data reception synchronization instruction insertion unit 352C, and the thread start-up instruction insertion unit 353.

(Description of Data Transfer Instruction Insertion Unit 351C)

The data transfer instruction insertion unit 351C inputs therein the program with a pointer alias ID computing instruction inserted thereinto by the pointer communication auxiliary instruction generation unit 34, the output data generation instruction/input data reference instruction information 110A (see FIG. 8) extracted by the output data generation instruction/input data reference instruction extraction unit 327, and the inter-thread data dependency instruction pair information 130A (see FIG. 11) generated by the thread output data generation instruction/thread input data reference instruction extraction unit 332; references the inter-thread data dependency instruction pair information 130A (see FIG. 11); and inserts an inter-thread data transfer instruction just subsequent to an instruction of generating a thread output data in the program. Next is described an example of functions of the data transfer instruction insertion unit 351C with reference to FIG. 8, FIG. 11 and FIG. 31.

Figure 31:
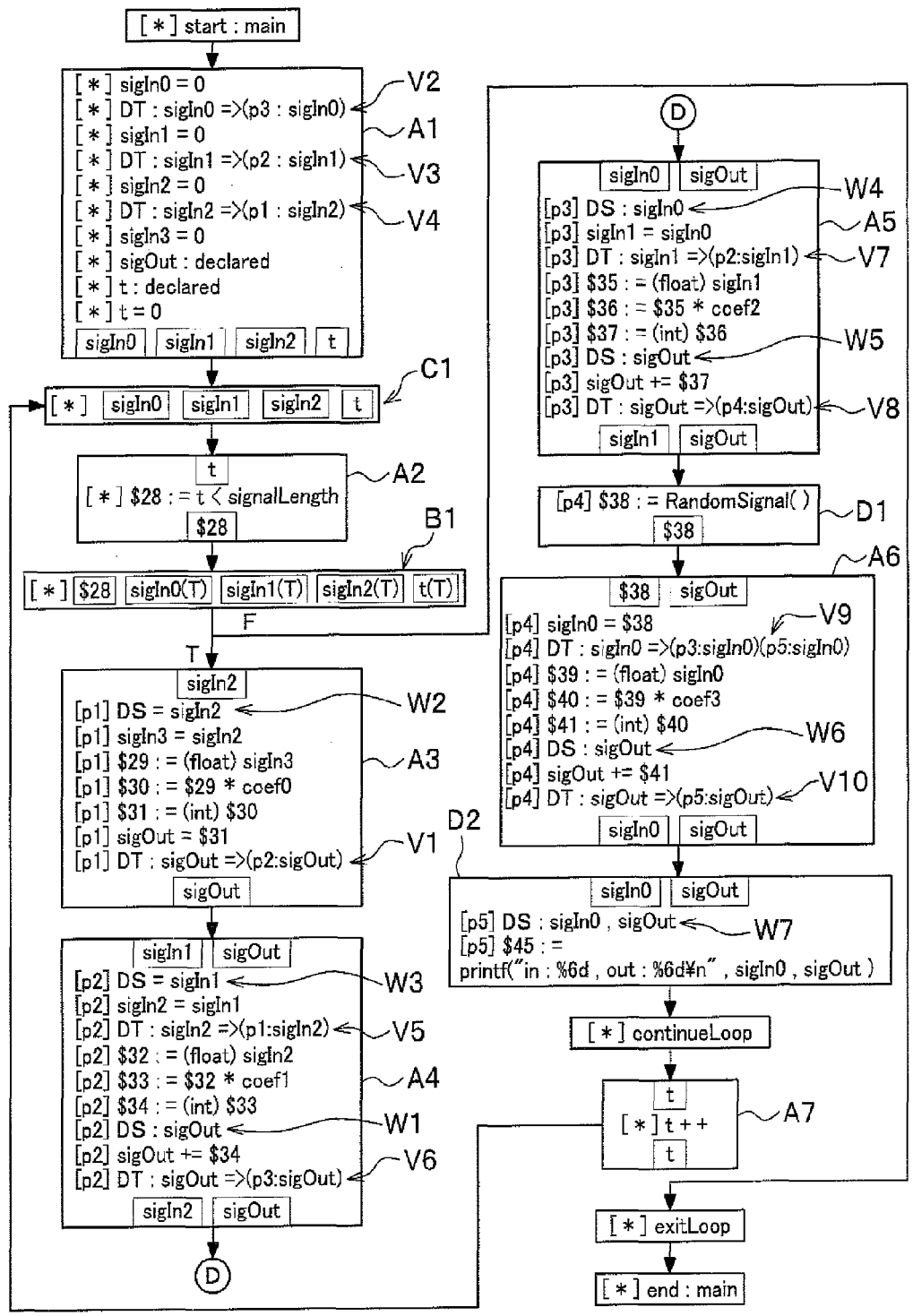
FIG. 31 is a program graph showing results of inserting a data transfer instruction and a data reception synchronization instruction into the intermediate language according to the third embodiment.

FIG. 31 is a program graph showing results of inserting an inter-thread data transfer instruction and an inter-thread data reception synchronization instruction into the program containing a pointer alias ID computing instruction. As shown in FIG. 31, the data transfer instruction insertion unit 351C inserts inter-thread data transfer instructions V1 to V10; and the data reception synchronization instruction insertion unit 352C inserts inter-thread data reception synchronization instructions W1 to W7. A description of the inter-thread data reception synchronization instructions W1 to W7 will be made later.

The data transfer instruction insertion unit 351C references, for example, a thread output data generation instruction list of thread input data reference instructions in the inter-thread data dependency instruction pair information 130A generated by the thread output data generation instruction/thread input data reference instruction extraction unit 332; and detects a thread output data generation instruction "13:DEF" of a thread input data reference instruction "13: USE". The data transfer instruction insertion unit 351C also references the output data generation instruction/input data reference instruction information 110A extracted by the output data generation instruction/input data reference instruction extraction unit 327; and obtains a thread name "p1" and an instruction "sigOut=$31" of the thread output data generation instruction "13:DEF". Similarly, the data transfer instruction insertion unit 351C references output data generation instruction/input data reference instruction information 110A extracted by the output data generation instruction/input data reference instruction extraction unit 327; and obtains a thread "p2" and an instruction "sigOut+=$34" of the thread input data reference instruction "13:USE". Then the data transfer instruction insertion unit 351C inserts a data transfer instruction V1 of "DT:sigOut=>(p2:sigOut)" (an inter-thread data transfer instruction) from an output data "sigOut" of the thread output data generation instruction "13: DEF" to "sigOut" of the thread input data reference instruction "13:USE" in the thread "p2", just prior to a thread output data generation instruction "sigOut=$31" in the program with the pointer alias ID computing instruction inserted thereinto by the pointer communication auxiliary instruction generation unit 34. In FIG. 31, a data transfer instruction is represented as DT (Data Transfer).

Similarly, the data transfer instruction insertion unit 351C inserts inter-thread data transfer instructions V2 to V10 into the program with the pointer alias ID computing instruction inserted thereinto by the pointer communication auxiliary instruction generation unit 34.

The program containing the pointer alias ID computing instruction and the inter-thread data transfer instruction generated by the data transfer instruction insertion unit 351C is transmitted to the data reception synchronization instruction insertion unit 352C.

(Description of Data Reception Synchronization Instruction Insertion Unit 352C)

The data reception synchronization instruction insertion unit 352C inputs therein the program containing the pointer alias ID computing instruction and the inter-thread data transfer instruction generated by the data transfer instruction insertion unit 351C, the output data generation instruction/input data reference instruction information 110A (see FIG. 8) generated by the output data generation instruction/input data reference instruction extraction unit 327, and the inter-thread data dependency instruction pair information 130A (see FIG. 11) generated by the thread output data generation instruction/thread input data reference instruction extraction unit 332; references the inter-thread data dependency instruction pair information 130A (see FIG. 11); and inserts an inter-thread data reception synchronization instruction just prior to an instruction of referencing a thread input data in the program. Next is described an example of functions of the data reception synchronization instruction insertion unit 352C with reference to FIG. 8, FIG. 11 and FIG. 31.

The data reception synchronization instruction insertion unit 352C references, for example, a thread output data generation instruction list of thread input data reference instructions in the inter-thread data dependency instruction pair information 130A generated by the thread output data generation instruction/thread input data reference instruction extraction unit 332, and detects the thread input data reference instruction "13:USE". The data reception synchronization instruction insertion unit 352C also references the output data generation instruction/input data reference instruction information 110A generated by the output data generation instruction/input data reference instruction extraction unit 327, and obtains the instruction "sigOut+=$34" of the thread input data reference instruction "13:USE". Then the data reception synchronization instruction insertion unit 352C inserts a reception synchronization instruction W1 of "DS: sigOut" between threads (an inter-thread data reception synchronization instruction) by the thread input data "sigOut" of the thread input data reference instruction "13:USE", just prior to the thread input data reference instruction "sigOut+=$34" in the program containing the pointer alias ID computing instruction and the inter-thread data transfer instruction generated by the data transfer instruction insertion unit 351C. In FIG. 31, the data reception synchronization instruction is represented as DS (Data Synchronize).

Similarly, the data reception synchronization instruction insertion unit 352C inserts inter-thread data reception synchronization instructions W2 to W7 into the program containing the pointer alias ID computing instruction and the inter-thread data transfer instruction generated by the data transfer instruction insertion unit 351C. This can suspend an ongoing processing, if the data between threads has not yet been received. After the data is received, a subsequent instruction becomes executable (in other words, a data reception request is not issued explicitly).

The program containing the pointer alias ID computing instruction, the inter-thread data transfer instruction, and the inter-thread data reception synchronization instruction generated by the data reception synchronization instruction insertion unit 352C is transmitted to the thread start-up instruction insertion unit 353.

(Description of Thread Start-Up Instruction Insertion Unit 353)

The thread start-up instruction insertion unit 353 inputs therein the program containing the pointer alias ID computing instruction, inter-thread data transfer instruction, and inter-thread data reception synchronization instruction generated by the data reception synchronization instruction insertion unit 352C, and the instruction block information generated by the instruction block extraction unit 324; references the instruction block information; and, under a branch instruction on which a thread is control-dependent, inserts an instruction of starting up the thread (a thread start-up instruction), just subsequent to a branch edge which reaches the thread. Next is described an example of functions of the thread start-up instruction insertion unit 353 with reference to FIG. 32.

Figure 32:
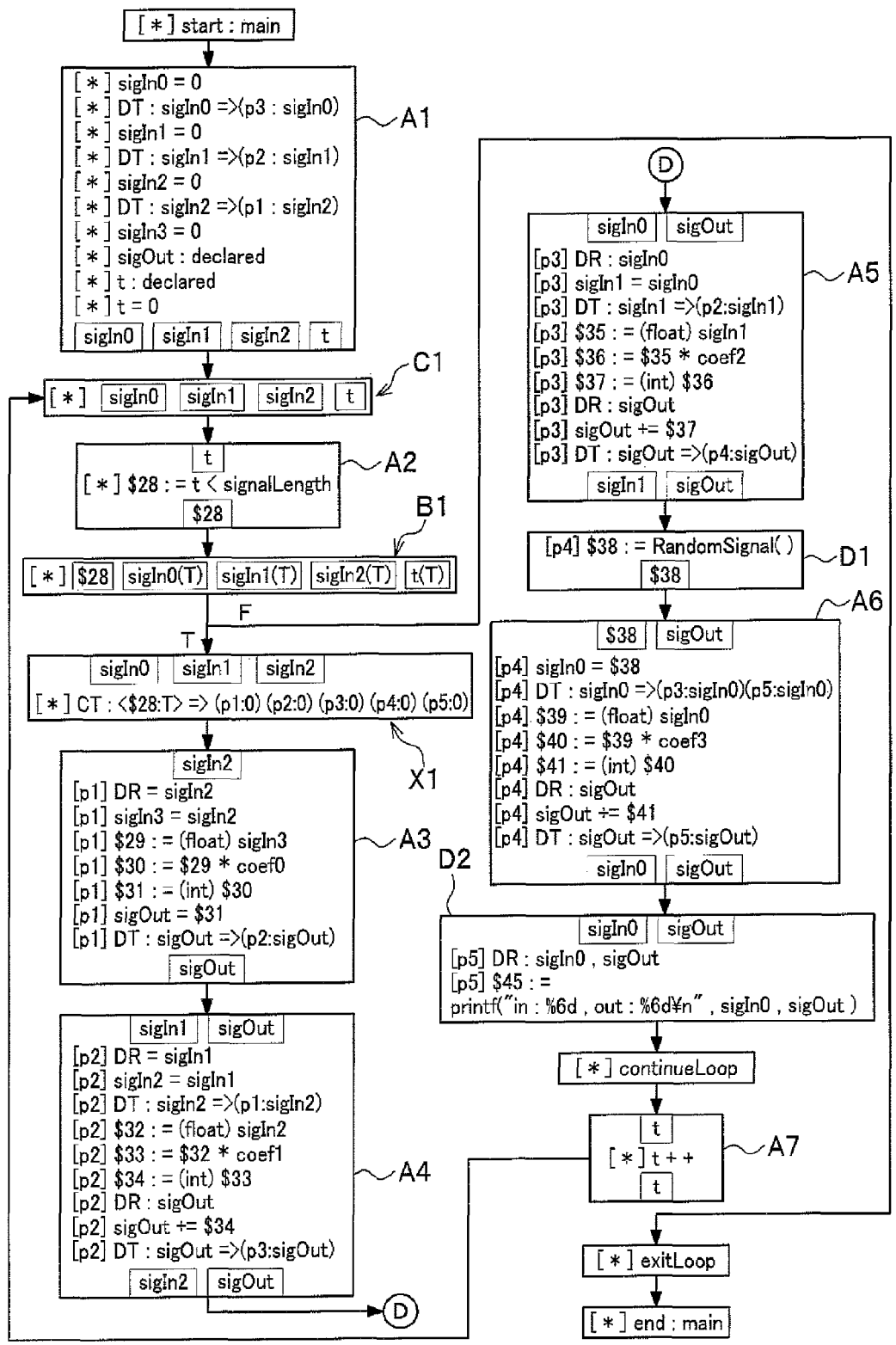
FIG. 32 is a parallel processing showing results of inserting a thread start-up instruction into the intermediate language according to the third embodiment.

FIG. 32 is a program graph showing results of inserting a thread start-up instruction into the program containing the pointer alias ID computing instruction, inter-thread data transfer instruction, and inter-thread data reception synchronization instruction. As shown in FIG. 32, the thread start-up instruction insertion unit 353 inserts a thread start-up instruction X1.

The thread start-up instruction insertion unit 353 references the instruction block information generated by the instruction block extraction unit 324, and detects a branch block B1 as a branch instruction, on which threads p1 to p5 are control-dependent. Then the thread start-up instruction insertion unit 353 inserts the instruction X1 of starting up the threads p1 to p5 (a thread start-up instruction), just subsequent to a branch edge reaching the threads (a branch edge connecting from the branch block B1 to an instruction block A3). In FIG. 32, a thread start-up instruction is represented as CT (Control Transfer).

The program containing the pointer alias ID computing instruction, inter-thread data transfer instruction, inter-thread data reception synchronization instruction, and thread start-up instruction generated by the thread start-up instruction insertion unit 353 is transmitted to the program partition/code generation unit 39.

In the third embodiment as described above, the program processing device 1C analyzes the parallel processing program 50D containing a pointer variable, and can generate the partitioned programs containing communication instruction 55D applicable to a distributed memory system, even when a communication processing of a pointer and a pointer reference data is performed.

A hardware configuration of the program processing device 1C (see FIG. 23) is similar to that of the program processing device 1A (see FIG. 1), and a description thereof is omitted herefrom.

Figure 33:
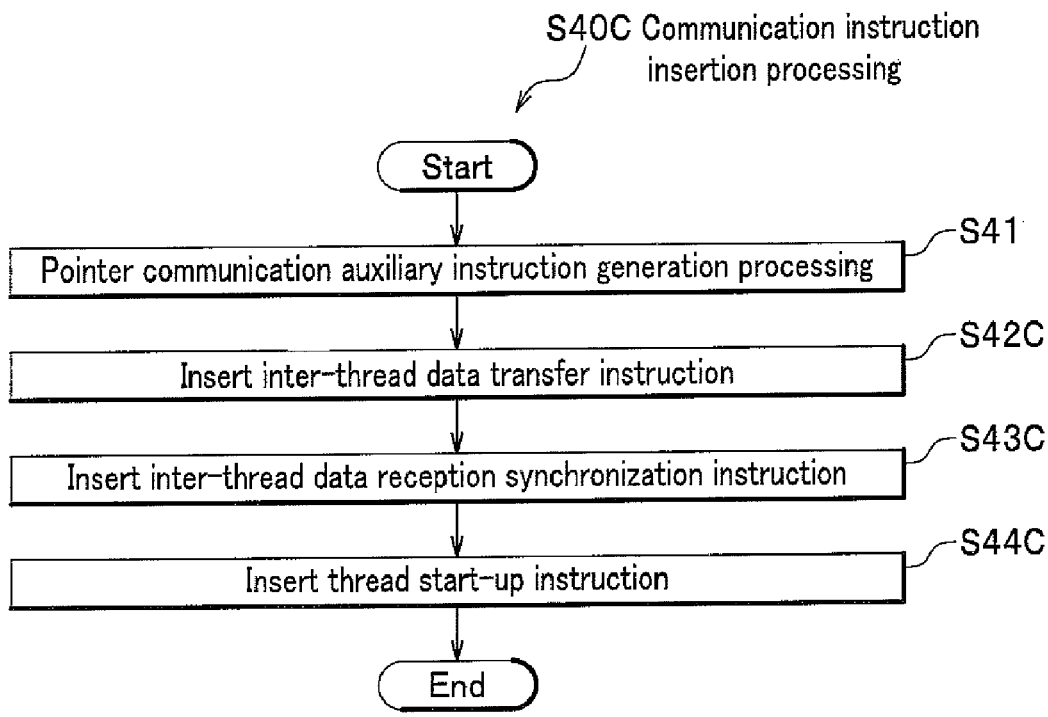
FIG. 33 is a detailed flowchart showing a communication instruction insertion processing according to the third embodiment.

FIG. 33 is a detailed flowchart showing a communication instruction insert processing S40C in the third embodiment. Next is described the communication instruction insert processing S40C with reference to FIG. 33 (see also FIG. 23 as needed). The communication instruction insert processing S40C corresponds to the communication instruction insert processing S40A in the first embodiment.

As shown in FIG. 33, the data transfer instruction insertion unit 351C performs a pointer communication auxiliary instruction generation processing S41, and generates a program containing a pointer alias ID computing instruction. A detailed description of the pointer communication auxiliary instruction generation processing S41 will be made later. The data transfer instruction insertion unit 351C inserts an inter-thread data transfer instruction just subsequent to a thread output data generation instruction of a thread input data reference instruction in the program containing the pointer alias ID computing instruction (S42C). The data reception synchronization instruction insertion unit 352C inserts an inter-thread data reception synchronization instruction just prior to a thread input data reference instruction in the program containing the pointer alias ID computing instruction and inter-thread data transfer instruction (S43C). Then, under a branch instruction, on which a thread in the program containing the pointer alias ID computing instruction, inter-thread data transfer instruction, and inter-thread data reception synchronization instruction, is control-dependent, the thread start-up instruction insertion unit 353 inserts a thread start-up instruction just subsequent to a branch edge reaching the thread (S44C). With the processing as described above, the communication instruction insertion unit 35C can insert a communication instruction (including the pointer alias ID computing instruction, inter-thread data transfer instruction, inter-thread data reception synchronization instruction, and thread start-up instruction) into the intermediate language generated by the syntax analysis unit 31.

Figure 34:
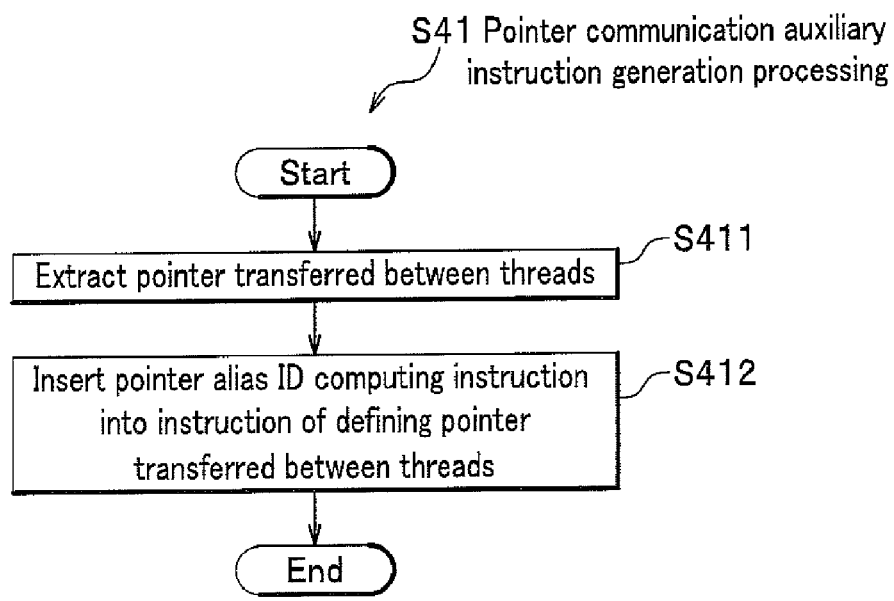
FIG. 34 is a detailed flowchart showing a pointer communication auxiliary instruction generation processing according to the third embodiment.

FIG. 34 is a detailed flowchart showing the pointer communication auxiliary instruction generation processing S41. Next is described the pointer communication auxiliary instruction generation processing S41 with reference to FIG. 34 (see also FIG. 23 as needed).

As shown in FIG. 34, the inter-thread transferred pointer extraction unit 341 extracts a pointer transferred between threads (S411). Then the inter-thread transferred pointer extraction unit 341 inserts a pointer alias ID computing instruction into an instruction of defining a pointer transferred between threads in the intermediate language generated by the syntax analysis unit 31 (S412). With the processing described above, the inter-thread transferred pointer extraction unit 341 can insert the pointer alias ID computing instruction into the intermediate language generated by the syntax analysis unit 31.

In the program processing device as described above in the first embodiment to the third embodiment, an execution code for performing a high-performance parallel processing in a multi-processor system can be generated, just by adding a simple description to a sequential program by a programmer or the like.

(Multi-Processor System)

Figure 35:
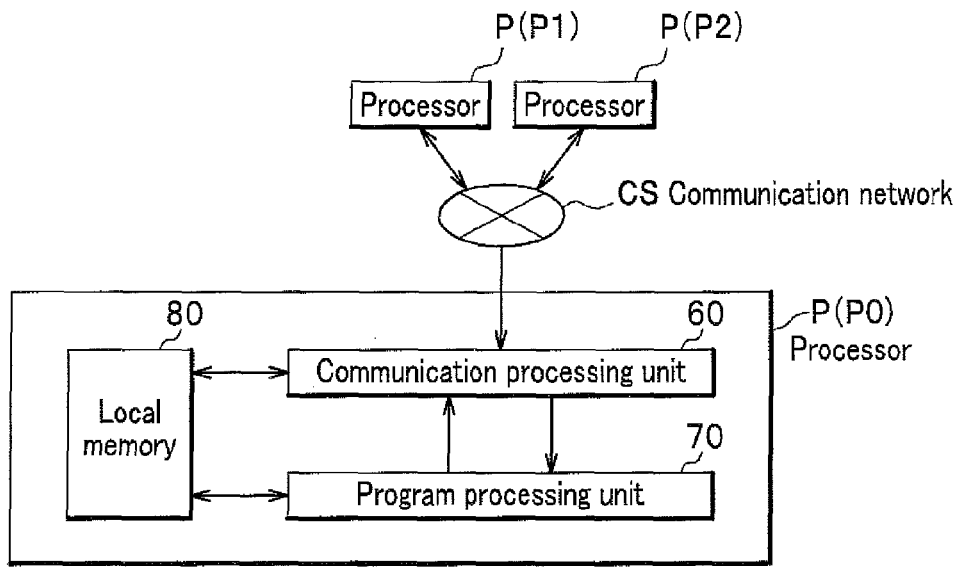
FIG. 35 is a view showing a configuration of an entire multi-processor system.

Next is described a multi-processor system with reference to FIG. 35 to FIG. 42. FIG. 35 is a view showing a configuration of an entire multi-processor system. As shown in FIG. 35, a processor P (P0), a processor P (P1), and a processor P (P2) are connected via a communication network CS. The number of the processors is not specifically limited.

Each processor P includes an inter-processor communication processing unit (a processing unit) (hereinafter referred to as a "communication processing unit 60"), an in-processor processing unit (a processing unit) (hereinafter referred to as a "program processing unit 70"), and a local memory (a storage unit) 80. The communication processing unit 60 synchronizes with the program processing unit 70, to thereby perform a communication between the processors P, and detects a communication data hazard between the processors P. The program processing unit 70 performs a processing based on an execution code (the partitioned programs containing communication instructions 55D (see FIG. 23) generated by the program processing device 1C) stored in the local memory 80, and controls execution and suspension of the execution code according to results of detecting a data hazard detected by the communication processing unit 60. The communication instruction included in the execution code is executed by both the program processing unit 70 and the communication processing unit 60 in a coordinated manner.

FIG. 35 shows a configuration of the processor P0. FIG. 35 does not show, however, configurations of the processor P1 and the processor P2, since they are the same as that of the processor P0.

The communication processing unit 60 receives an instruction of transferring a data from the program processing unit 70, and transfers the data to a processor on a receiving side. The communication processing unit 60 on the receiving side stores the received data into the local memory 80.

The program processing unit 70 suspends execution of an instruction of referencing an external data, if the external data has not yet received, until the external data is received. The program processing unit 70 also suspends execution of an instruction of transferring a data, if the data cannot be transferred due to a trouble in the communication network CS or a destination processor, until the trouble is resolved to allow a transfer of the data.

A communication channel is assigned to a processor pair requiring a communication therebetween. The communication channel may be a communication network such as a packet transmission system using a router, a circuit switching system, and a reconfigurable switching network.

Figure 36:
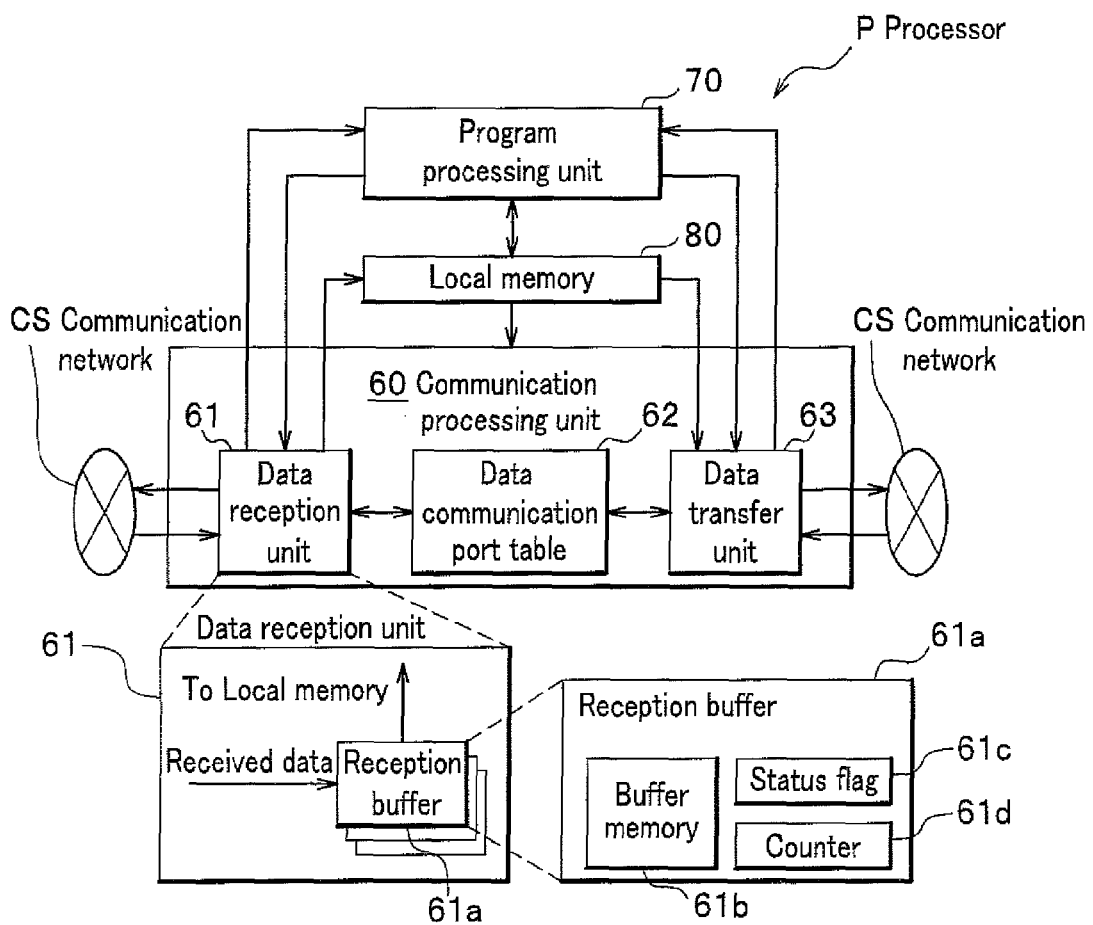
FIG. 36 is a view showing a detailed configuration of a communication processing unit.

FIG. 36 is a view showing a detailed configuration of the communication processing unit 60.

As shown in FIG. 36, the communication processing unit 60 includes a data reception unit 61, a data communication port table 62, and a data transfer unit 63.

The data reception unit 61 includes FIFO (first-in-first-out) type receive buffers 61*a*, each of which is separately assigned to each input port. The receive buffers 61*a* control operations of writing a data received from each input port into the local memory 80.

Each of the receive buffers 61*a* includes a buffer memory 61*b*, a status flag 61*c*, and a counter 61*d*.

The buffer memory 61b temporarily stores a received data.

The status flag 61c indicates three statuses ("empty", "full" and "non-empty") of a receive buffer. The "empty" indicates a status where a received data is not present neither in the local memory 80 nor the buffer memory 61b. The "full" indicates a status where the buffer memory 61b is exhausted. The "non-empty" indicates a status which is not "empty" or "full".

The counter 61d indicates the number of data blocks stored in the buffer memory 61b. The data block herein means a data aggregate transferred in a single data communication.

Each of the receive buffers 61a temporarily buffers data communications, which occur repetitively between threads (or processors), if threads parallelly executed by different processors are embedded in a loop (a processing which is executed repeatedly). This allows the threads (or processors) to be parallelly executed based on a parallel pipeline system.

Figure 37:
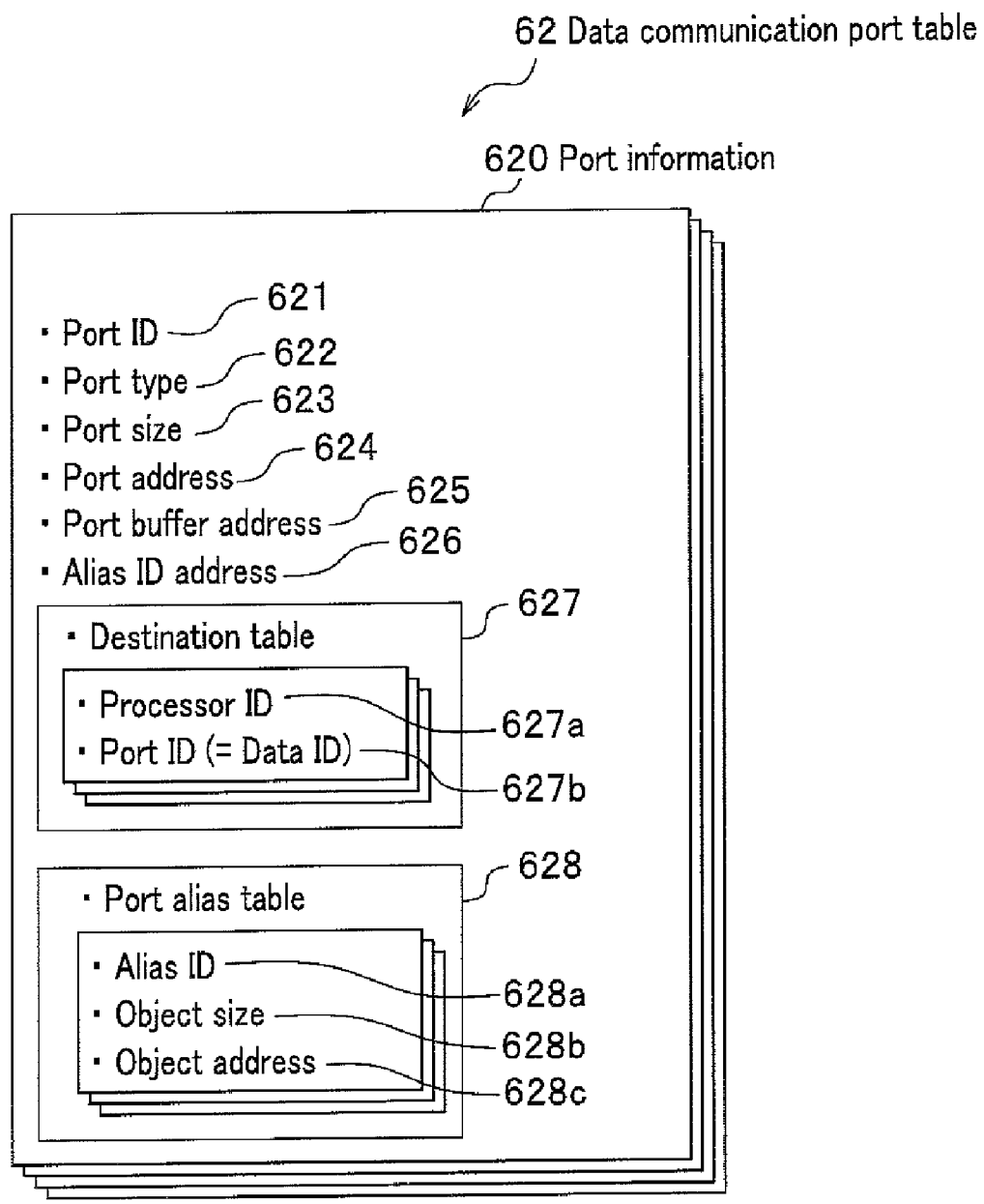
FIG. 37 is a view showing a data structure of a data communication port table.

FIG. 37 is a view showing a data structure of the data communication port table 62.

As shown in FIG. 37, the data communication port table 62 is a table which holds port information 620 for executing a data communication between processors, and is provided in the communication processing unit 60 (see FIG. 36) of each processor. The port information 620 includes a port ID 621, a port type 622, a port size 623, a port address 624, a port buffer address 625, an alias ID address 626, a destination table 627, and a port alias table 628.

The port ID 621 is an ID of a port for specifying a transfer data in a data transfer instruction.

The port type 622 indicates a type of a port, such as a communication direction (input and output) and a data type (direct access data, indirect access data, and pointer data)

The "direct access data (direct access-type data)" herein means an in-function local or global variable in which a storage address of a data is statically predicted, other than a pointer-type data. The "indirect access data (pointer reference data)" means a data whose storage address is specified by a pointer. The "pointer data" is used as a synonym for a pointer-type data.

The port size 623 is a size of a data handled by a port, and is measured in bytes.

The port address 624 indicates an address of a port in the local memory 80 in which a data is stored.

The port buffer address 625 is a pointer (an address of a port buffer (receive buffer) for temporarily storing a received data)) to a port buffer (receive buffer) for temporarily storing a received data. The port buffer address 625 is valid only when the communication direction indicated in the port type 622 is "input".

The alias ID address 626 indicates an address in the local memory 80 with an alias ID variable stored therein. The alias ID address 626 is valid only when the data type indicated in the port type 622 is the indirect access data or the pointer data.

The destination table 627 holds a processor ID 627a of a destination processor, and a port ID 627b. The processor ID 627a is an ID for identifying a destination processor. The port ID 627b is used as a data ID transferred to a destination processor together with a data transfer request.

The port alias table 628 has therein information on a pointer alias including an alias ID, a data size, and a data storage address of an alias object of a pointer (as an alias ID 628a, an object size 628b, and an object address 628c, respectively), if a transferred data is the indirect access data via a pointer, or the pointer data.

Returning to FIG. 36, a description of the configuration of the communication processing unit 60 is continued also with reference to FIG. 37.

When a data transfer instruction is executed by the program processing unit 70, the data transfer unit 63 receives a port ID corresponding to the data transferred from the program processing unit 70.

Upon receiving the port ID corresponding to the transferred data, the data transfer unit 63 obtains the port information 620 having a port ID corresponding to the received port ID, from the data communication port table 62.

Upon obtaining the port information 620, the data transfer unit 63 sends a data transfer request to a destination processor, and waits until a data transfer Acknowledge (ACK) is sent back. The data transfer request includes communication information such as a receive port ID and an alias ID. As the alias ID, a value of an alias ID variable of a pointer, which is updated accordingly with an alias ID computing instruction in an execution code (an execution program) is used, if the transferred data is the indirect access data via a pointer, or the pointer data. On the other hand, a given value is used as the alias ID, if the transferred data is the direct access data.

The data transfer unit 63 obtains information in which the alias ID 628a in the port alias table 628 is identical to a value of an alias ID variable of a pointer (hereinafter also referred to as port alias information), if the port type is the indirect access data or the pointer data.

The data transfer unit 63 then reads the transferred data from the local memory 80 according to the port type, and transfers the data via the communication network CS to the destination processor. If the port type of the transferred data is the direct access data, the data is read from a storage address into the port address 624, and is transferred to the destination processor. If the port type of the transferred data is the indirect access data, the data is read from an address specified by the object address 628c of the port alias information obtained from the port alias table 628, and is transferred to the destination processor. If the port type of the transferred data is the pointer data, a pointer offset value is calculated by subtracting the object address 628c of the port alias information from a pointer value, and the pointer offset value is transferred to the destination processor.

The data reception unit 61 receives the data transfer request from the processor, from which the data is transferred.

The data reception unit 61 obtains the port information 620 which has the port ID corresponding to the transferred data in the data communication port table 62, using the communication information (a receive port ID and an alias ID) contained in the data transfer request.

The data reception unit 61 obtains port alias information which has the alias ID 628a of the port alias table 628 (see FIG. 37) identical to the value of the alias ID variable of the pointer, if the port type of the transferred data is the indirect access data or the pointer data.

The data reception unit 61 further specifies the receive buffer 61a for temporarily storing the received transferred data, using the port buffer address 625 (see FIG. 37) contained in the port information 620.

The data reception unit 61 sends a data transfer Acknowledge, if there is no trouble in receiving a data and the data reception unit 61 is ready to receive the data. A trouble in receiving a data includes such cases where a data transfer from other processor is going on; a plurality of data transfer requests are received from a plurality of the processors at the same time, and a data transfer request from a processor of interest does not have the highest priority; and the status flag 61c of the receive buffer 61a indicates "full". When a trouble in receiving a data occurs, the data reception unit 61 sends a data transfer Not-Acknowledge (NACK) to a processor of interest, and rejects reception of a transferred data therefrom.

The data reception unit 61 transfers the transferred data received via the communication network CS to the receive buffer 61a according to the port type. If the port type is the direct access data, only the received data is transferred to the receive buffer 61a. If the port type is the indirect access data, the received data and the alias ID are transferred to the receive buffer 61a. If the port type is the pointer data, a pointer value is calculated by adding the object address 628c in the port alias information to the received pointer offset value, and the pointer value and the alias ID are transferred to the receive buffer 61a.

Upon receiving the transferred data from the data reception unit 61, the receive buffer 61a controls operations of writing the transferred data into the local memory 80 according to the status flag 61c of the receive buffer 61a.

If the status flag 61c indicates "empty", the receive buffer 61a writes the transferred data received from the data reception unit 61 directly into the local memory 80. A write address for writing the data is a port address (an address specified by the port address 624), if the port type is the direct access data or the pointer data. If the port type is the indirect access data, the write address is an object address (an address specified by the object address 628c) contained in the port alias information (information obtained from the port alias table 628). Further, if the port type is the indirect access data or the pointer data, the receive buffer 61a stores the alias ID received from the data reception unit 61 together with the transferred data, into an alias ID address (an address specified by the alias ID address 626).

If the status flag 61c indicates "non-empty", it means that one or more received transferred data are present in the local memory 80. Thus the receive buffer 61a writes the transferred data received from the data reception unit 61 into the buffer memory 61b.

The data stored in the receive buffer 61a is not referenced in an ongoing thread processing (because other received data to be referenced in the ongoing thread processing has already been present), but is referenced in or after the subsequent thread processing.

It is to be noted that, if the status flag 61c currently indicates "non-empty" or "full", after the received data is stored, the status flag 61c then indicates either "empty" or "non-empty".

If the status flag 61c indicates "full", the transferred data will not be transferred to the receive buffer 61a, because reception of the transferred data is rejected as described above.

A thread termination signal is sent to the data reception unit 61, when an ongoing thread processing is terminated in the program processing unit 70. Upon receiving the signal, the data reception unit 61 writes an initial data block into the local memory 80, if the counter 61d indicates one or more in the receive buffer 61a, that is, if one or more data are stored in the buffer memory 61b. To obtain a write address of the local memory 80, the data reception unit 60 accesses the port information 620 obtained from the data communication port table 62, and the port alias information (the information obtained from the port alias table 628). If the access shows that the port type is the direct access data or the pointer data, an address stored in the port address 624 is used as the write address. If the port type is the indirect access data, an address stored in the object address 628c contained in the port alias information is used as the write address.

Further, if the port type is the direct access data or the pointer data, the alias ID stored in the buffer memory 61b together with the transferred data is stored in the alias ID address 626.

As described above, an initial data block temporarily stored in the receive buffer 61a is automatically transferred into the local memory 80, when a thread processing is completed. This is necessary to immediately turn a data to be referenced in a subsequent thread processing, into a referenceable data.

As described above, when the program processing unit 70 executes the data transfer instruction, the data transfer unit 63 makes the data transfer request to a destination processor and waits for reception of the data transfer Acknowledge. If an output data hazard occurs during waiting, the data transfer unit 63 sends out a signal for suspending a subsequent instruction to be executed by the program processing unit 70, until the output data hazard is resolved.

Further, when the program processing unit 70 executes a data reception synchronization instruction, the program processing unit 70 transfers a receive buffer address corresponding to a received data to the data reception unit 61. If the status flag 61c of the receive buffer 61a corresponding to the receive buffer address indicates "empty", a data input hazard occurs. The data reception unit 61 sends out a signal for suspending a subsequent instruction to be executed by the program processing unit 70, until the input data hazard is resolved.

Figure 38:
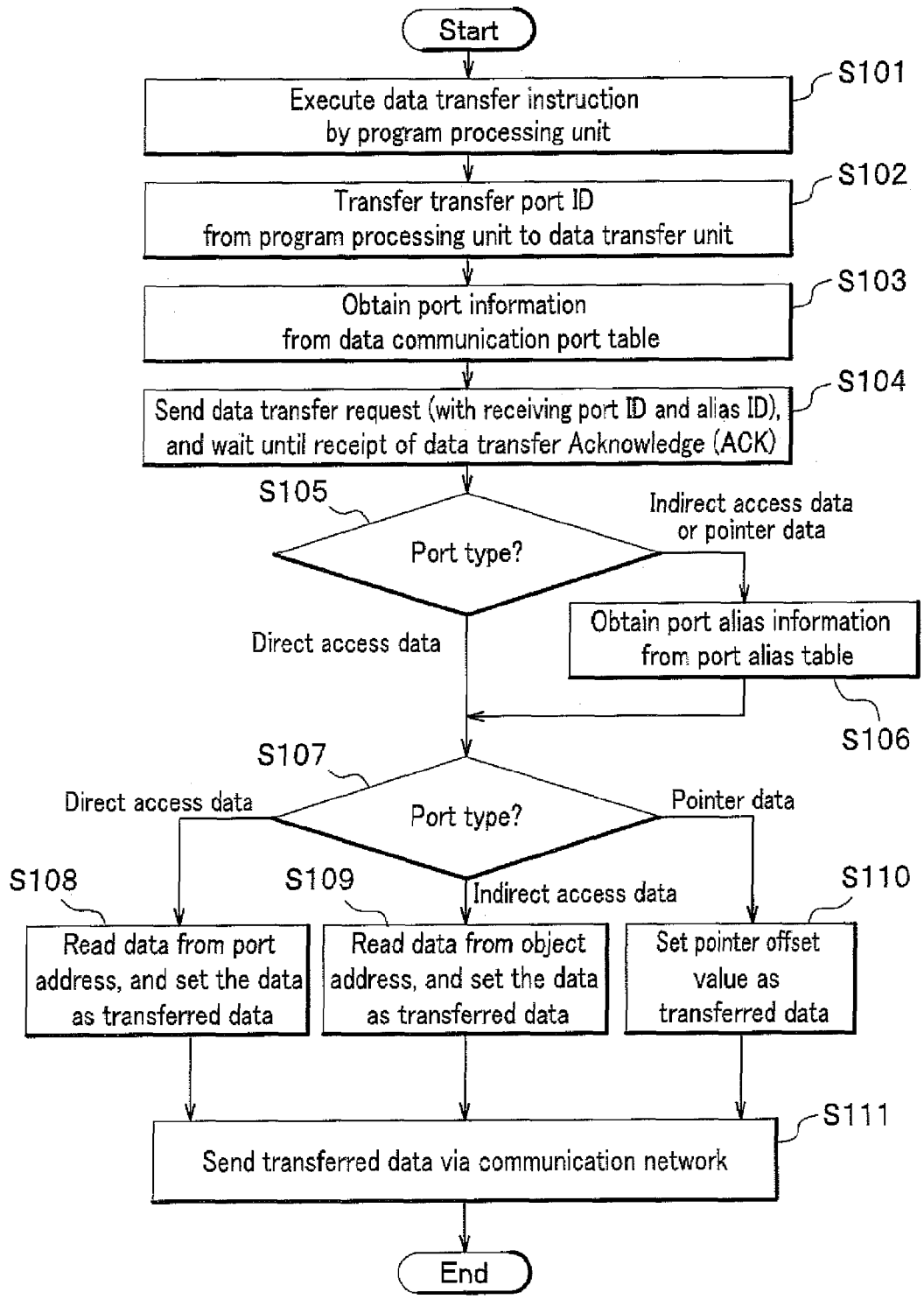
FIG. 38 is a flowchart showing steps of a data transfer processing.

FIG. 38 is a flowchart showing steps of a data transfer processing. Next are described the steps of the data transfer processing with reference to FIG. 38 (see also FIG. 36 and FIG. 37 as needed).

The program processing unit 70 executes a data transfer instruction (S101), and transfers a port ID (a transfer port ID) to the data transfer unit 63 (S102).

The data transfer unit 63 receives the port ID (the transfer port ID), and obtains the port information 620 from the data communication port table 62 (S103). After obtaining the port information 620, the data transfer unit 63 sends a data transfer request with the communication information such as a receiving port ID and an alias ID added thereto, to a destination processor; and waits until the data transfer unit 63 receives a data transfer Acknowledge (S104). The data transfer unit 63 specifies the port type 622 of the obtained port information 620 (S105). If the port type 622 is the indirect access data or the pointer data (if so in S105), the data transfer unit 63 obtains the port alias information from the port alias table 628 (S106), and the processing proceeds to S107. If the port type 622 is the direct access data (if so in S105), the processing proceeds to S107.

In S107, the data transfer unit 63 specifies the port type 622 of the obtained port information 620 (S107). If the port type 622 is the direct access data (if so in S107), the data transfer unit 63 reads a data of interest from a port address (an address specified by the port address 624), and sets the data as a transferred data (S108). If the port type 622 is the indirect access data (if so in S107), the data transfer unit 63 reads a data of interest from an object address (an address specified by the object address 628c) (of the port alias information obtained from the port alias table 628), and sets the data as a transferred data (S109). If the port type 622 is the pointer data, the data transfer unit 63 sets a pointer offset value as a transferred data (S110). The pointer offset value is calculated by subtracting the object address 628c of the port alias information from the pointer value. Then the data transfer unit 63 sends the transferred data via the communication network CS (to the destination processor) (S111).

Figure 39:
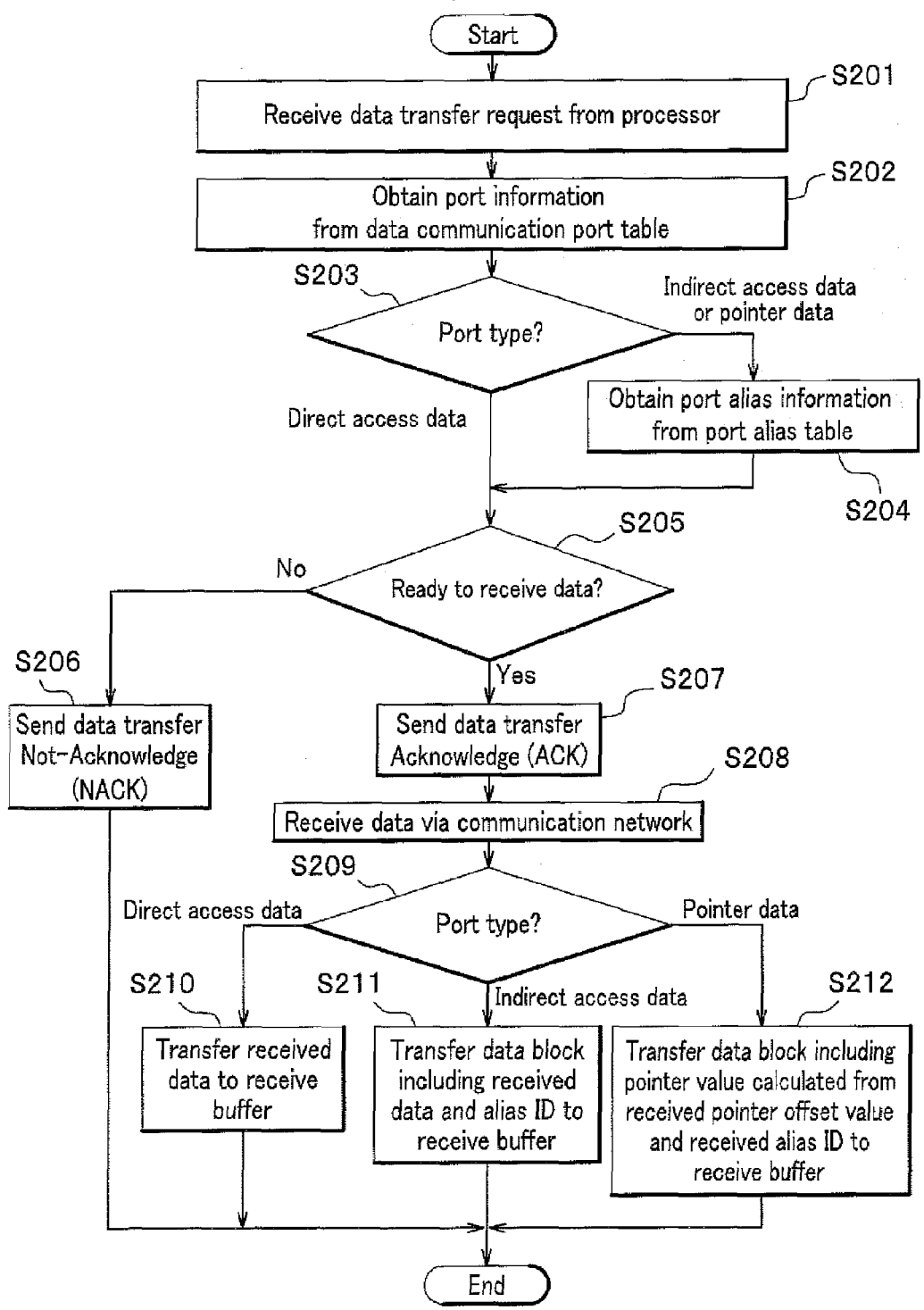
FIG. 39 is a flowchart showing steps of a data reception processing.

FIG. 39 is a flowchart showing steps of a data reception processing. Next are described the steps of the data reception processing with reference to FIG. 39 (see also FIG. 36 and FIG. 37 as needed).

The data reception unit 61 receives a data transfer request from a processor, from which a data is transferred (S201), and obtains the port information 620 from the data communication port table 62 (S202), using the communication information contained in the received data transfer request. The data reception unit 61 specifies the port type 622 of the obtained port information 620 (S203). If the port type 622 is the indirect access data or the pointer data (if so in S203), the data reception unit 61 obtains the port alias information from the port alias table 628 (S204), and the processing proceeds to S205. If the port type 622 is the direct access data (if so in S203), the processing proceeds to S205.

In S205, the data reception unit 61 determines whether or not the data reception unit 61 is ready to receive a data (S205). If the data reception unit 61 determines that the data reception unit 61 is not ready to receive a data ("No" in S205), the data reception unit 61 sends a data transfer Not-Acknowledge (S206) to the processor, and terminates the data reception processing. If the data reception unit 61 determines that the data reception unit 61 is ready to receive a data ("Yes" in S205), the data reception unit 61 sends a data transfer Acknowledge to the processor (S207), and the processing proceeds to S208.

In S208, the data reception unit 61 receives the transferred data via the communication network CS (S208). Further, the data reception unit 61 specifies the port type 622 of the obtained port information 620 (S209). If the port type 622 is the direct access data (if so in S209), the data reception unit 61 transfers the received data to the receive buffer 61*a* (S210). If the port type 622 is the indirect access data (if so in S209), the data reception unit 61 transfer a data block including the received data and alias ID to the receive buffer 61*a* (S211). If the port type 622 is the pointer data (if so in S209), the data reception unit 61 transfers a data block including a pointer value calculated from a received pointer offset value, and the received alias ID (S212). The pointer value is calculated by adding the object address 628*c* of the port alias information to the received pointer offset value.

Figure 40:
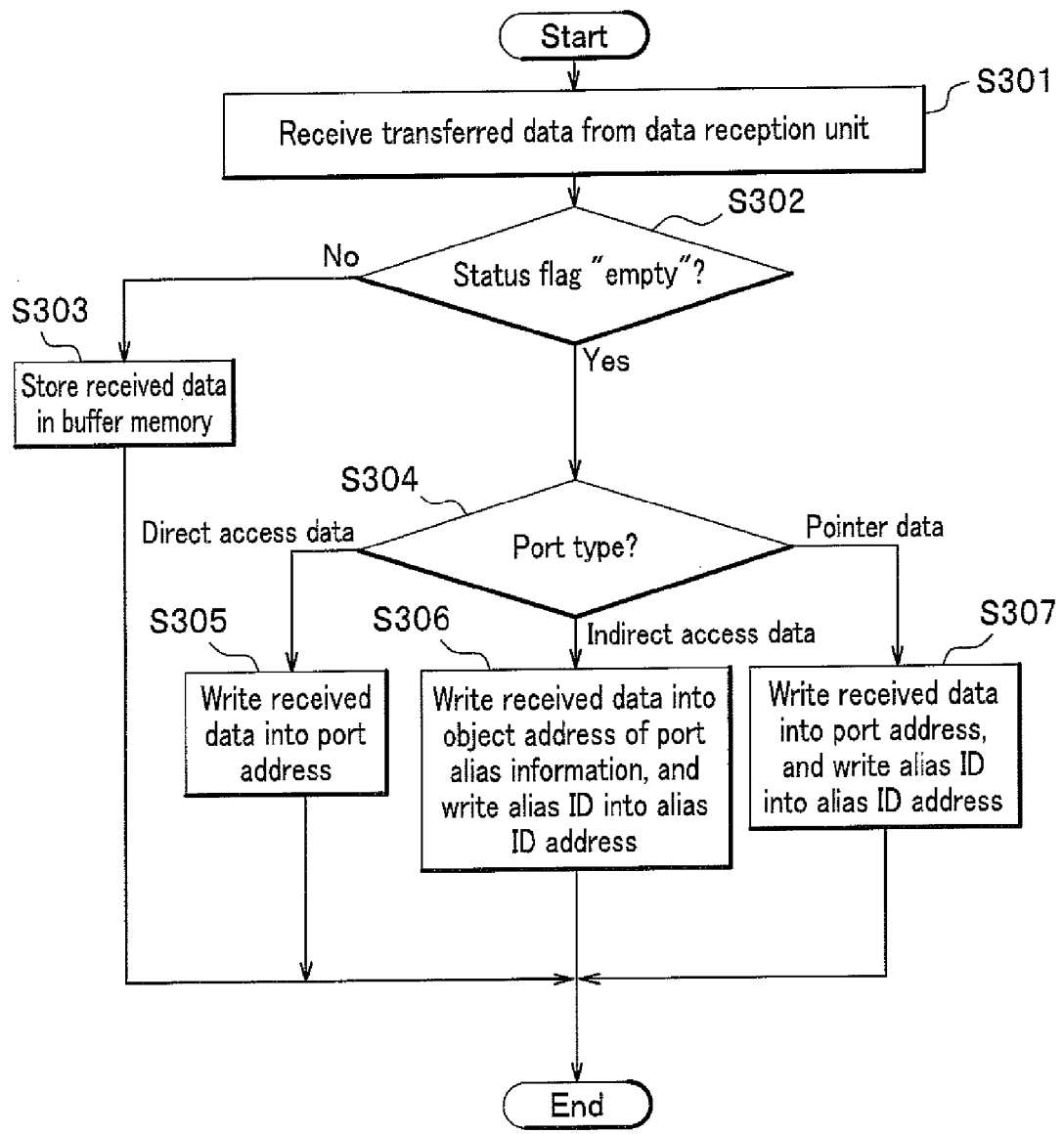
FIG. 40 is a flowchart showing steps of a transferred data storage processing in a receive buffer.

FIG. 40 is a flowchart showing steps of a transferred data storage processing in a receive buffer. Next are described the steps of the transferred data storage processing in the receive buffer 61*a* with reference to FIG. 40 (see also FIG. 36 and FIG. 37 as needed).

The receive buffer 61*a* receives the transferred data from the data reception unit 61 (S301), and specifies which status the status flag 61*c* indicates (S302).

If the status flag 61*c* does not indicate "empty" ("No" in S302), the receive buffer 61*a* stores the received data in the buffer memory 61*b* (S303).

If the status flag 61*c* indicates "empty" ("Yes" in (S302)), the received data is stored in the local memory 80. Then the receive buffer 61*a* specifies the port type (S304). If the port type is the direct access data (if so in S304), the receive buffer 61*a* writes the received data into a port address (of the port information 620) (an address specified by the port address 624) (S305). If the port type is the indirect access data (if so in S304), the receive buffer 61*a* writes the received data into an object address of the port alias information (an address specified by the object address 628*c*), and further writes the alias ID (received from the data reception unit 61) into an alias ID address (an address specified by the alias ID address 626) (S306). If the port type 622 is the pointer data (if so in S304), the receive buffer 61*a* writes the received data into a port address (an address specified by the port address 624), and further writes the alias ID into an alias ID address (an address specified by the alias ID address 626 (S307).

Figure 41:
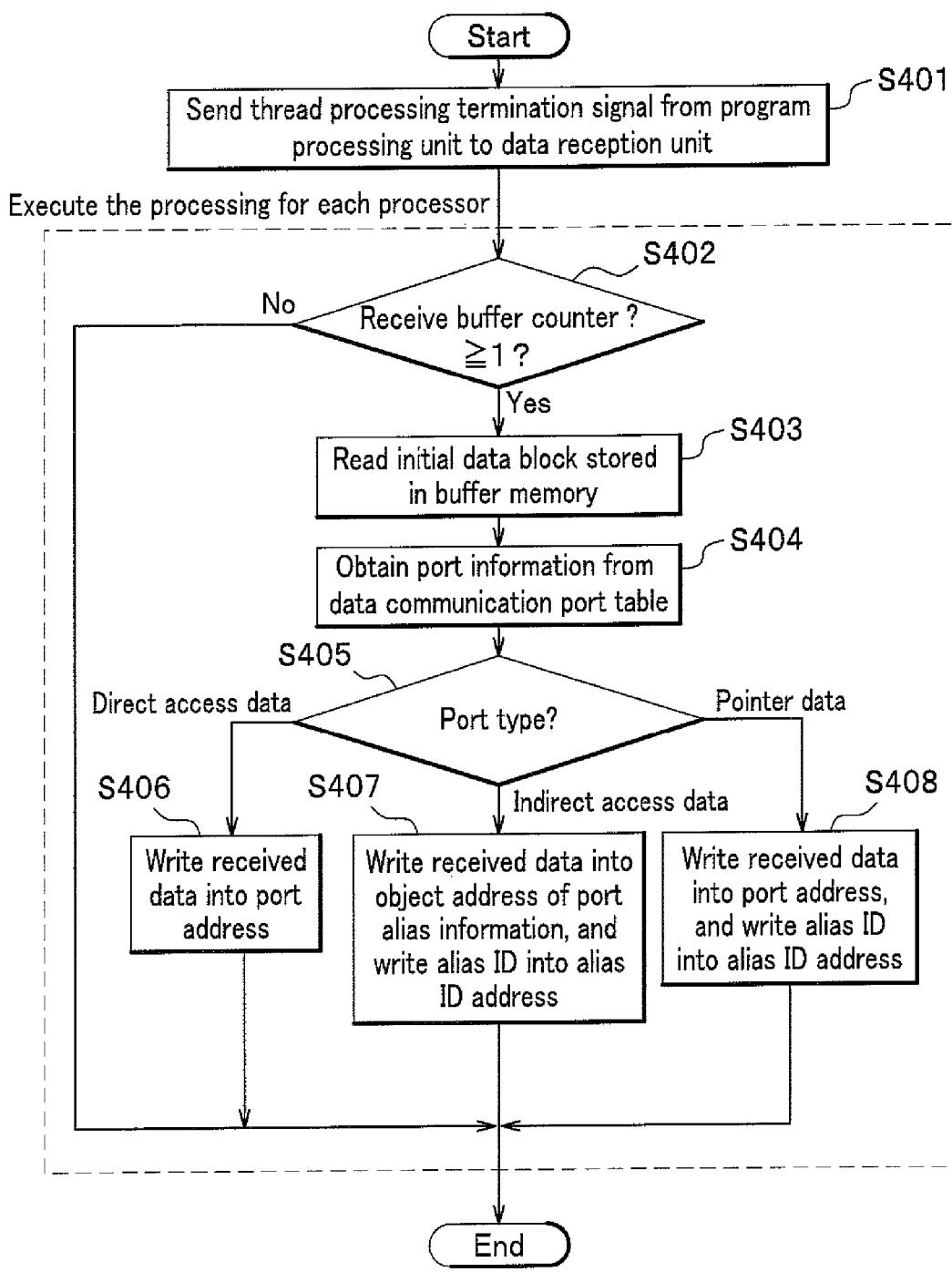
FIG. 41 is a flowchart showing steps of a receive buffer update processing when a thread processing is terminated.

FIG. 41 is a flowchart showing steps of a receive buffer update processing when a thread processing is terminated. Next are described the steps of the receive buffer update processing when a thread processing is terminated with reference to FIG. 41 (see also FIG. 36 and FIG. 37 as needed).

After completing an ongoing thread processing, the program processing unit 70 sends a thread processing termination signal to the data reception unit 61 (S401). Then the data reception unit 61 performs a processing as follows (shown within a dashed line rectangle in FIG. 41) for each receive buffer 61*a*.

The data reception unit 61 determines whether or not the counter 61*d* in the receive buffer 61*a* indicates one or more (S402). If the counter 61*d* indicates one or more ("Yes" in S402), it means that one or more data blocks are stored in the buffer memory 61*b*. Thus, the data reception unit 61 reads an initial data block stored in the buffer memory 61*b* (S403), obtains the port information 620 corresponding to the received data from the data communication port table 62 using the port ID 621 (S404), and specifies the port type 622.

If the port type 622 is the direct access data (if so in S405), the receive buffer 61*a* writes the received data into a port address (of the port information 620) (an address specified by the port address 624 (S406). If the port type 622 is the indirect access data (if so in S405), the receive buffer 61*a* writes the received data (the data stored in the buffer memory 61*b*) into an object address (of the port alias information) (an address specified by the object address 628*c*), and further writes the alias ID (the data stored in the buffer memory 61*b*) into an alias ID address (an address specified by the alias ID address 626) (S407). If the port type 622 is the pointer data (if so in S405), the receive buffer 61*a* writes the received data into a port address (an address specified by the port address 624), and further writes the alias ID into an alias ID address (an address specified by the alias ID address 626) (S408).

Figure 42:
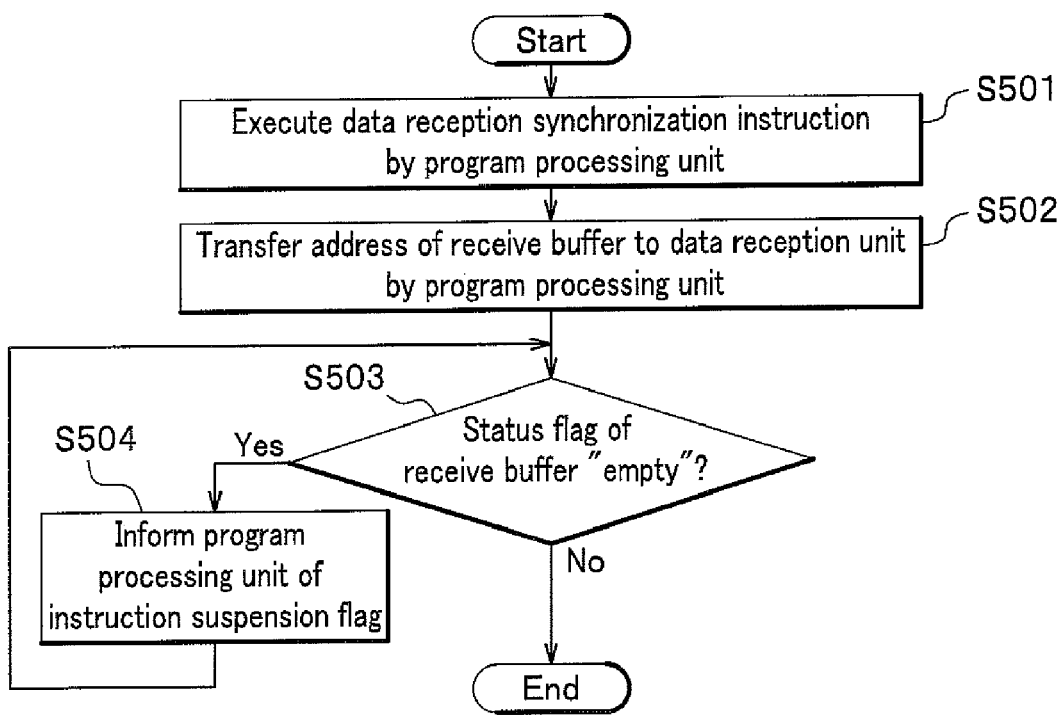
FIG. 42 is a flowchart showing steps of a communication data input hazard detection processing.

FIG. 42 is a flowchart showing steps of a communication data input hazard detection processing. Next are described the steps of the communication data input hazard detection processing with reference to FIG. 42 (see also FIG. 36 and FIG. 37 as needed).

When the program processing unit 70 executes a data reception synchronization instruction (S501), the program processing unit 70 transfers an address of the receive buffer 61*a* corresponding to the received data to the data reception unit 61 (S502), and the processing proceeds to S503.

In S503, the data reception unit 61 specifies the receive buffer 61*a* corresponding to the received address of the receive buffer 61*a*, and specifies which status the status flag 61*c* indicates (S503).

If the status flag 61*c* indicates "empty" ("Yes" in S503) the data reception unit 61 informs the program processing unit 70 of an instruction suspension flag (sends a signal for suspending execution of an instruction to the program processing unit 70) (S504), and the processing returns to S503. If the status flag 61*c* does not indicate "empty" ("No" in S503), the processing is terminated.

As described above, the multi-processor system in the embodiments of the present invention performs a processing based on an execution code containing a communication instruction generated by the program processing device. Thus, a communication unit in the data flow machine-type data-driven control method does not need to specify an instruction block to be started in a communicated data, and also does not need to have a complicated hardware configuration. Further, although the communication processing unit and the program processing unit are separate and different components, detection of a data communication hazard in the communication processing unit, and control of execution or suspension of a processing in the program processing unit can be closely synchronized in the multi-processor system, which can reduce a delay time. Further, the communication processing unit has all of the functions required in the multi-processor system, such as a data transfer and reception and a synchronization processing. Therefore, in the multi-processor system, even an existing microprocessor can be used as a processing unit in the program control method (a program processing unit). Also, development of a program for the program processing and of a high-performance multi-processor system can be facilitated.

In the multi-processor system, the communication processing unit has the port alias information. This enables a plurality of processors having respective memory spaces to share a pointer data or a pointer reference data, which can provide large flexibility in developing a parallel processing program.

In the multi-processor system, the communication data input hazard detection processing is performed, in which the data reception unit 61 instantly detects whether or not a data transferred from other processor is received, and immediately suspends execution of a processing performed in the program processing unit 70, if a necessary external data has not yet received. This allows execution of the processing performed in the program processing unit 70 to start, before all external data to be referenced in an instruction block are received, which can drastically reduce a data waiting time.

The invention claimed is:

1. A program processing device for inputting therein a parallel processing program with a thread description added thereto; partitioning the program into threads; and generating execution codes for a multi-processor system having a plurality of processors, using the threads, the program processing device comprising:
   a storage unit; and
   a processing unit,
   the processing unit comprising:
   a syntax analysis unit for identifying a starting point and an end point of each thread in the parallel processing program inputted in the storage unit, using a reserved keyword or a symbol; and generating an intermediate language, in which a thread attribute of the each thread is added to each operation instruction included in a thread area specified by the starting point and the end point;
   a data dependency extraction unit for inputting therein the intermediate language; extracting an instruction block input/output data from the intermediate language; and generating, based on the instruction block input/output data, single data dependency edge information including information on a single data dependency, which is a dependency of a data generated or referenced by a single operation instruction, information on a data structure dependency, which is a dependency of a data between instructions acting on the data structure, and information on a pointer alias data dependency, which is a dependency of a data between instructions acting on a pointer reference data;
   an inter-thread data dependency extraction unit for inputting therein the intermediate language and the data dependency edge information; extracting, from the intermediate language, a data dependency edge for connecting a thread with another thread, and a thread output data generation instruction and a thread input reference instruction each corresponding to the data dependency edge, based on the data dependency edge information; and generating inter-thread data dependent instruction pair information;
   a pointer communication auxiliary instruction generation unit for inputting therein the intermediate language; extracting a pointer data from the data dependency edge for connecting between different threads; inserting a pointer alias ID computing instruction just prior to an instruction for defining the pointer data of the intermediate language; and generating a first program;
   an inter-thread data communication instruction insertion unit for inputting therein the first program and the inter-thread data dependent instruction pair information; inserting an inter-thread data transfer instruction just subsequent to the thread output data generation instruction in the first program, based on the inter-thread data dependent instruction pair information; inserting an inter-thread data reception synchronization instruction just prior to the thread input data reference instruction in the first program, based on the inter-thread data dependent instruction pair information; inserting a thread start-up instruction at a branch instruction, on which a thread of interest is control-dependent, or at a function entrance; and generating a second program; and
   a program partition/code generation unit for inputting therein the second program; partitioning the second program into threads, based on the thread attribute of each instruction; and converting the each thread into an execution code.

2. A non-transitory recording medium encoded with a parallel processing program inputted in the storage unit of a program processing device,
   wherein the parallel processing program causes a processing unit of the program processing device to:
   identify a starting point and an end point of each thread in the parallel processing program which is inputted in the storage unit and to which a thread description is added, using a reserved keyword or a symbol; and generate an intermediate language, in which a thread attribute of the each thread is added to each operation instruction included in a thread area specified by the starting point and the end point;
   input therein the intermediate language; extract an instruction block input/output data from the intermediate language; and generate, based on the instruction block input/output data, single data dependency edge information including information on a single data dependency, which is a dependency of a data generated or referenced by a single operation instruction, information on a data structure dependency, which is a dependency of a data between instructions acting on the data structure, and information on a pointer alias data dependency, which is a dependency of a data between instructions acting on a pointer reference data;
   input therein the intermediate language and the data dependency edge information; extract, from the intermediate language, a data dependency edge for connecting a thread with another thread, and a thread output data generation instruction and a thread input reference instruction each corresponding to the data dependency edge, based on the data dependency edge information; and generate inter-thread data dependent instruction pair information;
   input therein the intermediate language; extract a pointer data from the data dependency edge for connecting between different threads; insert a pointer alias ID computing instruction just prior to an instruction for defining the pointer data of the intermediate language; and generate a first program;

input therein the first program and the inter-thread data dependent instruction pair information; insert an inter-thread data transfer instruction just subsequent to the thread output data generation instruction in the first program, based on the inter-thread data dependent instruction pair information; insert an inter-thread data reception synchronization instruction just prior to the thread input data reference instruction in the first program, based on the inter-thread data dependent instruction pair information; insert a thread start-up instruction at a branch instruction, on which a thread of interest is control-dependent, or at a function entrance; and generate a second program; and input therein the second program; partition the second program into threads, based on the thread attribute of each instruction; and convert the each thread into an execution code.

3. A program processing method performed by a program processing device for inputting therein a parallel processing program with a thread description added thereto; partitioning the program into threads; and generating execution codes for a multi-processor system having a plurality of processors, using the threads, the program processing device comprising:

a storage unit; and
a processing unit,
the program processing method performed by the processing unit comprising the steps of:

identifying a starting point and an end point of each thread in the parallel processing program inputted in the storage unit, using a reserved keyword or a symbol; and generating an intermediate language, in which a thread attribute of the each thread is added to each operation instruction included in a thread area specified by the starting point and the end point;

inputting the intermediate language; extracting an instruction block input/output data from the intermediate language; and generating, based on the instruction block input/output data, data dependency edge information including information on a single data dependency, which is a dependency of a data generated or referenced by a single operation instruction, information on a data structure dependency, which is a dependency of a data between instructions acting on the data structure, and information on a pointer alias data dependency, which is a dependency of a data between instructions acting on a pointer reference data;

inputting the intermediate language and the data dependency edge information; extracting, from the intermediate language, an data dependency edge for connecting a thread with another thread, and a thread output data generation instruction and a thread input reference instruction each corresponding to the data dependency edge, based on the data dependency edge information; and generating inter-thread data dependent instruction pair information;

inputting the intermediate language; extracting a pointer data from the data dependency edge for connecting between different threads; inserting a pointer alias ID computing instruction just prior to an instruction for defining the pointer data of the intermediate language; and generating a first program;

inputting the first program and the inter-thread data dependent instruction pair information; inserting an inter-thread data transfer instruction just subsequent to the thread output data generation instruction in the first program, based on the inter-thread data dependent instruction pair information; inserting an inter-thread data reception synchronization instruction just prior to the thread input data reference instruction in the first program, based on the inter-thread data dependent instruction pair information; inserting a thread start-up instruction at a branch instruction, on which a thread of interest is control-dependent, or at a function entrance; and generating a second program; and inputting the second program; partitioning the second program into threads, based on the thread attribute of each instruction; and converting the each thread into an execution code.

4. A multi-processor system having a plurality of processors, the multi-processor system performing a processing based on execution codes generated by a program processing device, in which the program processing device inputs therein a parallel processing program with a thread description added thereto, partitions the program into threads, and generates the execution codes for the multi-processor system, the multi-processor system comprising, for each of a plurality of the processors:

a storage unit; and
a processing unit,
the processing unit comprising:
an inter-processor communication processing unit for performing control between the processors in a data flow machine-type data-driven control method; and an in-processor processing unit for performing control between the processors in a Neumann-type program-driven control method, the inter-processor communication processing unit performing a communication between the processors in synchronization with the in-processor processing unit, and detecting a communication data hazard between the processors, and the in-processor processing unit performing a processing based on the execution codes stored in the storage unit, and executing or suspending the execution codes according to a result of detecting the data hazard, wherein the storage unit stores therein a data communication port table for holding port information, the port information includes a data size, a data storage address, a transfer port ID each for performing an inter-processor communication of a direct access-type data, a pointer reference data, and a pointer data, and, additionally, port alias information for performing an inter-processor communication of the pointer reference data and the pointer data, the port alias information includes information on a pointer alias including a data size, a data storage address, and an alias ID for each of all data objects to be referenced by a pointer, if an inter-processor communication of a direct access-type data is performed, the inter-processor communication processing unit of a first processor on a transfer side obtaining the port information of the direct access-type data; identifying, using the data storage address in the port information, a data storage address of the direct access-type data stored in the storage unit of the first processor on the transfer side; and transferring a data having the identified data storage address and the transfer port ID to a second processor on a receive side, and the inter-processor communication processing unit of the second processor on the receive side identifying a data storage address of the received data, which is stored in the storage unit of the second processor on the receive side, using the received transfer port ID; and storing the received data into the identified data storage address, if an inter-processor communication of a pointer reference data is performed, the inter-processor communication processing unit of the first processor on the transfer side obtaining the port alias information of the pointer reference data; identifying a data storage address of a data object referenced by a pointer of the pointer reference data, stored in the storage unit of the first processor on the transfer side, using the port alias information; and transferring the transfer port ID, an alias ID of the pointer reference data, and all data objects referenced by the pointer, to the second processor on the receive side, and the inter-processor communication processing unit of the second processor on the receive side identifying a data storage address of each of the data objects, stored in the storage unit of the second processor on the receive side, using the received transfer port ID and the alias ID; and storing the received data objects into respective identified data storage addresses, and if an inter-processor communication of a pointer data is performed, the inter-processor communication processing unit of the first processor on the transfer side obtaining the port alias information of a pointer of interest; identifying a data storage address of a data object referenced by a pointer of the pointer data, and stored in the storage unit of the first processor on the transfer side, using the port alias information; and computing a pointer offset value by subtracting the data storage address from a value of the pointer; and transferring the transfer port ID, the alias ID of the pointer, and the pointer offset value to the second processor on the receive side, and the inter-processor communication processing unit of the second processor on the receive side identifying a data storage address of a data object stored in the storage unit of the second processor on the receive side, using the received transfer port ID and the alias ID; computing a pointer value, which is valid in the storage unit of the second processor on the receive side, by adding the data storage address to the received pointer offset value; and storing the pointer value into the storage unit of the second processor on the receive side.

5. The multi-processor system according to claim 4, wherein, if an inter-thread data reception synchronization instruction is executed, which is inserted by the program processing device, just prior to an instruction of firstly referencing an external data, the in-processor processing unit transfers reception port information of a data of interest included in the inter-thread data reception synchronization instruction to the inter-processor communication processing unit, and wherein the inter-processor communication processing unit detects a reception state of the data using the reception port information; and, if the data has not yet been received, suspends execution of a processing in the in-processor processing unit.

* * * * *